United States Patent
Ginn et al.

(10) Patent No.: US 10,975,321 B2
(45) Date of Patent: Apr. 13, 2021

(54) PROCESSING POST-INDUSTRIAL AND POST-CONSUMER WASTE STREAMS AND PREPARATION OF POST-INDUSTRIAL AND POST-CONSUMER PRODUCTS THEREFROM

(71) Applicant: GMT IP, LLC, Sandersville, GA (US)

(72) Inventors: Michael Warren Ginn, Sandersville, GA (US); Whitney Lynn Jones, Mitchell, GA (US)

( * ) Notice: Subject to any disclaimer, the term of this patent is extended or adjusted under 35 U.S.C. 154(b) by 15 days.

(21) Appl. No.: 16/209,949

(22) Filed: Dec. 4, 2018

(65) Prior Publication Data
US 2019/0211279 A1    Jul. 11, 2019

Related U.S. Application Data

(60) Provisional application No. 62/594,248, filed on Dec. 4, 2017.

(51) Int. Cl.
*C10L 5/00*    (2006.01)
*C10L 5/40*    (2006.01)
(Continued)

(52) U.S. Cl.
CPC .......... *C10L 5/403* (2013.01); *B09B 3/0083* (2013.01); *B29B 17/02* (2013.01); *B29B 17/04* (2013.01);
(Continued)

(58) Field of Classification Search
CPC .......... C10L 5/403; C10L 5/48; B09B 3/0083; C02F 1/5236; C02F 2101/20; C02F 2101/105; C02F 2101/163; B29B 17/04; B29B 17/02; B29B 2017/0496; C08J 11/02; B01D 9/0054; B29L 2031/7322
See application file for complete search history.

(56) References Cited

U.S. PATENT DOCUMENTS

| 5,846,378 A | 12/1998 | Phipps |
| 7,300,539 B2 | 11/2007 | Phipps |
| (Continued) | | |

FOREIGN PATENT DOCUMENTS

CN    105921102    * 9/2016

OTHER PUBLICATIONS

Cheung, et al. "Improving phosphate removal of sand infiltration system using alkaline fly ash." Chemosphere 41.1-2 (Jul. 1, 2000): 243-249. Abstract, and p. 245 col. 2 para 4-p. 246 col. 1 para 1, and p. 246 col. 2 para 2.

(Continued)

*Primary Examiner* — Cephia D Toomer
(74) *Attorney, Agent, or Firm* — Laurence P. Colton; Carlo Julio Salas Martinez; Smith Tempel Blaha LLC

(57) ABSTRACT

A system for and method of, processing post-consumer and post-industrial waste streams, producing active ingredients for waste stream processing, processing aqueous waste streams, preparing and collecting a multi-purpose chemical precursor, removing phosphates, nitrates, heavy metals, and other contaminants from aqueous waste streams, collecting and processing a post-consumer and post-industrial product from aqueous waste streams, administering and positioning assets and processes associated with waste stream processing, and scheduling operations for sub-systems of the system.

3 Claims, 30 Drawing Sheets

(51) Int. Cl.

| | |
|---|---|
| *B09B 3/00* | (2006.01) |
| *C10L 5/48* | (2006.01) |
| *C02F 1/52* | (2006.01) |
| *B29B 17/04* | (2006.01) |
| *B29B 17/02* | (2006.01) |
| *C08J 11/02* | (2006.01) |
| *C02F 101/20* | (2006.01) |
| *C02F 101/10* | (2006.01) |
| *C02F 101/16* | (2006.01) |
| *B01D 9/00* | (2006.01) |
| *B29L 31/00* | (2006.01) |

(52) U.S. Cl.
CPC ............ *C02F 1/5236* (2013.01); *C08J 11/02* (2013.01); *C10L 5/48* (2013.01); *B01D 9/0054* (2013.01); *B29B 2017/0496* (2013.01); *B29L 2031/7322* (2013.01); *C02F 2101/105* (2013.01); *C02F 2101/163* (2013.01); *C02F 2101/20* (2013.01)

(56) References Cited

U.S. PATENT DOCUMENTS

| | | |
|---|---|---|
| 8,007,688 B2 | 8/2011 | Dahlin et al. |
| 2003/0103882 A1 | 6/2003 | Biermann et al. |
| 2003/0159624 A1 | 8/2003 | Kinuthia et al. |
| 2005/0223950 A1 | 10/2005 | Biermann et al. |
| 2010/0330288 A1 | 12/2010 | Sejars et al. |
| 2011/0132230 A1* | 6/2011 | Han .................. C04B 12/005 106/600 |
| 2012/0218497 A1* | 8/2012 | Kajita ............... G02F 1/134363 349/98 |
| 2012/0328497 A1 | 12/2012 | Higgs |
| 2013/0280545 A1 | 10/2013 | Husband et al. |
| 2017/0233291 A1 | 8/2017 | Sevagen et al. |

OTHER PUBLICATIONS

Bell, et al. "Formation of ceramics from metakaolin-based geopolymers. Part II: K-based geopolymer." Journal of the American Ceramic Society 92 ,3 {Mar. 2009): 607-615. p. 607 col. 1 para 1.

Pera, et al. "Development of highly reactive metakaolin from paper sludge." Advanced Cement Based Materials 7.2 (Mar. 1, 1998): 49-56. Abstract, p. 49 col. 2 para 2-3, p. 52 col. 1 para 3, and Table 1.

Frias, et al. "Influence of activation temperature on reaction kinetics in recycled claywaste.calcium hydroxide systems." Journal of the American Ceramic Society 91.12 (Dec. 2008): 4044-4051. p. 4044 col. 1 para 2, p. 4044 col. 2 para 1-3, p. 4045 col. 1 para 1, p. 4047 col. 2 para 2, and Figure 1.

Patent Cooperation Treaty (PCT) International Preliminary Report on Patentability (Chapter II of the PCT) (PCT Article 36 and Rule 70) including Reasoned statement under Article 35(2) with regard to novelty, inventive step or industrial applicability.

\* cited by examiner

| EPD Water Quality Control limit per 391-3-6 (strictest; ug/L) | Al | B | chronic freshwater r = 0.43 Cd | Chronic coastal/estuary = 3.1 Cu | Chronic freshwater r = 1.2 Pb | chronic coastal/estuary = 8.2; chronic freshwater = 29 Ni | Se | Sr | chronic freshwater = 0.012 Hg |
|---|---|---|---|---|---|---|---|---|---|
| Sample Name | | | | | | | | | |
| Flyash 2-Hi | 374 | 535 | 1.8 | 12.9 | 3.8 | 1050 | 21.7 | 87.4 | 0.76 |
| Flyash 2-Lo | 2550 | 707 | 3.5 | 1860 | 110 | 2820 | 18.6 | 177 | 6.8 |
| Flyash 1-Hi | 321 | 0 | 0 | 5.2 | 2 | 0 | 0 | 136 | 0 |
| Flyash 1-Lo | 275 | 0 | 0 | 0 | 1.5 | 0 | 0 | 145 | 0 |

*FIG. 20*

PROCESSING POST-INDUSTRIAL AND POST-CONSUMER WASTE STREAMS AND PREPARATION OF POST-INDUSTRIAL AND POST-CONSUMER PRODUCTS THEREFROM

BACKGROUND OF THE INVENTION

Technical Field

The present invention is directed generally to a system for, and method of, sustainable waste management and post-industrial and post-consumer product management. The present invention also is directed generally to sustainable water management for aqueous waste streams. These aqueous waste streams may be associated with post-industrial and post-consumer waste streams, or the aqueous waste streams may be independent from the post-industrial or post-consumer streams (i.e., the aqueous waste streams may be municipal or agricultural aqueous waste streams, for example), all together referred to herein generally as waste streams. The sustainable water management realized by the present invention also may encompass open water treatments and treatment systems for, but not limited to, lakes, reservoirs, oceans, rivers, ponds, and streams.

The present invention also is directed generally to a system for, and method of, producing or reducing the inputs necessary for waste stream processing. These inputs may be (1) energy, (2) fresh water, or (3) the active ingredients necessary for adequate processing, for example. The present invention also is directed generally to reducing the non-useful, or potentially toxic, outputs from the waste stream processing. These outputs may be post-consumer waste residues (laden with unrecovered or unrecycled resources that are too difficult to capture; both minerals and water alike) and haphazard processing ash, such as non-useful, potentially-toxic, heterogeneous, oxidation by-products—neither purposefully engineered nor designed to have any specific chemical structure, or to exhibit any particular chemical force. The aqueous outputs may be contaminated with phosphates and nitrates, and various other organic and inorganic solutes or particulates.

The present invention also is directed generally to a system for, and method of evaluating and preparing a multipurpose, composite chemical precursor/platform for various useful and economically valuable, post-consumer or post-industrial products. The composite chemical precursor exhibits unique synergistic molecular attraction forces, including chemical bonding and absorption (chemisorption) forces, that are magnified when compared to the individual components of the composite. The chemical precursor may be one or more crystalline compositions comprised of calcium oxide, partially converted calcium carbonate, and/or meta-kaolin, including their common and amorphous crystalline structures. The chemical precursor may be specifically designed and prepared, via control of the necessary inputs, the necessary methodology, and the necessary equipment and systems, to function as a unique morphological capture platform, either in the form of a collector or collection/precipitation agent, or as a geopolymer precursor. The post-consumer products derived from the precursor may take the form of meta-kaolin, halloysite, pozzolans, soil additives, building materials, pigments, and fillers, and may, by virtue of the efficient and effective preparation of the precursor itself, be more economically-efficient to manufacture than to mine, leach, and/or harvest.

The present invention also is directed generally to a system for, and method of, recycling and recovering phosphates or nitrates or heavy metals or combinations thereof from the aqueous waste streams. Further, the present invention also is directed generally to a method for evaluation, and preparation, of a useful and economically valuable, post-consumer product carrying these phosphorous or nitrogen groups or heavy metals from the aqueous waste. The post-consumer product may take the form of an agricultural fertilizer, or take the form of another useful, sustainable post-consumer material such as meta-kaolin, pozzolans, soil additives, building materials, pigments, and fillers.

More specifically, in one exemplary embodiment, the system and method of the present disclosure is directed to technical fields including:
processing post-consumer waste streams;
reducing the output waste from the processing of the post-consumer waste, for example;
    producing energy from the processing of the post-industrial and post-consumer waste;
    recovering minerals from the post-industrial and post-consumer waste; and
    producing active ingredients for waste stream processing, including preparing and collecting a multipurpose capture platform from the post-industrial and post-consumer waste, etc.;
processing aqueous waste streams;
preparing and collecting a multipurpose chemical precursor from the post-industrial and post-consumer waste, for the preparation of a post-industrial or post-consumer product;
reducing the output waste from the processing of the aqueous waste by, for example;
    removing phosphates and nitrates and other contaminants from the aqueous waste; and
    collecting and processing a post-industrial or post-consumer product from the resulting compositions of the waste stream processing, etc.;
administering and positioning the assets and processes associated with the waste stream processing; and
scheduling operations for sub-systems of the system.

Prior Art

Generally—

The present invention is applicable to a wide variety of wastes, such as, for example, carpet process waste, paper recycling waste, industrial waste, agricultural waste, material recovery waste, deinking waste, aqueous waste, heavy metal waste, styrene-butadiene rubber (SBR) waste, styrene-butadiene latex (SBL) waste, and polyurethane waste. These post-consumer (PC) or post-industrial (PI) waste streams may derive from various sources, and may have various stages of preliminary processing, such as, for example, preliminary mechanical and chemical processing including separation, filtration, dilution, reduction, phase change, and enthalpy change.

As a non-limiting example, the PC or PI waste streams may be comprised of carpet third stream, carpet carcasses, whole carpet, and/or other carpet waste materials, or the PC or PI waste streams may be comprised of paper mill sludge, deinking residuals, and/or other paper waste processing and paper-recycling by-products.

With Regard to Carpet Waste Streams—

Used and discarded carpet is a potentially valuable resource. Typical whole carpet construction contains various fiber types that are tufted into a primary backing that is bound as a structural system by a back coating. Primary and secondary back coatings contain various polymers and fillers, such as styrene-butadiene rubber (SBR), ethylene vinyl acetate (EVA), polyethylene terephthalate (PET), polyvinyl chloride (PVC), calcium carbonate, clay, and glass. In simple terms, the face of the carpet is woven through a backing fabric and held in-place by an "adhesive" which is often a latex cross-linked polymer or thermoresin loaded with calcium carbonate and/or other mineral filler materials.

The term "carpet third stream" is frequently used in the field in connection with PC and PI materials, and in general, refers to a waste stream of recovered materials containing the highest concentrations of fillers and binders, and, optionally, filler wetting agents, which are extracted from the recycling of whole carpet and the recovery of energy. The term "carcasses" in general refers to the remnants of the carpet backing structure with the fibers substantially shaved-off. For example, U.S. Pat. No. 5,908,701 teaches the three stream concept in which the first stream reacts with the second stream and the third stream contains filler or fillers.

In one non-limiting example, the carpet third stream comprises petroleum and bio-based polymers and mineral fillers, which can potentially be recovered and reused. Additionally, the carpet third stream is exothermic in nature. Carpet polymeric fibers have been selectively recovered from the PC and PI carpet stream via grinding and shaving techniques. Other preliminary recovery techniques employed include the processing of the PC and PI carpet stream via the caprolactam-monomer process with Nylon 6 as the feedstock. The recovered fibers, known as "fluff", and caprolactam have value as thermoplastic resins and fiber resource materials in a range of applications.

U.S. Pat. Nos. 7,045,590 and 6,786,988, and US Patent Publication No. 2005/0209439, teach mechanically reducing the size of carpet in the PC or PI carpet stream to the size of calcium carbonate typically used as a filler, and the incorporation of such fragments in carpet backings, with the resulting filler composed of mineral filler and the residual carpet fibers. This limitation in the prior art is due to the challenges of mechanically separating and liberating the fibers and binders from the mineral filler. The final product has limited applications as a stand-alone product due to the physical attributes, composition, and chemistry of the recovered materials.

US Patent Publication No. 2010/0330288 discloses a method for reclaiming inorganic filler from waste carpeting, comprising the steps providing a waste carpeting composition comprising an inorganic filler component and an organic component, and heat treating the waste carpeting composition under conditions effective to separate at least a portion of the organic component from the waste carpeting composition and to provide a reclaimed inorganic filler composition at least substantially free of the organic component, but does not contemplate sufficiently treating the reactants so as to result in a mineral product having the desired features.

US Patent Publication No. 2010/0044480 and U.S. Pat. No. 7,635,099 respectively teach mechanical separation and liberation. US Patent Publication No. 2010/0044480 recognizes the limitations of mechanical separation and introduces a thermal step that attempts to separate more of the fibers. US Patent Publication No. 2010/0044480 discloses a recovery process for recovering filler material from carpet waste comprising providing carpet; size-reducing the carpet waste into particulate matter comprising polymer fibers, filler material and adhesive material; separating the particulate matter into a first stream comprising substantially polymer fibers and a second stream comprising substantially filler material and adhesive material; and heating the second stream at a temperature sufficient to remove at least some of the polymer fibers remaining in the second stream to enrich the content of filler material in the second stream.

U.S. Pat. No. 7,635,099 discloses a component recovery process comprising providing a material feed including fiber, filler and adhesive; shredding the material feed to liberate filler and adhesive from the fiber; screening the shredded material feed yielding at least two resultant streams, a first of which comprises fiber suitable for depolymerization feed stocks and a second of which comprises filler suitable for direct reinforcement in polymer resins; combining the first resultant stream with a liquid to form a slurry; and centrifuging the slurry at a G-Force of 30 G or less.

U.S. Pat. No. 8,544,772 B2 teaches a method of recovering a mineral product from carpet by preparing a feed of carpet pieces; thermally separating organic components from mineral components in the carpet by heating the carpet pieces to a particle bed temperature in the range of 600° C. to 1000° C., wherein the mineral component is oxidized to form a mineral oxide; slurrying the mineral oxide with water to produce 15% to 35% solids slurry within a period of approximately 30 minutes to 24 hours, whereby the mineral oxide forms a mineral hydroxide; stabilizing the pH of the slurry in the range between 6 and 10 by carbonation, resulting in a slurry containing mineral carbonates. In this way, the reference provides a process in which waste material containing mineral fillers and organics is subjected to thermal separation permitting energy recovery from the organics. The mineral filler portion is mechanically sized, slurried and stabilized. The stabilized product may be subjected to further, secondary stabilization followed by soluble salts removal, filtration, concentration, drying and further milling and pulverization as desired. When the desired properties are obtained, the product may be utilized in polymer coatings in carpet backings and in other post-consumer coating/filler applications.

With Regard to Paper Waste and Paper-Recycling Streams—

Many grades of paper contain functional mineral pigments, fillers, and/or additives, such as kaolin clays, calcium carbonate, titanium silicates and dioxides, etc., which are incorporated into the paper when it is made, or which are superficially incorporated onto the paper thereafter. Generally, there has been no practical method of separating the mineral pigments from the organic portion of the waste, so that the mineral pigments can be reused.

The prior art generally teaches that the wastes from papermaking or from recycling paper waste are best incinerated, and that the residue of the incineration are best deposited in a landfill or used to produce aggregate materials, typically for use in construction applications.

More specifically, pulp and paper sludge (a by-product of primary pulping operations, recycle streams, or waste paper pulping, and the like), as well as the products of its incineration, represent an environmental and disposal problem for manufacturers and recyclers of pulp and paper. Generally, pulp and paper sludge is unsuitable for paper making, although it generally includes the same components—lignin, cellulose, hemicellulose, calcium carbonate, clay, and other inorganic components—as those present in the paper pulp itself.

The recycling of paper waste generally involves separation of a usable pulp fiber from the other components of the paper, such as mineral fillers, printing inks, laser toner particles, and adhesives, through a series of steps that may be carried out in any way that is suitable to the purpose of the deinking plant and its customers. Regardless of the specific recycling process, two materials are always produced: (1) pulp fiber, called "secondary" fiber, that can be sold to a paper manufacturer for reuse as a raw material in the production of paper, and (2) a composite waste material comprising a mixture of components that is removed as part of the deinking process. The composite waste material is typically called deink residue (DIR).

The amount of DIR that is generated will vary depending on the quality of the incoming paper waste and the type of recycling process. Typically, on a dry basis, the fraction of DIR will be 15% to 40% by weight of the original paper waste before deinking. Since the DIR is typically produced in a wet state, before the waste leaves the deinking process, as much water as possible usually is removed to reduce handling and transportation costs. Generally, the waste is pressed to about 50% solids. Therefore, for every 100 tons of paper waste processed, between 30 and 80 tons of wet DIR, half of which is water, will be produced.

In some deinking plants that operate on the site of a paper mill, for example, the DIR plants are integrated with the mill. The DIR often is burned for its fuel content in the mill's white liquor recovery boilers. This residual ash typically makes up about 15-20% by weight of the original weight of DIR. However, due to its high water content, DIR is generally considered a low-grade, inefficient fuel. In some non-integrated deinking plants, for example, the most common fate of the residue is placement in a landfill. Landfilling is generally undesirable because it is both expensive and environmentally unfriendly. Thus, there has been a need to reduce the volume of waste generated at a deinking plant by reusing the mineral fillers and/or other components present in the residue mixture.

As is mentioned herein, but with more specificity, paper sludge or DIR has traditionally been disposed of by landfilling, composting, utilization by the cement industry, and by incineration. The latter option, in turn, creates another problem, namely, disposal of the resulting useless and potentially toxic ash, which often constitutes up to 50% (and sometimes as much as 80% or higher) of the volume of the sludge or DIR itself. Calcium carbonate, in the form of precipitated calcium carbonate (PCC) or ground calcium carbonate (GCC), typically constitutes 20% and up to 75% of dry sludge content. As a brief aside, calcium carbonate is a natural carbonate which is loaded, typically together with clay, into paper as a coating and filler to improve the mechanical characteristics as well as the appearance of paper.

Calcium carbonate is the main mineral pigment used in paper manufacturing both as a filler and as a coating material. Calcium carbonate is also used extensively as a functional filler in materials such as paints, coatings, plastics, sealants, and inks. For paper coating, the manufacturer usually needs a pigment which gives good optical properties (high brightness, opacity and gloss) and good printability. The morphology of the pigment is important to give the appropriate rheological effects. The purity of the product and the absence therefrom of large particles are essential for a very low abrasivity. Typically the mean particle size should be in the range 0.3 to 1 micron, with a very narrow particle size distribution. For paper filling, calcium carbonate with a mean particle size of 1.5 to 3.0 microns is typically used. The average mineral loading for uncoated paper is generally around 25% by weight while for the coated paper grades it is around 45% by weight.

Calcium carbonate for use in paper operations, as briefly mentioned herein, may be in a form (so-called GCC) obtained by grinding of naturally occurring calcium carbonate. Alternatively, the calcium carbonate can also be produced by a "chemical route" in which carbon dioxide is added to a solution of calcium ions (a sub-process of the processing of paper waste streams like DIR, for example), resulting in precipitation of calcium carbonate, referred to as PCC. Such "chemical routes" can be attractive in that the solution of calcium ions may be generated from a waste lime (CaO) or lime hydroxide ($Ca(OH)_2$) material, thus allowing production of industrially valuable calcium carbonate from a waste material that would otherwise give rise to problems and/or expense for disposal purposes.

Despite their natural abundance, calcium salts are generally expensive products due to the difficulties and expenses of their purification from natural mineral deposits. For instance, paper-quality PCC is typically produced from natural limestone via many stages including the calcination of limestone in an industrial kiln (into either a calcitic or a dolomitic lime), slaking, slurrying, carbonating, and a number of refining steps.

The prior art generally teaches that calcium-derived compounds undergo chemical changes when paper sludge/DIR is incinerated. The expectation in the art is that the organic components of the paper waste streams are completely destroyed during incineration, and that thermal dehydration of clay results in calcined aluminosilicates, which form complex chemical compounds with decarboxylated calcium carbonate of general formula $Ca_nAl_aSi_bO_c$ (namely, calcium aluminosilicates). Further, the expectation in the art is that silica may react with calcium oxide (derived from thermal decarboxylation of calcium carbonate) to form calcium silicate ($CaSiO_3$). Other minerals present in the paper waste sludge or DIR, (e.g., pigments, fillers, traces of flocculants, etc.), such as those based on magnesium, potassium, titanium, and others, make the composition of the mineral content even more complex. In the end, the particular species formed from said expected chemical changes depends mainly upon the relative amount and nature of clay in the mineral fraction of the sludge or DIR, the amount of calcium carbonate, and the conditions of the thermal treatment.

Unfortunately, due in part to these expectations in the art, the inorganic content of paper sludge, DIR, and sludge-derived ash is generally largely or totally wasted. At best, the prior art describes utilization of incineration ash for the production of low-end, impure products of limited market value.

Further, and as another brief aside, during the course of manufacturing paper and similar products, including paper board and the like, it is common and well known to incorporate quantities of inorganic materials into the fibrous web in order to improve the quality of the resulting paper product. A number of inorganic materials, such as titanium dioxide, have long been known to be effective for these purposes. For example, titanium dioxide is recognized as providing the maximum brightness and opacity development of all commercially available paper pigments. These materials can be incorporated into the paper in the form of anatase or rutile.

Titanium dioxide, however, is among the most expensive materials available for this purpose. Accordingly, in recent years, considerable efforts were made to develop satisfactory replacements for titanium dioxide. Based on their superior optical properties, calcined kaolins have proven to be very effective titanium dioxide extenders and have enjoyed wide acceptance in the paper, paint, and plastics industries. As such, any discussion regarding paper waste, sludge, and DIR must include a discussion regarding these components.

Among the materials that have found increasing acceptance as paper fillers are substantially anhydrous kaolin clays. Materials of this type are generally prepared by partially or fully calcining a crude kaolin clay, which may have been subjected to prior beneficiation steps in order to remove certain impurities, such as, for example, for the purpose of improving brightness in the ultimate product.

It is important for an understanding of the present invention to recognize that those skilled in the art of kaolin processing draw a sharp and fundamental distinction between calcined and uncalcined kaolins. With respect to terminology, it is noted that the prior art literature relating to the field of kaolin products and processing, often uses the term "hydrous" to refer to a kaolin which has not been subjected to calcination, specifically, which has not been heated to temperatures above about 450° C. Such temperatures serve to alter the basic crystal structure of kaolin. These so-called "hydrous" clays may be produced from crude kaolins, which have been subjected to various operations of beneficiation, for example froth flotation, magnetic separation, mechanical delamination, grinding, or comminution, but not to such heating as would impair the crystal structure.

In an accurate technical sense, the description of these materials as "hydrous" is incorrect. More specifically, there is no molecular water actually present in the kaolinite structure. Thus, although the composition can be, and often is, arbitrarily written in the following Formula 1.

$$2H_2O \cdot Al_2O_3 \cdot 2SiO_2 \qquad (1)$$

It is now well known that kaolinite is an aluminum hydroxide silicate of approximate composition written in the following Formula 2.

$$Al_2(OH)_4Si_2O_5 \qquad (2)$$

Once the kaolin is subjected to calcination, which, for the purposes of this disclosure means being subjected to heating of 450° C. or higher for a period that eliminates the hydroxyl groups, the crystalline structure of the kaolinite is destroyed. As used herein, the term "calcined kaolin" shall refer to such kaolin. Preferably, the calcined kaolin has been heated above the 980° C. exotherm, and therefore is "fully calcined", as opposed to having been rendered merely a "metakaolin", as is also used herein.

Returning to the processing of paper wastes, in particular the processing of DIR, incineration or combustion plants that meet common waste and emission regulations amongst various jurisdictions are designed to extract energy while producing paper sludge ash (PSA). The composition of PSA typically consists of a mixture of inorganic materials predominately formed from the calcium carbonate and kaolin present in the waste paper sludge.

When the incineration process is controlled at temperatures in the region of 600-800° C., the ash contains a mixture of calcium carbonate, calcium oxide, and metakaolin along with some minor amounts of other minerals. In addition some carbon may remain from the burning of the organic constituents.

When incineration occurs at temperatures above 800° C., or when the incineration temperature is uncontrolled, most of the calcium carbonate present will decompose to calcium oxide that may react with kaolin and other minor minerals present to form hard glassy calcium aluminum silicate minerals such as gehlenite.

Where the main objective is to recover energy, fluid bed combustors are designed to run at high temperatures of between 800° C. and 1000° C., but with very short residence times of less than 3 minutes. Under these conditions there is incomplete decomposition of the calcium carbonate and hard glassy silicate minerals may be formed. The incomplete decomposition is probably due to an insufficient time for the adequate transfer of heat into the middle of large agglomerates. Some of the calcium oxide formed immediately reacts with the kaolin and this further depletes the amount of free calcium oxide left in the ash. In addition, some carbon may still remain from the burning of the organic constituents.

Subsequent uses of the PSA include cement production, lightweight concrete blocks, land spreading and cattle bedding. However PSA has little or no value in these applications. The remaining PSA has traditionally gone to landfill, but increasingly this option is discouraged owing to the free lime (CaO) content of some PSA. Similarly, some PSA is unsuitable for use in blended structural concrete due to the free lime content which will react with atmospheric carbon dioxide so weakening the concrete matrix over a period of time.

There has been an incentive in recent years to produce and/or recover potentially useful materials from the paper sludge or ash produced by incineration thereof. Separation of pure fillers from the carbon and/or hard silicate minerals in ash produced during any combustion conditions is extremely difficult. Likewise, addition of virgin materials to mask the detrimental effects of un-reacted carbon or hard silicate minerals has not been successful. In the prior art there are many patent specifications that describe processes for modifying the properties of DIR or PSA in such a way as to make the recycled fillers suitable for paper making, or for use in other industries.

U.S. Pat. No. 5,846,378 is concerned with removing the organic component while minimizing the decomposition of calcium carbonate to calcium oxide. In accordance with the process of U.S. Pat. No. 5,846,378, not more than 50% (and desirably not more than about 25% by weight) of the calcium carbonate is converted to calcium oxide. In this way the formation of hard minerals such as gehlenite is also minimized. A narrow temperature window is so specified whereby the fibres and ink bum off leaving a white inorganic fraction mainly consisting of calcium carbonate and metakaolin. Conditions are set to keep the temperature below 800° C. A two stage combustion process is proposed, in order to overcome localized exothermic heating as agglomerated fibers burn. The resultant ash is slaked and carbonated to convert any calcium oxide present to carbonate. This can be followed by intensive grinding to reduce the mineral particle size to that required for the paper making process. The product of this procedure, a mixture of calcium carbonate and metakaolin, has an ISO brightness in the range of 70-75%, which is significantly inferior compared to virgin calcium carbonate and kaolin and is unsuitable for most applications. The product of the procedure has a relatively high Einlenherwire abrasion, in the region of 30-70 mg.

A modification of this process is cited in U.S. Pat. No. 6,063,237 where further calcium hydroxide is added to the ash prior to carbonation making small improvements in brightness and abrasion. An example in the patent shows that half the product mass derives from this addition of fresh calcium hydroxide.

U.S. Pat. No. 7,300,539 describes a route where DIR is treated with dilute acid that reacts with the calcium carbonate to form calcium salts soluble in water. The calcium salt containing solution is removed from the insoluble fraction and calcium carbonate precipitated by the addition of sodium chloride or sodium hydroxide. The insoluble fraction containing the fibers and predominately kaolin is dried and incinerated at high temperatures to remove organic components and to produce calcined kaolin.

U.S. Pat. No. 5,868,829 relates to a combustion process specifically for the manufacture of a PSA containing a low amount of calcium oxide. Calcium oxide is known to have a detrimental effect on the long term strength of concrete as it will react with carbon dioxide to form calcium carbonate with an increased volume. The reduction of calcium oxide enables the pozzolanic properties of the metakaolin component to be utilized in concrete without the long term weakening of the concrete. This reduction is achieved by controlling the combustion temperature and introducing water into a second combustion chamber to convert the calcium oxide to hydroxide.

US Patent Publication No. 2005/0223950 discloses a method of treating a material comprising a pozzolanic component to produce a product with enhanced pozzolanic activity. The material to be treated may, for example, be a paper ash containing approximately 30% metakaolin as the pozzolanic component. The ash itself is preferably prepared by thermal treatment of a paper sludge in accordance with the procedure described in International Patent Application No. PCT/NL1995/000280 (equivalent to U.S. Pat. No. 5,868,829). The method of US Patent Publication No. 2005/0223950 for treating the pozzolanic material (e.g. paper ash) comprises treating the material with an aqueous liquid having a pH of less than 12.5 so as to extract calcium from the material and produce a calcium-enriched aqueous solution and a calcium-depleted solid residue, the latter being the product with enhanced pozzolanic effect. The aqueous liquid used in the treatment process may for example be water, but is more preferably an aqueous acidic solution (e.g. hydrochloric acid or acetic acid), optionally containing a chelating compound such as EDTA. The calcium enriched solution is separated from the solid residue which may be used with or without drying to prepare cement or concrete. It is disclosed that the calcium enriched aqueous solution may be treated with carbon dioxide to produce calcium carbonate but no details of the product quality are given.

Returning to the processing of paper wastes, more generally, U.S. Pat. No. 4,932,336 teaches a wet dewatered collected product of solids consisting predominately of cellulosic material (wood and cellulose fibers) and a residue, which consists predominately of plastic pieces separated from paper waste prior to recycling, that are recovered separately. The collected product is dried to a residual water content of no more than 25% by weight of the product, and continuously layered to form a continuously advancing layer. A layer of the residue is deposited on the product layer to form a continuously advancing two layer bed, which is burned while bottom blowing the two layer bed with a gas containing air. In this process, the product and residue are destroyed, a combustion gas is produced, and a slag is recovered. Fly ash produced in the process can be added to the slag to prevent its release into the environment, and the slag is either deposited in a landfill, or used in a structural material. The heat from the combustion gas can also be used as a heat source, especially for steam generation.

U.S. Pat. No. 5,018,459 discloses a method and apparatus for the recycling of paper pulp sludge produced as a waste material in the manufacture of paper, cardboard, and related materials. The paper pulp sludge is continuously fed into a rotary kiln at a temperature of between 800° F. and 3500° F. If the temperature is maintained above 2400° F., hazardous materials such as dioxins, formed in the incineration process, are destroyed. Mixing catalysts, typically casein or soy protein, and wood pulp fibers are burned with the paper pulp sludge. The resulting incinerated product, consisting essentially of carbonate particles, can be used as a mineral filler binding agent in the manufacture of asphalt, asphalt coatings and sealants, ceramics, concrete, cement pipe, clay pipe, structural block, and brick, or as an absorbent for spilled oil. In U.S. Pat. No. 5,054,406, 15 to 25% by weight of the product of the incineration of paper pulp sludge is mixed with earthen clay to form a water retardant material that is used to cover and seal landfills.

U.S. Pat. No. 4,769,149 discloses a method for the recovery of energy from waste and residues comprising bacterial digestion of the paper waste followed by incineration, wherein the methane gas produced during the bacterial digestion is used to heat the furnace. The heat released in the combustion process can then be used in an industrial process where it is required.

European Patent Application No. 0 604 095 discloses a process for treating a dilute aqueous suspension of particulate waste material, such as the material found in paper mill effluent. Kaolin clays are exemplified as typical waste materials. The process comprises precipitating an alkaline earth metal carbonate, for example calcium carbonate, in the aqueous suspension of particulate material, such that the particulate material present at the start of the process becomes entrained in the alkaline earth metal carbonate precipitate. FIG. 1 of European Patent Application No. 0 604 095 shows a scanning electron micrograph of flat "platy" kaolinite particles entrained in aggregations of precipitated calcium carbonate particles. The resulting agglomeration of calcium carbonate and entrained clay particles can be used as a paper filler or pigment.

With Regard to Aqueous Waste Streams—

With regard to the aqueous waste streams, the present invention is applicable to a wide variety of aqueous waste streams, such as, for example, municipal wastewater, industrial wastewater, and contaminated open-, flowing-, or collected water. These aqueous waste streams may derive from various sources, and may have various stages of preliminary processing. Further, these aqueous waste streams may be associated with the PC or PI waste streams, or the aqueous waste streams may be independent from the post-consumer streams in source, composition, location, etc. As a non-limiting example, the aqueous waste streams may be municipal or agriculture wastewater contaminated with phosphates, nitrates, heavy metals, and/or various other organic and inorganic solutes or particulates.

As urban centers and municipalities continue to experience population growth, new housing developments are constructed, and rural households switch from septic systems to public sewers, pressure on existing centralized water systems and water treatment plant infrastructure will continue to grow. Wastewater removal and treatment is critical to protect public health. Wastewater treatment processes improve water quality by reducing toxins that cause harm to humans and pollute rivers, lakes, and oceans. Wastewater enters the treatment system from households, business, and industry through public sewer lines and, in many places across the country, storm water drains. Wastewater treatment is typically overseen by a community utility or public works department that ensures water quality standards are met before the treated water is discharged back into the environment.

Storm water, such as runoff from rain or snow melt, also requires collection and treatment infrastructure. Often times, wastewater and storm water drain into the same water treatment system. These combined sewer systems can experience capacity issues following heavy rain events, resulting in overflows containing storm water as well as untreated human and industrial waste, toxic substances, debris, and other pollutants. Called combined sewer overflows (CSOs), these occurrences can significantly impair water quality and impact public health and wildlife. After non-point source pollution, for example agricultural runoff and storm water, CSOs are a leading source of water pollution in the US. The problem is exacerbated when communities have large amounts of impervious surfaces, such as concrete sidewalks, roads, parking lots, and traditional roofs, that increase the amount of runoff entering the storm water system.

With Regard to Runoff and Pollution, for Example, Phosphates and Nitrates, as Waste Streams The increasing accumulation of phosphates and nitrates discharged into the environment from agricultural, storm water run-off, wastewater treatment discharge, and other sources, is one of the most significant environmental challenges facing the planet. Controlling phosphate discharged from municipal and industrial wastewater treatment plants is a key factor in preventing eutrophication of surface waters. Municipal wastewaters may contain from 5 to 20 mg/L of total phosphates, of which 1-5 mg/L is organic and the rest is in inorganic form. Orthophosphates are available for biological metabolism without further breakdown. Polyphosphates are molecules with 2 or more phosphorous atoms, oxygen and in some cases hydrogen atoms that combine in a complex molecule. Usually, polyphosphates undergo hydrolysis and revert to the orthophosphate forms. This process is usually quite slow.

Elevated phosphate levels in surface waters leads to eutrophication, which is detrimental to aquatic life. To control eutrophication, the EPA recommends that total phosphates should not exceed 0.05 mg/L in a stream at a point where it enters a lake or reservoir, and total phosphates should not exceed 0.1 mg/L in streams that do not discharge directly into lakes or reservoirs. To date, phosphate removal has been accomplished with flocculation/precipitation methods that use metal salts such as ferric chloride, aluminum sulfate (alum) and calcium hydroxide (lime). In many cases, these methods require the use of polymers to enhance the precipitation and ultimate solid removal.

Various methods have been detailed that utilize naturally occurring and synthesized forms of xonotlite and/or tobermorite to remove phosphates. These materials are restricted by pH of the solution, as increasing pH causes bicarbonate ions to convert to carbonate ions, reducing the efficiency of removal. Another method of phosphate removal is the chemical formation of struvite (ammonium magnesium phosphate hexahydrate). This process requires the introduction of a magnesium source, typically magnesium hydroxide, and is dependent on a high ammonia level as the ammonium source. Additionally, another method of phosphate removal involves chemical treatments for removal comprising the addition of metal salts to react with soluble phosphate to form solid precipitates that are removed by solids separation processes including clarification and filtration. The most common metal salts used are alum (aluminum sulfate or sodium aluminate) or calcium (lime) or ferric chloride/ferric sulfate/ferrous chloride.

For alum, alum or hydrated aluminum sulphate is widely used for precipitating phosphates and aluminum phosphates ($AlPO_4$). The basic reaction is represented by the following Formula 3:

$$Al_3+ + H_nPO_{4(3-n)} <=> AlPO_4 + nH+ \quad (3)$$

The dosage rate required is a function of the phosphate removal required. The efficiency of coagulation falls as the concentration of phosphate decreases. In practice, an 80-90% removal rate is achieved at coagulant dosage rates between 50 and 200 mg/L.

For lime, calcium is usually added in the form of $Ca(OH)_2$. It reacts with the natural alkalinity in the wastewater to produce calcium carbonate, which is primarily responsible for enhancing SS removal. As the pH value of the wastewater increases beyond about 10, excess calcium ions will then react with the phosphate, to precipitate in hydroxylapatite. Because the reaction is between the lime and the alkalinity of the wastewater, the quantity required will be, in general, independent of the amount of phosphate present. It will depend primarily on the alkalinity of the wastewater. The lime dose required can be approximated at 1.5 times the alkalinity as $CaCO_3$. Neutralization may be required to reduce pH before subsequent treatment or disposal. Recarbonation with carbon dioxide is used to lower the pH value.

For iron salts, the ferric chloride or sulphate and ferrous sulphate are all widely used for phosphate removal, although the actual reactions are not fully understood. The basic reaction is represented by the following Formula 4:

$$Fe3+ + H_nPO_{4(3-n)} <=> FePO_4 + nH+ \quad (4)$$

Ferric ions combine to form ferric phosphate. They react slowly with the natural alkalinity and so a coagulant aid, such as lime, if added, would raise the pH and enhance the coagulation.

In general, for phosphate treatment in wastewater, the required chemical dose is related to the liquid phosphate concentration. For target concentrations above 2 mg/L (appropriate for chemical addition to a primary clarifier), a dose of 1.0 mole of aluminum or iron per mole of phosphate is sufficient. For lower phosphate concentrations in the range of 0.3-1.0 mg/L, the does can be in the range of 1.2 to 4.0 moles aluminum or iron per mole of phosphate. The pH value is an important factor for efficient removal of phosphate using alum or other salts, as the solubility of their precipitates vary with pH. Phosphate removal is most efficient in the pH range of 5 to 7 for alum and of 6.5 to 7.5 for ferric salts.

As such, with regard to chemical dose determinations, the most important component of a control strategy for chemical phosphate removal is the calculation of coagulant dosage. Dosage rates for aluminum salts or for ion salts are based on the molar ratio of available metal ions to phosphate. Theoretically, to remove 1 mg/L of phosphates, you need 9.6 mg/L of alum or 5.2 mg/L of ferric chloride. In real life conditions, the requirement is 0.5 to 15 times as much.

Further, proper control is difficult to achieve for chemical dose determinations dealing with phosphate removal. There are several reasons for this difficulty. The incoming phosphate concentrations can vary in unpredictable ways as a result of industrial contributions. Incoming phosphate concentration is rarely in proportion to flow. Conversion of polyphosphate to orthophosphate prior to coagulant addition will affect coagulation efficiency. Process conditions, particularly pH and temperature, can significantly influence polyphosphate conversion. If reclaimed products are used as a coagulant, the concentration of available metal ions will also be variable. This will result in a highly variable phosphate coagulation rate and, in the absence of on-line monitoring, will require frequent manual adjustments to avoid overfeed or underfeed. Additionally, insufficient coagulant dosages can produce an effluent with excessive turbidity, but excessive coagulants dosage can also produce the same results. Surplus coagulants also may have an adverse effect on disinfection processes, by exerting an oxidation demand.

Nitrates are also of concern as increased levels in surface water and groundwater lead to undesirable levels in drinking water supplies. The current drinking water nitrate limit is 10 mg/L as nitrate.

Storage and degradation of wastewater containing protein or amino acids results in the formation of ammonia. Ammonia can be released into streams and rivers and thereby threaten aquatic life. Ammonia gas may also be discharged to the atmosphere from holding ponds or treatment facilities, resulting in environmental and public health concerns. Atmospheric ammonia forms small aerosol particles that have been linked to significant public health problems.

Normally, ammonia is removed from water through aerobic processes, such as nitrification followed by denitrification. Nitrification and denitrification can remove a very high percentage of the ammonia. Through such processes, ammonia is returned to the atmosphere as nitrogen gas. However, the nitrification and denitrification processes produce nitrous oxide, a greenhouse gas.

The processes of denitrification also results in a lost opportunity to recover nitrogen that can be used as compost or fertilizer. Typically, ammonia fertilizer is made through the combustion of natural gas with air, which is known as the Haber process. Creation of ammonia fertilizer via this route is expensive, and produces carbon dioxide. Carbon dioxide is also a greenhouse gas.

Nitrate removal has most often been accomplished via microbiological denitrification. This process requires the availability of denitrifying bacteria in a reduced oxygen environment. The bacteria metabolize the nitrate resulting in reduction to nitrite and ultimately nitrogen gas. More specifically, denitrification is a microbially facilitated process of nitrate reduction that may ultimately produce molecular nitrogen ($N_2$) through a series of intermediate gaseous nitrogen oxide products. This respiratory process reduces oxidized forms of nitrogen in response to the oxidation of an electron donor such as organic matter. The preferred nitrogen electron acceptors in order of most to least thermodynamically favor able include nitrate ($NO_3-$), nitrite ($NO_2-$), nitric oxide (NO), and nitrous oxide ($N_2O$). In terms of the general nitrogen cycle, denitrification completes the cycle by returning $N_2$ to the atmosphere. The process is performed primarily by heterotrophic bacteria, such as *Paracoccus denitrificans* and various pseudomonads, although autotrophic denitrifiers have also been identified, such as *Thiobacillus denitrificans*. Denitrifiers are represented in all main phylogenetic groups. Generally several species of bacteria are involved in the complete reduction of nitrate to molecular nitrogen, and more than one enzymatic pathway has been identified in the reduction process.

Direct reduction from nitrate to ammonium, a process known as dissimilatory nitrate reduction to ammonium or DNRA, is also possible for organisms that have the nrf-gene. This is less common than denitrification in most ecosystems as a means of nitrate reduction. Other genes known in microorganisms which denitrify include nir (nitrite reductase) and nos (nitrous oxide reductase) among others; organisms identified as having these genes include *Alcaligenes faecalis, Alcaligenes xylosoxidans*, many in the *Pseudomonas* genus, *Bradyrhizobium japonicum*, and *Blastobacter denitrificans*.

Denitrification usually takes place under special conditions in both terrestrial and marine ecosystems. In general, it occurs where oxygen, a more energetically favorable electron acceptor, is depleted, and bacteria respire nitrate as a substitute terminal electron acceptor. Due to the high concentration of oxygen in our atmosphere, denitrification usually takes place in environments where oxygen consumption exceeds the rate of oxygen supply, such as in some soils and groundwater, wetlands, poorly ventilated corners of the ocean, and in seafloor sediments.

Denitrification generally proceeds through some combination of the following intermediate forms represented by the following Formula 5:

$$NO_3- \Rightarrow NO_2- \Rightarrow NO+N_2O \Rightarrow N_2(g) \quad (5)$$

The complete denitrification process can be expressed as a redox reaction represented by the following Formula 6:

$$2NO_3-10e-+12H+ \Rightarrow N_2+6H_2O \quad (6)$$

Reduction under anoxic conditions can also occur through a process called anaerobic ammonia oxidation (anammox) represented by the following Formula 7:

$$NH_4+NO_2- \Rightarrow N_2+2H_2O \quad (7)$$

In recent years, to accelerate denitrification, it was considered necessary to continually supply growth nutrients for denitrifying bacteria. In some wastewater treatment plants, small amounts of methanol, ethanol, acetate, or proprietary products like MicroCg or MicroCglycerin were added to the wastewater to provide a carbon source for the denitrification bacteria. Methanol ($CH_3OH$) also served as a carbon source for bacterial microbes. Accelerated by the addition of methanol, anaerobic bacteria would convert the nitrate to nitrogen gas, which would then be vented into the atmosphere.

Today, wastewater treatment plants around the US are using methanol, ethanol, and acetate, etc. in their denitrification process. For example, methanol denitrification helped to reduce the usual number of tons per day, in some instances to half its original nitrogen discharge. Unfortunately, methanol, ethanol, and acetate are expensive. For example, in some non-limiting examples, methanol denitrification costs about $0.50 to $0.60 per pound of nitrogen removed (and that is without adjustments for inflation). Further, and from a different point of view, potable water supplies are also typically treated with an anion exchange process to at least reduce the nitrate levels. During some point in an ion exchange process, it is necessary to regenerate the anion exchange resins by washing with a regenerant. This is typically achieved by using a single pass of concentrated brine, i.e., water that is nearly saturated with salts, through the resin columns of the ion exchange process. Sodium chloride (NaCl) brine is most often utilized due to its low cost.

Unfortunately, the advantages of using NaCl brine are offset by the high cost of disposal of the resulting waste brine, which contains nitrate and chloride ions. If a method could be found to remove the nitrate ion relative to the chloride ion, then the waste brine could be reused as a regenerant.

One of the most widely used methods of removing nitrate ion from waste brine, biological denitrification, suffers from several drawbacks associated with the use of living organisms. These drawbacks include undesirable dilutions to avoid high ionic strength problems with microorganisms, difficulties in maintaining a viable culture of bacteria, high cost of chemicals to maintain the bacterial culture, and unpredictable reaction rates. The method also utilizes relatively large equipment. In addition, the use of bacterial cultures can result in contamination of drinking water.

Another method of removing nitrate ion from waste brine is biological recycling. Like biological denitrification, this method also suffers from the drawbacks associated with maintaining living organisms. These drawbacks include high nutrient costs to keep the bacterial culture alive, possible contamination to drinking water, and slow and/or unpredictable reaction rates. In addition, because the waste brine must be diluted to allow the microorganisms to denitrify it, the process requires the additional time-consuming step of reconcentrating the brine to regenerate the exchangers.

Pursuant to the foregoing, it may be regarded as an object of the present invention to overcome the deficiencies of, and provide for improvements in, the state of the prior art as described above, and as may be inherent in the same, or as may be known to those skilled in the art. It is a further object of the present invention to provide a process and any necessary apparatus for carrying out the same, and of the foregoing character, and in accordance with the above objects, which may be readily carried out, with and within the process, and with comparatively simple equipment, and with relatively simple engineering requirements. Still further objects may be recognized and become apparent upon consideration of the following specification, taken as a whole, in conjunction with the appended drawings and claims, wherein by way of illustration and example, an embodiment of the present invention is disclosed.

As used herein, any reference to an object of the present invention should be understood to refer to solutions and advantages of the present invention, which flow from its conception and reduction to practice, and not to any a priori or prior art conception.

The above and other objects of the present invention are realized and the limitations of the prior art are overcome in the present invention by providing new and improved methods, process, and systems. A better understanding of the principles and details of the present invention will be evident from the following description taken in conjunction with the appended drawings.

BRIEF SUMMARY OF THE INVENTION

The present invention is directed to a system for, and a method of, sustainable (1) waste management, (2) post-consumer (PC) or post-industrial (PI) product management, and (3) water management. Additionally, the present invention is directed to a system for, and a method of, (4) sustainably producing a multipurpose, chemical precursor, platform, or active-ingredient, and/or (5) sustainably utilizing the precursor, platform, or active-ingredient, as an intermediate, for at least the sustainable production of a final PC or PI product and/or the sustainable recovery of valuable residues or contaminants from a wide variety of waste streams, whereby any produced chemical precursor, platform, and/or PC or PI product is economically-efficient and valuable to domestic, municipal, agricultural, and commercial users. Additionally, the present invention is directed to a system for, and a method of, (6) open water treatment for lakes, reservoirs, oceans, rivers, ponds, and streams, as well as various other open water applications.

More specifically, the present invention is directed to a system for, and a method of, sustainably utilizing PC or PI waste streams and/or aqueous waste streams that, in certain embodiments, comprise: (a) exothermic processing waste streams having at least about 15.0%-20% inorganics and at least about 20.0% organics (hydrous or anhydrous) and defined by an energy value element of at least about 2000.0 BTUs/lb., and (b) alkaline, acidic, or neutral municipal aqueous wastewaters—having phosphates and nitrates and/or heavy metal concentrations.

The PC or PI exothermic processing wastes may be derived from a paper-recycling processing source (paper mill sludge, deinking sludge, or DIR, for example), or a carpet-processing source (carpet third stream, for example). Additionally, the PC or PI exothermic processing wastes may have various stages of preliminary processing prior to becoming an "input" for the inventive concept described herein.

Further, the municipal wastewaters may be entirely independent (in terms of source, location, etc.) from the PC or PI exothermic processing waste streams. The municipal wastewaters also may be derived from a municipal water treatment source. Additionally, the municipal wastewaters may have various stages of preliminary processing—to remove biological particulates and non-biological debris, for example—prior to becoming an "input" for the inventive concept described herein. The municipal wastewaters, however, does not require any pH adjustment, prior to becoming an "input" for the inventive concept, or after becoming an "input", in order for the inventive concept to operate as intended.

Further, and related to the preceding, the system and method of the present invention is also directed to producing and/or reducing the fresh inputs necessary for waste stream processing, and related to reducing the non-useful, or potentially toxic, outputs from waste stream processing. In certain exemplary embodiments, like those dealing with paper or carpet exothermic processing waste streams and municipal wastewaters, for example, the inventive concept described herein achieves sustainable elimination of pollution streams that, even when recycled or otherwise treated as taught in the prior art, currently produce (1) residues, (2) new wastes or pollutants, and/or (3) secondary waste or pollution streams.

In one exemplary embodiment, the system and method of the present invention efficiently and effectively consumes the substantial majority of the paper or carpet exothermic processing waste stream, with limited emissions, bi-products, and/or residues that cannot be captured, filtered, and/or reused or recycled. Further, the system and method of the present invention also efficiently and effectively produces a composite, ionic chemical precursor or platform, for example, from the consumption of the paper or carpet exothermic processing waste stream, and for the secondary (and possibly entirely independent) production of various useful and economically valuable PC or PI products. The post-consumer products derived from the precursor may take the form of meta-kaolin, halloysite, pozzolans, soil additives, building materials, pigments, and fillers, and may, by virtue of the efficient and effective preparation of the precursor itself, be more economically-efficient to manufacture than to mine, leach, or harvest a similar product.

The system and process of the present invention also efficiently and effectively treats and decontaminates the municipal wastewater, with limited bi-products and/or residues that cannot be captured, filtered, and/or reused or recycled, and with limited quantities of new or fresh waste stream processing materials or reagents. Further, the system and process of the present invention efficiently and effectively treats and decontaminates the municipal wastewater without need for any secondary pH adjustment treatment steps; instead, benefiting from an inherent, built-in feature that raises the pH to above about 10, as required for efficient contaminant removal/precipitation.

In fact, for certain exemplary embodiments, the outputs of the front end—the end dealing with paper or carpet waste stream processing, for example—may be used as PC recycled inputs or active-ingredients for the back end of the inventive concept—the end dealing with the processing of wastewaters, for example. In other exemplary embodiments, the outputs of the front end may be used as PC recycled inputs for the inventive concept itself—whether the front end and/or the back end. Additionally, the outputs of the front end may be used as PC recycled inputs for another, entirely separate, process; a process that would otherwise use fresh inputs or comparatively unsustainable inputs, which is evidenced by the described production of the multipurpose chemical precursor or platform, which also may happen to be useful as the input or intermediary for the production of an entirely independent end-product. In other exemplary embodiments, the outputs of the back end of the inventive concept may be used as PC recycled inputs for the inventive concept itself, or may be used as post-consumer or recycled inputs for another, entirely separate, process. Again, a process that would otherwise use fresh inputs or comparatively unsustainable inputs.

Said another way, as a non-limiting example, the outputs of the inventive concept itself may be (1) energy, (2) fresh or decontaminated water, (3) the active ingredients for sustainable waste stream processing of various sorts (e.g., treatment materials, chemical reagents, additives, capture materials, collectors, precipitation agents, and carriers), (4) multipurpose chemical precursors or platforms for the production of various unrelated PC or PI products, and/or (5) sustainably-sourced compositions, produced directly out of the inventive concept itself, for use in various other applications (e.g., sustainable post-consumer products like chemical fertilizers, soil additives, building materials, pozzolans, pigments, and fillers, with the caveat that these categories also are representative of the PC or PI products that may be derived from the chemical precursors or platforms by independent third-parties). As such, the inventive concept described herein, for these exemplary embodiments, is laden with layers of recycling and reuse from which the inventive concept derives its efficiencies and efficacies over the prior art.

More specifically, in one exemplary embodiment dealing with paper or carpet waste stream processing and wastewater processing, the outputs of the sludge processing portion of the inventive concept embodiment are (1) a composite ash, geopolymer precursor, or capture platform reactive with a pH greater than about 7.0, and (2) free energy for recovery-and-application to the grid, or for recycling into the sludge processing portion. The composite ash is primarily a mineral product or oxidized material of crystalline composition comprising mineral oxides, and/or mineral carbonates—whether converted or partially converted—and metakaolin. The composite ash being catalyzed via oxidation and/or combustion. Specific crystalline structure may be altered through composition variation and/or temperature and/or pressure variations. Spatial orientation of the atoms within the molecules may be altered resulting in changes in bond lengths and/or bond angle.

The composite ash may also be considered a binary composite, containing both calcium components of about 60.0% and meta-kaolin components of about 30.0%. The composite ash may exhibit unique and synergistic molecular attraction forces, including chemical bonding and adsorption (chemisorption) forces, which are magnified when compared to the individual components of the composite ash. The composite ash may be manipulated, via control of the necessary inputs, the necessary methodology, and the necessary equipment and systems, in ways to make it adsorb, capture, and/or bind various cations and anions efficiently and effectively.

In this way, for the wastewater processing portion of the inventive concept and, as is more fully described herein, the composite ash may be used as a post-consumer product or input for the inventive concept itself—whether in feedback with the front end and/or as a direct input—and as a substitute for less sustainable materials and chemical reagents. Additionally, the composite ash may be used as a post-consumer treatment material, chemical reagent, building material, filler, etc. for another, entirely separate system or process.

Further, the output of the wastewater processing portion of the inventive concept embodiment are (1) a precipitated composition that, when in solution with wastewaters, chemically binds or traps phosphates and nitrates and heavy metals, and (2) a decontaminated water stream for recovery and application to the grid, or for recycling into the sludge processing portion and/or the wastewater processing portion of the inventive concept. In this way, for sustainably carrying and applying the trapped phosphates and nitrates, and as is more fully described below, the precipitated composition may be used as a post-consumer product, and substitute for less sustainable comparable materials.

More specifically, in one exemplary embodiment dealing with paper or carpet waste stream processing and municipal wastewater processing, the composite ash output of the sludge processing portion is configured as a collector and/or precipitation agent ideally suited for the collection and removal of phosphates and nitrates from aqeuous wastewaters. The composite ash may have a significant calcium carbonate and meta-kaolin component and, optionally, depending on the waste stream source type, may have aluminum oxide and iron oxide components as well. As such, the multivalent metal ions operate as additional precipitation agents in this composite ash embodiment.

Further, the meta-kaolin component, alongside the multivalent metal ions, may act as a primary collector, as the reactivity and surface area of meta-kaolin create a double-layer surface attraction to specific phosphate and nitrate ion species in aqueous solution. In this way, and as is described in greater detail herein, the collection and precipitation synergy between the meta-kaolin and the metal ions, specifically but not limited to certain metal oxides, may drive the phosphate and nitrate separation in the wastewater treatment processing portion of the inventive concept.

In certain embodiments, the separation may reach efficiencies of over 88%. For example, results have been obtained of about 98.4% removal of phosphates from a 5.0 mg/L concentration solution at a quantity of 200 mL, of about 97.25% removal of phosphates from a 20.0 mg/L concentration solution at a quantity of 200 mL, of about 93.2% removal of phosphates from a 1.46 mg/L concentration solution at a quantity of 300 mL, of about 90.4% removal of phosphates from a 1.25 mg/L concentration solution at a quantity of 80 L, of about 88.09% removal of phosphates from a 4.2 mg/L concentration solution at a quantity of 1 L, and of about 93.6% removal of phosphates from a 14.0 mg/L concentration solution at a quantity of 1 L.

Similarly, in terms of nitrates, the separation may reach efficiencies of over 65%. For example, results have been obtained of about 67.6% removal of nitrates from a 3.4 mg/L concentration solution at a quantity of 200 mL, of about 70.6% removal of nitrates from a 3.4 mg/L concentration solution at a quantity of 200 mL, of about 73.5% removal of nitrates from a 3.4 mg/L concentration solution at a quantity of 200 mL, of about 89.7% removal of nitrates from a 2.43 mg/L concentration solution at a quantity of 200 mL, of about 95.1% removal of nitrates from a 2.43 mg/L concentration solution at a quantity of 200 mL, and of about 93.0% removal of nitrates from a 2.43 mg/L concentration solution at a quantity of 200 mL.

Further, and related to the preceding, the system and method of the present invention is also related to administering and positioning the assets and processes associated with the waste stream processing described herein. At the broadest levels, this may involve scheduling operations and strategically positioning operations for sub-systems of the system as is described in greater detail herein.

Further, the composite ash, in accordance with the present invention, may be utilized in a variety of practical applications or systems and/or practical implementations. In one simple embodiment, the composite ash is utilized within a system wherein the composite ash is contacted with an aqueous solution containing phosphates, nitrates, heavy metals, and/or other contaminants in a reaction chamber that is designed to speed the rate of contact using centrifugal force. In a related embodiment, the reactor uses a Taylor vortex system operated under laminar flow conditions. In a system arranged in this manner, the reactor fluid dynamics are such that the unique vortex effect causes several layers of donut shaped levels of water spinning vertically through the donut hole and horizontally along the circumference of the reactor. Centrifugal force causes the crystalline composition and any other solutes to concentrate along the inner face of the reactor, increasing contact exposure and significantly reducing reaction time, and improving adsorption efficiency. In another embodiment, the composite ash is contacted with an aqueous solution containing phosphates, nitrates, heavy metals, and/or other contaminants by way of a dry feed or slurry mix into the final processing stream, such as, for example, wastewater final treatment (WWTP—municipal or food processors). In another embodiment, a composition is contacted with an aqueous solution containing phosphates, nitrates, heavy metals, and/or other contaminants by way of high concentration nutrient removal and filtration systems as is understood in the art.

In another embodiment, the composite ash in a slurry or liquid form is contacted with an aqueous solution containing phosphates, nitrates, heavy metals, and/or other contaminants by way of a direct portion injector. For example, the embodiment can be for use with a urinal or toilet or direct-at-the-source of the contamination.

In another embodiment, the composite ash is contacted with an aqueous solution containing phosphates, nitrates, heavy metals, and/or other contaminants by way of dry or slurry broadcast or crop dusting, such as, for example, on the ground or on a surface water body. The crystalline composition can be spread over lakes and ponds, for example, by way of a barge, to adsorb and bind to nutrients, and to cause a precipitation that can be recovered and ecologically-managed. The crystalline composition can also be mixed directly into soils.

In another embodiment, the composite ash is contacted with an aqueous solution containing phosphates, nitrates, heavy metals, and/or other contaminants by way of a buried barrier. An exemplary barrier is a sheet comprising the composition buried below the surface of an animal farm or park or used to capture aquarium filtrate for removing phosphates within the aquarium.

More specifically, for more complex embodiments, a system embodying the inventive concept may comprise a multipurpose and special purpose machine or system that, in certain embodiments, is spread out over a vast, operational network. The operational network may link various sub-process stations or locations that are intended to handle specific portions of the inventive method or process described herein. For example, the front-end portion of the inventive concept and/or the back-end portion of the inventive concept and/or the independent-but-related processes involving the multipurpose chemical precursors/platform produced by the inventive concept. Each sub-process station or location may handle one type of waste stream processing while another handles a different type of waste stream processing.

For example, in certain exemplary embodiments, one sub-process station or location may handle the carpet or deinking sludge waste processing while another sub-process station or location may handle the wastewater processing, while another sub-process station or location may handle the production of independent PC or PI products from the chemical precursors or platform. The sub-process stations or locations may be regional, in the sense that the sub-systems and equipment responsible for the production of the composite ash, may be situated in proximity (i.e., within 50 miles, for example) to high-concentration DIR processing centers, and within a similar proximity to independent wastewater processing centers. The regional centers may be greenfield, or hosted by a strategic DIR processing partner, which subsequently facilitates secondary-servicing to nearby, independent DIR processors. The sub-process station or locations also may be integrated, in the sense that the sub-systems and equipment responsible for the production of the composite ash, may be fully integrated into the operations and infrastructure of a high-concentration DIR processing center. The integration model may go a step further by also facilitating even further integration, wherein the high-concentration DIR processing center, with integrated composite ash and chemical precursor operations, is also fully integrated with the municipal waste water processing operations. This implies cooperative and coordinated operations-managements and a sharing of physical space, land, equipment, technical personnel, and/or management.

It is also envisioned that certain sub-process stations or locations may be entirely separate, in term of locations and operations, while others may be adaptable and movable to have the same location and operations infrastructure (at least partially) as another sub-process station/location, as needed or as required. In the most general sense, the network links may interconnect, via supply chains and continuous or interdependent processes, for example, various stages of the waste stream processing and, by so doing, create efficiencies and efficacious practices in comparison to the prior art.

Finally, and more specifically, in one exemplary embodiment, dealing with paper or carpet waste stream processing and wastewater processing, the system and method of the present disclosure is directed to:

processing a paper or carpet exothermic waste stream;

reducing the output waste from the processing by, for example;

producing energy from the processing;

recovering minerals from the waste; and producing active ingredients for waste stream processing, including preparing and collecting a composite ash, comprising calcium oxide, partially converted calcium carbonate, and meta-kaolin, including their common and amorphous crystalline structures, as a morphological and/or chemical capture platform, etc.;

processing wastewater and producing a cleaned and purified water output;

preparing and collecting the excess composite ash as a geopolymer precursor, from the post-consumer waste, for the preparation of a post-industrial or post-consumer product;

reducing the output waste from the processing of the wastewater, for example by;

removing phosphates and nitrates and/or heavy metals and other contaminants from the wastewater; and collecting and processing any precipitated phosphate-rich compounds, nitrate-rich compounds, and/or the resulting composite-ash end-product, after it has captured or bonded with the phosphates, nitrates, and/or heavy metals, as a post-industrial or post-consumer product, etc.;

administering and positioning the assets and processes associated with the waste stream processing, for example by;

coordinating, including strategically positioning and situating, the system, sub-systems, and equipment associated with any reduction of the output waste from the processing of paper or carpet exothermic waste stream;

establishing and maintaining a grid for the introduction of the produced-energy, including looping the energy back into the overall system of the present invention;

coordinating, including strategically positioning and situating, the system, sub-systems, and equipment associated with any production of the active ingredient or composite ash for the waste stream processing;

coordinating, including strategically positioning and situating, the system, sub-systems, and equipment associated with any processing of the wastewater and/or any production of the clean water output;

establishing and maintaining a grid for the introduction of the produced-clean water output, including looping the clean water back into the overall system of the present invention;

coordinating, including strategically positioning and situating, the system, sub-systems, and equipment associated with any collection of the excess composite ash or geopolymer precursor, and/or any utilization of the excess composite ash to form a final PC or PI agricultural fertilizer product;

coordinating, including strategically positioning and situating, the system, sub-systems, and equipment associated with any reduction, collection, or capturing of phosphates, nitrates, and/or heavy metals, and other contaminants, from the wastewater, and/or any collection and processing of any precipitated phosphate-rich compounds or nitrate-rich compounds; and scheduling operations for sub-systems of the overall system such that the process are performed in conjunction, and with the purpose of facilitating efficiencies, amongst the various components of the inventive concept described herein.

BRIEF DESCRIPTION OF THE DRAWINGS

In the figures, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

FIGS. 19-30 illustrate some of the experimental results obtained for Example 25 in Chart form.

Figure 1:
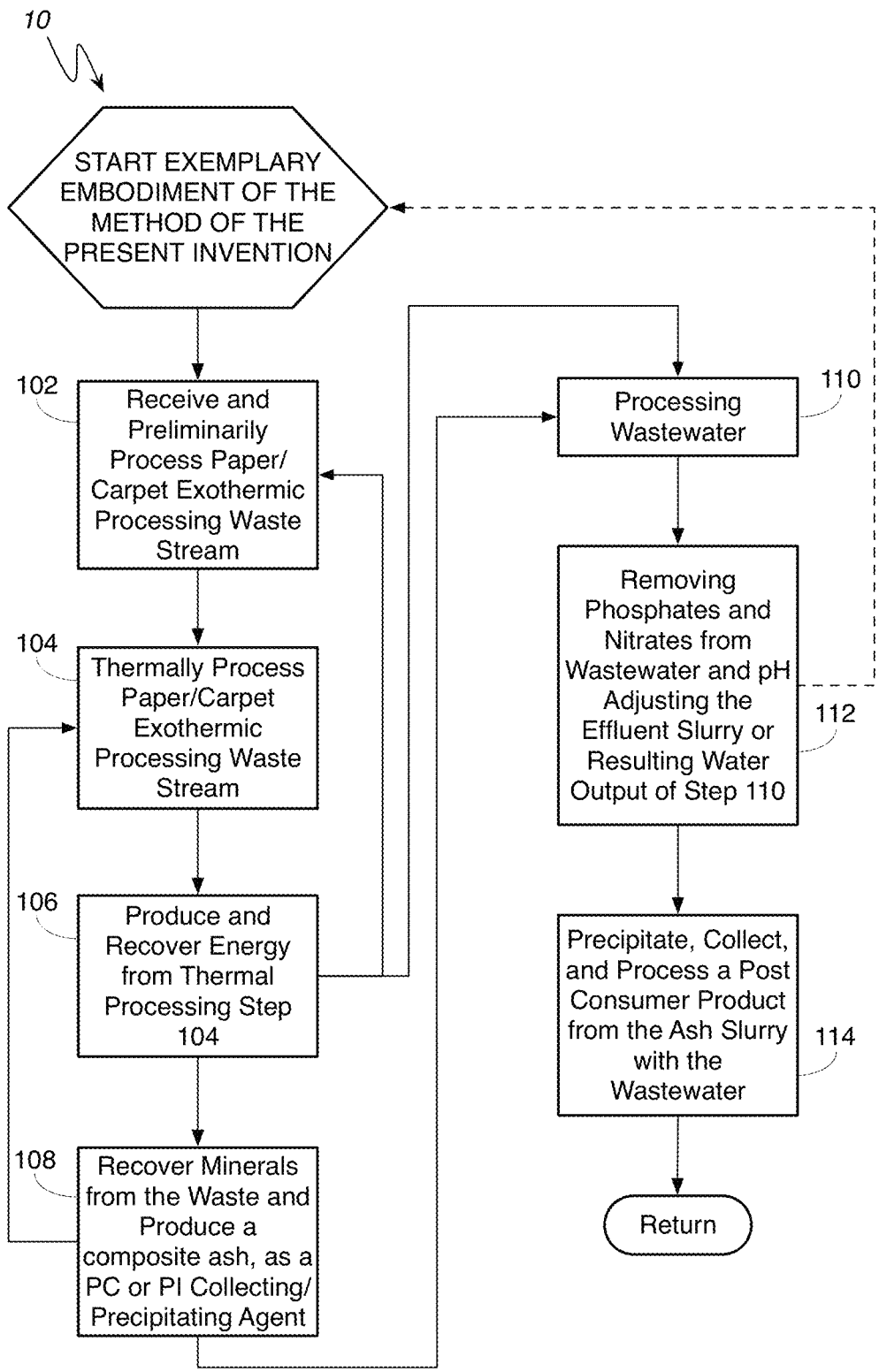
FIG. 1 is a schematic flow diagram showing the steps of an illustrative embodiment of the present invention, not all of which steps are necessarily employed in each and every situation.

The drawings constitute a part of this specification and include exemplary embodiments of the present invention, which may be embodied in various forms. It is to be understood that in some instances various aspects of the invention may be shown as exaggerated, reduced, enlarged, or otherwise distorted to facilitate an understanding of the present invention. In the drawings, like elements are given the same or analogous references when convenient or helpful for clarity. The same or analogous reference to these elements will be made in the body of the specification, but other names and terminology may also be employed to further explain the present invention.

DETAILED DESCRIPTION OF PREFERRED EMBODIMENTS

For a further understanding of the nature, function, and objects of the present invention, reference should now be made to the following detailed description taken in conjunction with the accompanying drawings. While detailed descriptions of the preferred embodiments are provided herein, as well as the best mode of carrying out and employing the present invention, it is to be understood that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure, or manner. The practice of the present invention is illustrated by the included Examples, which are deemed illustrative of both the process taught by the present invention and of the results yielded in accordance with the present invention.

An exemplary embodiment of the present invention provides a system for and a method of (1) sustainable waste management, (2) PC and PI product management, (3) water management, (4) sustainably producing a chemical precursor, platform, or active ingredient, (5) sustainably producing a PC or PI agricultural fertilizer product from an exothermic processing waste stream and a municipal aqueous wastewater stream, via, at least, the produced chemical precursor, platform, or active ingredient, and (6) open water treatment for lakes, reservoirs, oceans, rivers, ponds, and streams, as well as various other open water applications. An exemplary exothermic processing waste stream has at least about 15.0% inorganics and at least about 20.0% organics, hydrous and/or anhydrous. An exemplary exothermic processing waste stream also is defined by an energy value element of at least about 2000.0 BTUs/lb. Further, an exemplary exothermic processing waste stream is derived from a paper mill sludge or deinking sludge (DIR) and/or a carpet third stream.

More specifically, the paper mill sludge or deinking sludge or the carpet third stream processing waste stream, generally, may be characterized by the following information provided in Table 1.

TABLE 1

PAPER MILL SLUGE

Water . . . 40%-60%
Organics . . . cellulose fiber . . . 20%-40%
Inorganics . . . minerals and fillers . . . fly-ash, calcium carbonates, glass . . . 50%
Btu value . . . 2000-5000 btus/lb.
RECYCLED CARPET AND RECYCLED CARPET WASTE Organic polymers . . . 50%
Inorganics . . . minerals and fillers . . . kaolins and calcium carbonates . . . 15%-30%
Btu value . . . 8000-12000 btus/lb.
FLY ASH Organic . . . carbon . . . 1%-10%
Inorganics . . . minerals and oxides . . . 90%-99%
Btu value . . . 200-2000 btus/lb.

The information in Table 1 illustrates the chemical compositions and physical characteristics of each portion, segment, or flow of the exothermic waste streams, or blends thereof, to which this exemplary embodiment may pertain.

Separately, the municipal aqueous wastewater stream, relevant to this exemplary embodiment, has contamination from phosphates and nitrates, primarily, and is derived from a municipal water treatment source. The municipal wastewater stream, from the municipal water treatment source, or from any other intermediary entity, system, or process, which may preemptively process or prepare the waste water for future processing, for example, also is independent in terms of source, location, etc., from the paper mill sludge/deinking sludge or the carpet third stream processing waste stream previously described. In fact, it is a feature of the present invention, and a solution to a problem in the prior art, that the inventive concept is more efficiently and effectively practiced than the prior art.

A person of ordinary skill in the art understands that this embodiment is applicable to a wide variety of PC or PI waste streams and aqueous waste streams and wastewaters (e.g., agricultural run-off, retention ponds, animal farm run-off, animal park run-off, streams, lakes, canals, reservoirs, residential and commercial storm-water run-off, wastewater treatment plant discharge, food processing discharge, industrial wastewater discharge, residential wastewater discharge, meat processing residuals, toilet water, and aquarium water), regardless of source or type, so long as they have similar or equivalent defining characteristics, or similar chemical compositions, chemical interaction, and/or chemical processes. A person of ordinary skill in the art also understands that the paper mill sludge or deinking sludge or the carpet third stream processing waste stream may have various stages of preliminary processing (e.g., air drying of hydrous waste streams, physical shredding, de-lumping), and that the municipal aqueous wastewater stream may have various stages of preliminary processing (e.g., to remove biological particulates and non-biological debris), prior to becoming an "input" for this exemplary embodiment. Further, a person of ordinary skill in the art understands that, in the case of carpet third stream processing waste streams, or other similar or equivalent waste streams, no drying or dewatering is necessary. Further, a person of ordinary skill in the art understands that recent developments in the art (see the Prior Art Section for a more detailed explanation) has, to some extent, changed the expected composition of the relevant waste streams or wastewaters (i.e., changed some of the expected and commonly-used mineral additives for color and texture, for example), which may also change the expected results from applying seemingly common processes and methods to the relevant waste streams/wastewaters.

Returning, generally, to this exemplary embodiment, and with reference to a front-end grouping of processes and related systems, the paper mill sludge or deinking sludge or the carpet third stream processing waste stream has its latent energy liberated, separated, and/or recovered, and its minerals recycled and reused, as a function of controlled thermal reactions within a thermal reactor, that is, a rotary kiln, vertical kiln, calciner, flash calciner, etc. The front end of this exemplary embodiment provides a process in which the paper mill sludge or deinking sludge or the carpet third stream, with its constituent organics and mineral content, is subjected to thermal separation permitting energy recovery from the organics.

Next, with reference to a back-end grouping of processes and related systems, this exemplary embodiment also is directed generally to a system for, and method of, recycling and recovering phosphates or nitrates from the municipal wastewater stream. The municipal wastewater is independent and separately situated and sourced when compared to the paper mill sludge or deinking sludge, or the carpet third stream waste stream, and the municipal wastewater may be alkaline, acidic, or neutral as it leaves the source and enters the inventive concept described herein. As is briefly mentioned above, and as is described in greater detail herein, this exemplary embodiment also discloses a method for evaluation, and preparation, of a useful and economically valuable, PC or PI agricultural fertilizer product carrying these phosphorous or nitrogen groups from the aqueous waste, either in slurry or out of slurry. The aqueous waste, however, does not require any pH adjustment, prior to becoming an "input" for the back-end grouping of processes, or after becoming an "input", in order for the inventive concept to operate as intended. The precipitated PC or PI agricultural fertilizer product output operates as a mild and sustainable platform for domestic, commercial, and agriculture uses, or as a mild soil additive or soil conditioner.

A person of ordinary skill in the art understands that this embodiment is applicable to the production of a wide variety of PC or PI "recycled" products, regardless of their end-state or how they are marketed or named, so long as they have similar or equivalent defining characteristics, or similar chemical compositions and/or chemical interactions. A person of ordinary skill in the art also understands that the produced composite ash, from the front-end, may be utilized as an ionic chemical precursor or platform, for example, for the secondary, and possibly entirely independent, production of various useful and economically valuable PC or PI products separate and distinct from the produced chemical fertilizer of the present invention. A person of ordinary skill in the art may see this use as a chemical precursor or platform as distinct from its use as an intermediate capture material, the differences primarily being whether the composite ash is immediately incorporated into a related, back-end grouping of process, or whether the composite ash is collected, sold, and marketed to independent, out-side entities for use in their own independent production operations. A person of ordinary skill in the art also understands that the PC or PI agricultural fertilizer produced from an integrated back-end grouping of processes, for example, may have various stages of preliminary processing prior to becoming an "output" (described in greater detail herein) of this exemplary embodiment.

Returning, generally, to this exemplary embodiment, and with reference to the back-end grouping of processes and related systems, the composite ash and energy outputs of the front end are used as post-consumer or recycled inputs for the back-end process grouping, and can be looped into the front-end processing group to facilitate operations as well. The composite ash is catalyzed via oxidation/combustion, and the ash is a non-limiting example of an active ingredient for sustainable waste stream processing of various sorts, including wastewater processing, for example. The composite ash is primarily a mineral, crystalline, multi-component product comprising calcium oxide, partially converted calcium carbonate, and meta-kaolin, containing calcium components of about 60.0% and meta-kaolin components of about 30.0%. The composite ash exhibits unique and synergistic molecular attraction forces, including chemical bonding and chemisorption forces. The composite ash, therefore, has the necessary structure and attractive forces and affinity to operate as a collector or precipitation agent ideally suited for the collection and removal of phosphates and nitrates from municipal wastewaters.

A person having ordinary skill in the art understands that, like the outputs of the front end, the outputs of the back end of this exemplary embodiment—fresh or decontaminated water and the post-consumer agricultural fertilizer, for example—also may be used as post-consumer or recycled inputs for the inventive concept itself, whether the front end and/or the back end, or may be used as post-consumer or recycled inputs for another, entirely separate, process.

Turning now to FIG. 1, a schematic flow diagram of an illustrative process according to the present invention is shown. This flow diagram discloses steps, not all of which are necessarily employed in each and every situation, but which may have similarities to other exemplary embodiments provided herein. The exemplary embodiment of FIG. 1 is a method 10 comprising the steps of:

In the front end grouping
  receiving and preliminarily processing a paper or carpet exothermic processing waste stream (102);
  thermally processing a paper or carpet exothermic processing waste stream (104);
  producing and recovering energy from the thermal processing of the paper or carpet exothermic processing waste stream (106); and
  recovering minerals from the waste and producing a composite ash, as a PC or PI collecting or precipitating agent (108).

In the back end grouping
  processing wastewater (110);
  removing phosphates and nitrates from the wastewater and pH adjusting the effluent slurry or the resulting water output (112); and
  precipitating, collecting, and processing a post-consumer product from the ash slurry with the wastewater (114).

In some exemplary embodiments, the method 10 efficiently and effectively consumes the substantial majority of the paper or carpet exothermic processing waste stream, with limited emissions, bi-products, and residues that cannot be captured, filtered, or reused and/or recycled.

The receiving and preliminarily processing step 102 of the method 10 relates to a paper or carpet exothermic processing waste stream (EWS). The EWS could be in a hydrous (water/moisture>air dried material) or anhydrous state (air dried or bone dry). If they are in a hydrous state, drying is performed prior to the thermal processing step 104. In the paper mill sludge example, the material is in a hydrous state and may require some dewatering and physical shredding and/or de-lumping, as preliminary processing, prior to the thermal processing step 104. In the case of carpet, if it is an anhydrous state, then it generally requires no dewatering or drying prior to thermal processing step 104. Instead, preliminary processing involves comminuting the carpet into pieces, such as shredding, chopping, grinding, shaving, cutting, tearing, and/or shearing the carpet to produce pieces a smaller size.

Next, the thermal separation step 104 of the method 10 on the paper or carpet exothermic processing waste stream occurs at an average process bed temperature in the range of about 600° C. to about 1000° C. The EWS is passed to the thermal separation stage 104, where various thermal separators (reactors) are employed including kilns, rotary kilns, grate furnaces, moving grate furnaces, fluidized beds, vertical or horizontal calciners, and the like. This controlled thermal separation step 104 is carried out to remove organics from the EWS materials. It is, in general, desirable to remove the organics from the minerals without decomposing the calcium carbonate present; however, other special products may be produced by allowing at least a temporary decomposition of the calcium carbonate. For example, the carbon dioxide in calcium carbonate flashes off above 800° C., more specifically at about 825° C., the organics decompose below 700° C., and the calcium carbonate decomposes before 900° C. These facts may be used in tailoring the products of the thermal separation step 104.

An exemplary temperature range for the thermal separation process 104 is 600° C. to 1000° C. average bed process temperature for a period of 30 minutes to 12 hours, preferably at 600° C. to 825° C. average bed process temperature for a period of 30 minutes to 2 hours, and more preferably at 600° C. to 800° C. average bed process temperature for a period of 30 minutes to 1 hour. In another exemplary embodiment of the present invention, the thermal separation may be carried out in an indirectly heated rotary kiln at approximately 700° C. average bed process temperature for approximately a 30 minute resident time with adequate air flow to assure proper combustion. Two or more thermal separation steps 104 can be included depending on the efficiency of the thermal separation step 104, such as the reactors or reaction parameters used in the thermal separation step 104, or if a certain end product is desired. In another exemplary embodiment, the thermal separation step 104 is carried out at an average bed process temperature in the ranges of from 600° C. to 800° C., 800° C. to 1000° C., and 825° C. to 1000° C.

Optionally, in some exemplary embodiments of the invention, at least a portion of the composite ash (the produced collecting or precipitating agent at step 108) is recycled into the thermal separation step 104. The EWS feed into feed step 102 can be polymer-based and if subjected to the thermal separation step, as is, may not oxidize (combust) efficiently. It has been found that adding some of the composite ash to the EWS feed, the composite ash preferably being mineral product previously having been subjected to the thermal separation step 104, increases the efficiency of the thermal separation step and the quality of the resulting mineral product. It has also been found that adding some of the composite ash to the EWS feed may help to obtain the proper dryness or moisture content prior to any thermal separation step 104.

The thermal processing step 104 of the EWS is the most crucial step in the method 10. The controlled processing parameters include combustion, temperature, time, combustion atmosphere, etc. The thermokinetics of the process is contingent on the EWS, and the operational and design elements of the thermal processing system used, and the desired quality or material characteristics of the energy and mineral or material products desired. The primary purpose of the thermal processing step 104 is to separate and remove the organics from the inorganics through combustion and to create a sterile, bright, and reactive mineral oxide material. Critical processing parameters (CPP) for thermally processing paper mill sludge are as follows:

Kiln or Calciner Material Bed Temperatures Range from 700° C.-1000° C., specifically in the range of 750° C.-900° C.;

The dwell or retention time for combustion, liberation, separation, and recovery of the energy and minerals or material elements within the reactor is in the range of 30 minutes to 4 hours specifically in the range of 30 minutes to 2 hours. The actual time parameter is a function of the chemical and thermokinetics of the system including specific product qualities desired; and The combustion atmosphere is oxidizing to slightly oxidizing.

Figure 2:
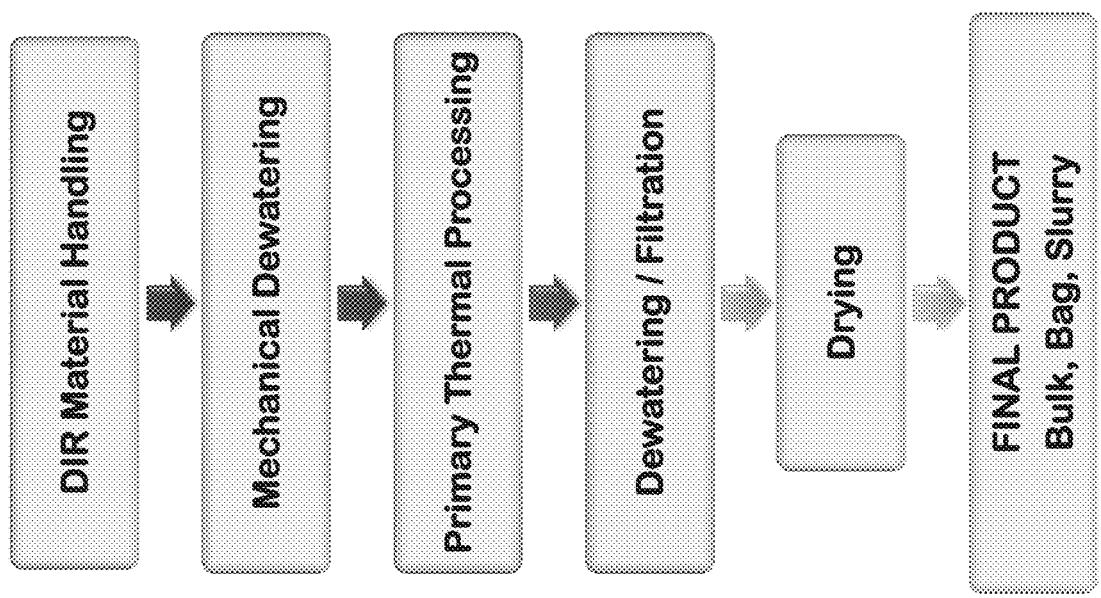
FIG. 2 is a flow diagram showing the steps of an illustrative embodiment of the present invention, not all of which steps are necessarily employed in each and every situation, comprising the use of a kiln that may be applicable to the schematic flow diagram of FIG. 1, a calciner that may be applicable to the schematic flow diagram of FIG. 1, and that may tie-in and share infrastructure with the kiln, a calcined-intermediate processor that may be applicable to the schematic flow diagram of FIG. 1, and that may tie-in and share infrastructure with the calciner, a final composite-ash handler that may be applicable to the schematic flow diagram of FIG. 1, and that may tie-in and share infrastructure with the kiln and/or calciner, a regional-version of a system capable of practically implementing the present invention, and an integration-version of a system capable of practically implementing the present invention in a municipality.

Several types of thermal reactors can be used for the thermal processing step 104 of the method 10. These reactors include but are not limited to:
Direct and indirect fired rotary kilns
Direct and indirect fired rotary calciners
Vertical multi-hearth calciners and kilns
Flash calciners
Fluidized bed calciners and kilns Turning briefly to FIG. 2, FIG. 2 is a flow diagram showing the steps of an illustrative embodiment of the present invention comprising the use of a kiln that may be applicable to the schematic flow diagram of FIG. 1, a calciner that may be applicable to the schematic flow diagram of FIG. 1, and that may tie-in and share infrastructure with the kiln, a calcined-intermediate processor that may be applicable to the schematic flow diagram of FIG. 1, and that may tie-in and share infrastructure with the calciner, a final composite-ash handler that may be applicable to the schematic flow diagram of FIG. 1, and that may tie-in and share infrastructure with the kiln and/or calciner, a regional-version of a system capable of practically implementing the present invention, and an integration-version of a system capable of practically implementing the present invention in a municipality. An illustrative kiln can be applicable to the schematic flow diagram of FIG. 1, for example, steps 104 through steps 108 of the method 10, and the diagram of the illustrative kiln can illustrate embodiments of kiln sub-systems and/or equipment, not all of which are necessarily employed in each and every situation, but which can have similarities to other exemplary embodiments referenced herein. Similarly, an illustrative calciner can be applicable to the schematic flow diagram of FIG. 1, for example, steps 104 through steps 108 of method 10, and can tie-in and share infrastructure with the kiln of FIG. 2. Further, the diagram of the illustrative calciner can illustrate embodiments of calciner sub-systems and/or equipment, not all of which are necessarily employed in each and every situation, but which can have similarities to other exemplary embodiments referenced herein.

More specifically, the exemplary embodiment of FIG. 2 is a kiln system 2 comprising various sub-systems, equipment, means of communication, conduits, etc., readily understood by a person of ordinary skill in the art interpreting the schematic diagram. Similarly, the exemplary embodiment of FIG. 2 is a calciner system 4 comprising various sub-systems, equipment, means of communication, conduits, etc., readily understood by a person of ordinary skill in the art interpreting the schematic diagram.

Turning back to FIG. 1, in one exemplary embodiment, during the thermal processing step 104, the thermal reactor, kiln, or calciner design should allow for the combustion gases to flow in co-current direction with the separated mineral or material products. This is the reverse case when compared to counter-current designs where the combustion gases flow in the opposite direction as the separated mineral and material products. Co-current systems are more energy efficient and safer when processing EWSs.

In the thermal separation step 104, energy from the combustion or oxidation of the EWS is recovered in the recovering energy step 106. During the thermal processing step 104, energy is released in the form of heat. The renewable energy is generated from the combustion process and is recovered in an energy-recovery-heat-exchanger (waste heat recovery boiler). The energy recovery is then converted into both steam and/or power as valuable renewable energy products. A person of ordinary skill in the art understands that each EWS contains various energy values, and energy efficient systems are designed for maximum energy recovery. The recovered energy is used as is or the heat may be used as is. High and low pressure steam also may be produced, which may be used for electricity or other purposes.

Next, the recovering and producing the composite ash step 108 of the method 10 is related directly the thermal processing step 104. The chemical composition and physical characteristics of the ash product are functions of the EWS resources processed. The products are considered energy+ (e.g., 20× to 40× more energy generated than consumed), post-consumer, recycled, renewable, etc., which are in demand for life cycle-based companies. By controlling the EWS and chemical compositions, unique and valuable physical and chemical products are created for a range of applications, such as wastewater treatments, and as the building-blocks or precursors for other products.

For example, when paper mill sludge or deinking sludge is thermally processed as in step 104 under carefully controlled CPPs and properly designed reactors (such as kiln 2 and/or calciner 4 of FIG. 2, respectively), the resulting composite ash is reactive with a pH>7.0. The paper mill EWS is transformed into an ash that is primarily composed of CaO (calcium oxide), partially converted calcium carbonate, and meta-kaolin. The composite ash material is designed into a "collector" or "collection/precipitation agent" (CA) ideally suited for the removal of nutrients (phosphates and nitrates) from wastewaters. Steps 110-114 specifically describe the processing methods when integrated into municipal wastewater treatment.

In this way, for the back-end wastewater processing portion (see steps 110-114), the composite ash is used as a post-consumer active ingredient or input for the method 10 itself, whether in feedback with the front end and/or as a direct input, and as a substitute for less sustainable materials and chemical reagents. Additionally, the composite ash can be used as a post-consumer treatment material, chemical reagent, building material, filler, etc., for another, entirely separate system or process.

Further, the composite ash of the front-end (see steps 102-108) is specifically designed as nutrient removal collector, collection, or precipitation agent in wastewater streams including but not limited to municipal and industrial streams along with open-water applications such as lakes, oceans, and rivers. The derived ash has a significant CaO component as is described herein. The meta-kaolin component, alongside any multivalent metal ions that might be present as constituents, may act as a primary collector, as the reactivity and surface area of meta-kaolin create a double-layer surface attraction to specific phosphate and nitrate ion species in aqueous solution. In this way, and as is described in greater detail herein, the collection and precipitation synergy between the meta-kaolin and the metal ions, specifically but not limited to certain metal oxides, may drive the phosphate and nitrate separation in the wastewater treatment processing portion of the inventive concept. Further, in this way, and as is described in greater detail herein, the derived ash with its significant CaO component, and with its produced hydroxide chemical intermediates, inherently increases the pH in any treated municipal wastestream (whether coming-in as acid, alkaline, or neutral) to above about 10, as is usually required for efficient contaminant removal or precipitation, without need for any secondary pH adjustment treatment step, as is understood in the art.

As such, the composite ash outputs of the front end are used as post-consumer or recycled inputs for the back end, as is the energy output. Therefore, the method 10 produces or reduces the "fresh" inputs (i.e., fresh or currently-uncontaminated inputs, like water, etc., as is described in steps 110-114) necessary for paper mill sludge, deinking sludge, or the carpet third stream waste stream processing, and also related to reducing the non-useful, or potentially toxic, outputs therefrom. The system and method of this exemplary embodiment achieves sustainable elimination of pollution streams that, even when recycled/treated, as taught in the prior art, would produce (1) residues, (2) new wastes or pollutants, and/or (3) secondary waste or pollution streams. Method 10 solves these problems when compared to the prior art as shown and disclosed in the following Examples including experimental results.

Returning, generally, to the recovering and producing the composite ash step 108 of the method 10, this step involves subjecting the produced product through a milling processing, for example, or another process for reducing the structure of the composite ash, if desired and/or if necessary for producing a desired end product for a particular use.

Once the mineral product ash is obtained through the present invention, it can be further treated if desired to produce other valuable products. For example, the composite ash produced in the thermal separation step 104 can be milled and pulverized using any of various known suitable dry milling techniques such as hammer mill pulverizers, ball mills, and the like. This pulverization, milling, or grinding is employed to expose as many distinct particle surfaces as possible for reaction in the following steps and stages of the process. The dried mineral product material may be further milled or pulverized in other substeps to assure uniformity and better dispersion and to give the desired oil absorption properties, if necessary. If oil absorption values are in excess of 40 or if lower oil absorption values are otherwise desired, ball milling may be employed.

Milling the mineral product of the present invention alters the morphology or crystalline structure of the mineral product by creating or destroying or reducing the structure to provide the desired degree of structure to yield, for example, the desired oil absorption and density for the desired end use.

Turning briefly to FIG. 2 again, an illustrative calcined-intermediate processing system can be applicable to the schematic flow diagram of FIG. 1, for example, steps 106 through steps 108 of method 10, and can tie-in and share infrastructure with the calciner of FIG. 2. Further, the diagram of the illustrative calcined-intermediate processing system can illustrate embodiments of complementary and supplementary processing, refining, or handling sub-systems and/or equipment, not all of which are necessarily employed in each and every situation, but which can have similarities to other exemplary embodiments referenced herein. Similarly, the illustrative final composite-ash handling system may be applicable to the schematic flow diagram of FIG. 1, for example, step 108 of method 10, and can tie-in and share infrastructure with the kiln and/or calciner systems of FIG. 2. Further, the diagram of the illustrative final composite-ash handling system can illustrate embodiments of complementary and supplementary handling, quality-control, or storage sub-systems and/or equipment, not all of which are necessarily employed in each and every situation, but which can have similarities to other exemplary embodiments referenced herein.

More specifically, the exemplary embodiment of FIG. 2 is a calcined-intermediate processing system 6 comprising various sub-systems, equipment, means of communication, conduits, etc., readily understood by a person of ordinary skill in the art interpreting the schematic diagram. Similarly, the exemplary embodiment of FIG. 2 also is a composite-ash handling system 8 comprising various sub-systems, equipment, means of communication, conduits, etc., readily understood by a person of ordinary skill in the art interpreting the schematic diagram.

Turning back to FIG. 1, and with regard to the back-end grouping of processes for the method 10, the processing the wastewater step 110 of the method 10 is directly related to the recovering and producing the composite ash step 108. The composite ash produced out of the front-end steps 102-108 is mixed with the municipal wastewater to form a partial lime $Ca(OH)_2$ slurry through a slaking process. It reacts with the wastewater in most cases to produce calcium carbonate, which is primarily responsible for enhancing phosphate and nitrate removal, as is generally characterized by the following Formula 8.

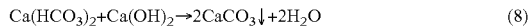

$$Ca(HCO_3)_2 + Ca(OH)_2 \rightarrow 2CaCO_3\downarrow + 2H_2O \qquad (8)$$

As the pH value of the wastewater increases beyond about 10, excess calcium ions will then react with the phosphate to precipitate a hydroxylapatite, as is generally characterized by the following Formula 9.

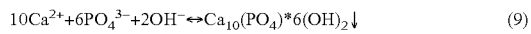

$$10Ca^{2+} + 6PO_4^{3-} + 2OH^- \leftrightarrow Ca_{10}(PO_4)*6(OH)_2\downarrow \qquad (9)$$

The meta-kaolin acts as the primary Ca in the process. The reactivity and surface area of the meta-kaolin creates a double layer surface attraction to specific phosphorous and nitrate ion species. The collection and precipitation synergy between the meta-kaolin and the metal ions specifically but not limited to CaO drive the phosphorous and nitrate separation process. It is understand by a person of ordinary skill in the art that, as the reaction is between the lime and the alkalinity of the wastewater (after introduction of the derived ash with the municipal wastewater to be treated), the quantity required will be, in general, independent of the amount of phosphate present. Instead, it will primarily depend on the alkalinity of the wastewater. The lime dose required can be approximated at 1-2 times the alkalinity as $CaCO_3$.

The mixing process usually requires that the composite ash is slaked prior to mixing with the wastewater effluent for better mixing; however, dry applications are also envisioned. Once the mixing is complete and thorough, reaction times range from 0.25-2 hours. Mixing is completed with inline mixers, agitated tanks, etc. In addition to the recovered composite ash product, other metal compounds and coagulants may be added to the slurry to further enhance separation and improve the separation kinetics of the process. ZnO and HMW separation polymers are two examples of the separation enhancers.

Next, the removing phosphates and nitrates from the wastewater step 112, and the associated pH adjusting the effluent slurry or the resulting clean water output step, of the method 10 is directly related to the processing the wastewater step 110. In some cases, but not required, the pH may be adjusted prior to the separation step 114 to create additional valuable and enriched compounds within the recovered solids i.e., pH adjustment with phosphoric, sulfuric, and/or stearic acid to add or enhance valuable components to the recovered solids. In this way, the outputs of the front end steps 102-108 may be used as post-consumer or recycled inputs for another, entirely separate, process; a process that would otherwise use fresh inputs or comparatively unsustainable inputs, or for the back-end steps 110-114.

Next, the precipitating, collecting, and processing a post-consumer product from the ash-effluent slurry step 114 of the method 10 is directly related to the removing phosphates and nitrates from the wastewater step 112. Once the reaction of step 112 is complete, the precipitated and collected phosphate and/or nitrate compounds are separated from the effluent slurry using a range of separation techniques including but not limited to clarifiers, centrifuges, filters, etc. Of course, it is also envisioned that, instead of strict separation techniques, other known techniques for targeting and collecting the desired product may be implemented, including but not limited to flocculation, agglomeration, etc.

Once the precipitate or solids are separated, the material is filtered and/or dried into a dry product or left in a liquid depending on various product applications. Further, once the phosphate and nitrate separation is complete, the pH adjusted/decontaminated water may be discharged into the watershed via river, ocean, lake, etc., or may be cycled back into the municipal system. At this point, optionally, the purified effluent may be pH adjusted using weak and/or strong acids including but not limited to phosphoric, sulfuric, hydrochloric, and stearic acid. Again, any secondary pH adjustment is optional before or after the separation processes.

The final product generated from the removing phosphates and nitrates from the wastewater step 112 contains valuable and unique forms of chemical and minerals. The wastewater treatment process increased valuable phosphate and nitrate compounds by 1%-30%. Chemical compounds that contain calcium, kaolin, phosphates, nitrates, and sulfates are excellent platforms for agricultural uses such as fertilizers, soil modifiers, soil enrichers, and soil enhancers. The unique materials and products recovered from the removing phosphates and nitrates from the wastewater step 112 contain valuable minerals and compounds. The materials and products also inherently retain reactive chemical complexes that are also unique and valuable in some product applications.

These applications include products designed and recovered for applications in the following industries:
Agricultural, including fertilizers
Building and construction, including pozzolans
Paper, including pigments and fillers
Municipalities, including wastewater treatment.

In this way, the outputs of the back-end process grouping of steps 108-114, may be used as post-consumer or recycled inputs for the inventive concept itself, or may be used as post-consumer or recycled inputs for another, entirely separate, process. The outputs of the back-end process grouping of steps 108-114 may also be useful in various different delivery methods. In one exemplary embodiment, the composite ash may exhibit broadcast delivery or non-point source applications, e.g., aerial applications, barge and boat spreading systems (even broadcast or below-surface injection), and global positioning orientated systems. In another exemplary embodiment, the composite ash may exhibit point-source application. This may be especially useful for meat processing customer segments, where excess nutrient-laden wastewater is directly attributable to one source. A person of ordinary skill in the art understands that point-source treatment plants are highly-engineered facilities with multi-step treatment vessels and mixing tanks, where the tanks are arranged in treatment sequences, well suited for direct injection of carefully calibrated amounts of the composite ash product, for example.

Examples 1-6

The following are six (6) illustrative examples of the process of the present invention when applied under experimental conditions.

Example 1

Controlled Experiment #1

A phosphate standard solution was prepared from 1000 mg/L phosphorous standard solution and distilled water to a concentration of 5 mg/L. A 0.2 mg sample of collection material was mixed with 200 mL of the 5 mg/L phosphate standard solution in a plastic beaker with a bench-top mixer set at 400 rpm. After 30 minutes of mixing, the solution was transferred to a centrifuge vessel and centrifuged for 7 minutes. A post treatment sample was collected with a pipette from the top half inch of post treatment solution. The post-centrifuged solution was analyzed for orthophosphate concentration using a Hach colorimeter. The post-treatment phosphate concentration was 0.08 mg/l representing a 98.4% removal of phosphate.

Example 2

Controlled Experiment #2

A phosphate standard solution was prepared from 1000 mg/L phosphorous standard solution and distilled water to a concentration of 20 mg/L. A 0.1 mg sample of collection material was mixed with 200 mL of the 20 mg/L phosphate standard solution in a plastic beaker with a bench-top mixer set at 400 rpm. After 30 minutes of mixing, the solution was transferred to a centrifuge vessel and centrifuged for 7 minutes. A post treatment sample was collected with a pipette from the top half inch of post treatment solution. The post-centrifuged solution was analyzed for orthophosphate concentration using a Hach colorimeter. The post-treatment phosphate concentration was 0.55 mg/L representing a 97.25% removal of phosphate.

Example 3

Municipal Wastewater #1

A 2 g sample of collection material was mixed with 300 mL of effluent obtained from the Sandersville, Ga., US wastewater treatment facility having an initial phosphate concentration of 1.46 mg/L. The sample and effluent was mixed in a plastic beaker with a bench-top mixer set at 400 rpm. After 30 minutes of mixing, the solution was transferred to a centrifuge vessel and centrifuged for 7 minutes. A post treatment sample was collected with a pipette from the top half inch of the post treatment solution. A post treatment sample was collected with a pipette from the top half inch of post treatment solution. The post-centrifuged solution was analyzed for phosphate concentration using a Hach colorimeter. The post-treatment phosphate concentration was 0.1 mg/L representing a 93.2% removal of phosphate.

Example 4

Municipal Wastewater #2

A 40 g sample of collection material was mixed with 80 liters of effluent obtained from the Milledgeville, Ga., US wastewater treatment facility having a phosphate concentration of 1.25 mg/L. The sample and effluent was mixed in a plastic barrel with a barrel mixer. After 30 minutes of mixing, the solution was transferred to a centrifuge vessel and centrifuged for 7 minutes. A post treatment sample was collected with a pipette from the top half inch of post treatment solution. The post-centrifuged solution was analyzed for phosphate concentration using a Hach colorimeter. The post-treatment phosphate concentration was 0.12 mg/L representing a 90.4% removal of phosphate.

Example 5

Industrial Waste Stream #1

A 1 g sample of collection material was mixed with 1 L of industrial wastewater obtained from XYZ Inc. having an initial phosphate concentration of 4.2 mg/L. The sample and effluent was mixed in a plastic beaker with a bench-top mixer set at 400 rpm. After 30 minutes of mixing, the solution was transferred to a centrifuge vessel and centrifuged for 7 minutes. A post treatment sample was collected within pipette from the top half inch of post treatment solution. The post-centrifuged solution was analyzed for phosphate concentration using a Hach colorimeter. The post-treatment phosphate concentration was 0.51 mg/L representing an 88.09% removal of phosphate.

Example 6

Industrial Waste Stream #2

A 2 g sample of collection material was mixed with 1 L of industrial wastewater obtained from XYZ Inc. having an initial phosphate concentration of 14 mg/L. The sample and effluent was mixed in a plastic beaker with a bench-top mixer set at 400 rpm. After 30 minutes of mixing, the solution was transferred to a centrifuge vessel and centrifuged for 7 minutes. A post treatment sample was collected with a pipette from the top half inch of the post treatment solution. A post treatment sample was collected with a pipette from the top half inch of post treatment solution. The post-centrifuged solution was analyzed for phosphate concentration using a Hach colorimeter. The post-treatment phosphate concentration was 0.89 mg/L representing a 93.6% removal of phosphate.

Examples 7-14

The following are seven (7) illustrative examples of the process of the present invention, specifically performed for purpose of optimizing and refining the inventive concept for application to various conditions.

Example 7

This experiment was performed to evaluate the effect, if any, of calcination temperature and setting time on final [$PO_4$] after use of the composite ash/capture material on contaminated water. When compared to the centrifuge trial (see Example 8 below), it was determine that centrifugation gave better results, and that settling-only techniques were not necessarily worth pursuing. Some of the experimental results obtained are represented by the following information provided in Tables 2A and 2B.

TABLE 2A

| Test ID | Material | Vol. Sol'n (ml) | Mass Material (g) | Initial Conc. So'ln (mg/l) | Initial Temp Sol'n | Initial pH Sol'n | Init. pH Sol'n + material | Mix Time (min) |
|---|---|---|---|---|---|---|---|---|
| 003 | Meta Kaolin | 100 | 1 | 2.43 | 18 | 5.8 | 5.83 | 30 |
| 004 | Calitza LS | 100 | 1 | 2.43 | 18 | 5.8 | 9.86 | 30 |
| 001 | R1000 | 100 | 1 | 2.43 | 18.7 | 3.7 | 13.02 | 30 |
| 005 | R1000 | 100 | 1 | 2.43 | 16.2 | 6.26 | 13.67 | 30 |
| 007 | R1000 | 100 | 1 | 2.43 | 16.9 | 6.55 | 13.69 | 30 |
| 009 | R1000 | 100 | 1 | 2.48 | 18.5 | 6.49 | 13.69 | 30 |
| 011 | R1000 | 200 | 2 | 2.48 | 22 | 6.24 | 12.89 | 30 |
| 002 | R800 | 100 | 1 | 2.43 | 18.7 | 4.4 | 13.23 | 30 |
| 006 | R800 | 100 | 1 | 2.43 | 16.2 | 6.23 | 13.65 | 30 |
| 008 | R800 | 100 | 1 | 2.43 | 16.9 | 6.53 | 13.81 | 30 |
| 010 | R800 | 100 | 1 | 2.48 | 18.5 | 6.51 | 13.76 | 30 |
| 012 | R800 | 200 | 2 | 2.48 | 22 | 6.23 | 12.92 | 30 |
| 013 | R850 | 100 | 1 | 2.48 | 19.5 | 6.2 | 13.28 | 30 |
| 014 | R900 | 100 | 1 | 2.48 | 19.5 | 6.2 | 13.3 | 30 |
| 015 | R950 | 100 | 1 | 2.48 | 19.5 | 6.2 | 13.35 | 30 |
| 016 | R800 | 300 | 3 | 2.48 | 20.9 | 6.76 | 13.53 | 30 |
| 017 | R800 | 300 | 3 | 2.48 | 20.9 | 6.76 | 13.53 | 30 |
| 018 | R Calc | 100 | 1 | 2.48 | 21.6 | 6.91 | 13.13 | 30 |
| 019 | R calc. Pulv | 100 | 1 | 2.48 | 21.6 | 6.91 | 13.24 | 30 |

TABLE 2B

| Test ID | pH Post screen | Temp post Screen ° C. | Post screen conc. | Settle Time (min) | Post settle Conc. | notes |
|---|---|---|---|---|---|---|
| 003 | 7.95 | 17 | — | 1440 | 2.21 | colorimeter test fault - - - |
| 004 | 8.72 | 17 | — | 105 | 1.39 | colorimeter test fault - - - |
| 001 | 13.36 | 17.3 | 1.38 | 60 | | post settle test fault |
| 005 | 13.71 | 16.4 | 1.3 | 30 | 0.59 | |
| 007 | 13.62 | 17.1 | 1.14 | 30 | 0.78 | |
| 009 | 13.76 | 18.4 | 1.01 | 90 | 0.5 | heat added settle final temp. 45.2 |
| 011 | 12.87 | 19.7 | 2.19 | 30 | | post settle test fault-no screening |
| 002 | 16.65 | 17.3 | 0.27 | 60 | | post settle test fault |
| 006 | 13.87 | 16.7 | 0.18 | 30 | 0.61 | |
| 008 | 13.74 | 17.2 | 0.55 | 30 | 0.21 | |
| 010 | 13.81 | 18.4 | 0.72 | 15 | 0.35 | heat added settle final temp. 45.2 |
| 012 | 12.84 | 19.6 | 1.08 | 5 | 0.5 | no screening |
| 013 | 13.48 | 21 | 0.68 | 30 | | post settle test fault-no screening |
| 014 | 13.56 | 21.1 | 1.1 | 30 | 0.36 | no screening |
| 015 | 13.11 | 21.1 | 1.12 | 30 | 0.81 | no screening |
| 016 | 13.49 | 21.1 | 1.16 | 20 | 0.98 | no screening |
| 017 | 13.51 | 21 | 1.03 | 20 | 0.98 | no screening |
| 018 | 13.09 | 21.1 | 0.97 | 40 | 0.38 | no screening |
| 019 | 13.22 | 21.1 | 2.39 | 40 | 0.42 | no screening |

The information in Table 2A and 2B illustrates individual trials (Test IDs) and their results, based on the use of the composite ash and various other prior art products. The composite ash trials are specifically labeled using "R Calcined", "R calc. pulv", "R ###", wherein the "###" portion is indicative of the applied calcination temperature for production of that trial's composite ash.

Example 8

This experiment was performed to evaluate the effect of centrifugation time on the final $[PO_4]$ after use of the composite ash/capture material on contaminated water. Some of the experimental results obtained are represented by the following information provided in Table 3A and 3B.

TABLE 3A

| Test ID | Material | Volume Sol'n (ml) | Mass Material (g) | Initial Conc. Solution (mg/l) | Initial Temp Sol'n | Initial pH Sol'n | Init. pH Solution + material |
|---|---|---|---|---|---|---|---|
| 020 | R Calc Pulv | 200 | 10 ml @ 20% | 2.43 | 21.3 | 7.67 | 13.52 |
| 021 | R Calc Pulv | 200 | 10 ml @ 20% | 2.43 | 21.3 | 7.59 | 13.22 |
| 022 | R Calc Pulv | 200 | 10 ml @ 15% | 2.43 | 19.6 | 7.31 | 13.27 |
| 023 | R Calc | 300 | 2 | 1.46 | 16.6 | 6.34 | 13.47 |
| 024 | R Calc | 300 | 2 | 1.46 | 16.6 | 6.34 | 13.51 |
| 025 | R Calc | 300 | 2 | 1.46 | 16.6 | 6.34 | 13.51 |
| 026 | R Calc Pulv | 300 | 2 | 1.46 | 15.2 | 6.34 | |
| 027 | R Calc Pulv | 300 | 2 | 1.46 | 15.2 | 6.34 | |
| 028 | R Calc Pulv | 300 | 2 | 1.46 | 15.2 | 6.34 | |
| 029 | Ranier | 250 | 2 | 2.43 | | | |
| 030 | CaO Calitza | 250 | 2 | 2.43 | | | |
| 031 | N—C | 250 | 2 | 2.43 | | | |

TABLE 3B

| Test ID | Mix Time | pH Post Centrifuge | Centrifuge Duration (min) | Post centrifuge Conc. | notes |
|---|---|---|---|---|---|
| 020 | 30 | 13.1 | 8 | 0.16 | Slake by hand mixing 2 min |
| 021 | 30 | 13.22 | 8 | 0.07 | Slake by hand mixing 2 min |
| 022 | 30 | 13.25 | 8 | 0.09 | Slake by hand mixing 2 min |
| 023 | 30 | | 7 | 0.26 | Sandersville Effluent used |
| 024 | 30 | | 7 | 0.06 | Sandersville Effluent used |
| 025 | 30 | | 7 | 0.19 | Sandersville Effluent used |
| 026 | 30 | | 7 | 0.39 | Sandersville Effluent used |
| 027 | 30 | | 7 | 0.41 | Sandersville Effluent used |
| 028 | 30 | | 7 | 0.1 | Sandersville Effluent used |
| 029 | 30 | | 7 | 0.15 | |
| 030 | 30 | | 7 | 0.24 | |
| 031 | 30 | | 7 | 0.02 | |

The information in Tables 3A and 3B illustrates individual trials (Test IDs) and their results, based on the use of the composite ash and various other prior art products. The composite ash trials are specifically labeled using "R Calc Pulv" and "R Calc".

Example 9

This experiment was performed to evaluate the effect of total mix time/retention time on the final [PO$_4$] after use of the composite ash/capture material on contaminated water. From a production or WWTP standpoint, less mix time/retention time is preferred. Some of the experimental results obtained are represented by the following information provided in Table 4.

TABLE 4

Retention Time Trials

| Test ID | Material | Volume Sol'n (ml) | Mass Material (g) | Initial Conc. Sol'n (mg/l) | Mix Time (mins) | Centrifuge Time (min) | Post centrifuge Conc. (mg/l) |
|---|---|---|---|---|---|---|---|
| 041 | R Cal Pulv | 200 | 0.3 | 2.45 | 30 | 7 | 0.07 |
| 042 | R Cal Pulv | 200 | 0.3 | 2.45 | 30 | 7 | 0.13 |
| 043 | R Cal Pulv | 200 | 0.3 | 2.45 | 30 | 7 | 0.08 |
| 044 | R Cal Pulv | 200 | 0.3 | 2.45 | 20 | 7 | 0.15 |
| 045 | R Cal Pulv | 200 | 0.3 | 2.45 | 20 | 7 | 0.13 |
| 046 | R Cal Pulv | 200 | 0.3 | 2.45 | 20 | 7 | 0.15 |
| 047 | R Cal Pulv | 200 | 0.3 | 2.44 | 10 | 7 | 0.28 |
| 048 | R Cal Pulv | 200 | 0.3 | 2.44 | 10 | 7 | 0.24 |
| 049 | R Cal Pulv | 200 | 0.3 | 2.44 | 10 | 7 | 0.15 |
| 050 | R Cal Pulv | 200 | 0.3 | 2.43 | 5 | 7 | 0.19 |
| 051 | R Cal Pulv | 200 | 0.3 | 2.43 | 5 | 7 | 0.25 |
| 052 | R Cal Pulv | 200 | 0.3 | 2.43 | 5 | 7 | 0.21 |
| 053 | R Cal Pulv | 200 | 0.3 | 2.43 | 3 | 7 | 0.51 |
| 054 | R Cal Pulv | 200 | 0.3 | 2.43 | 3 | 7 | 0.41 |
| 055 | R Cal Pulv | 200 | 0.3 | 2.43 | 3 | 7 | 0.48 |
| 056 | R Cal Pulv | 200 | 0.3 | 2.43 | 1 | 7 | 0.79 |
| 057 | R Cal Pulv | 200 | 0.3 | 2.43 | 1 | 7 | 1.23 |
| 058 | R Cal Pulv | 200 | 0.3 | 2.43 | 1 | 7 | 0.97 |

The information in Table 4 illustrates individual trials (Test IDs) and their results, based on the use of the composite ash. The composite ash trials are specifically labeled using "R Cal Pulv".

Example 10

This experiment was performed to evaluate the effect of different relative amounts/material dosage of added composite-ash/capture material on the final [PO$_4$] after use on contaminated water. From a cost standpoint, it is preferred to use relatively less than more. Some of the experimental results obtained are represented by the following information provided in Tables 5 and 6.

TABLE 5

Material Dosage Trials

| Test ID | Material | Vol. Sol'n (ml) | Mass Material (g) | Initial Conc. Sol'n (mg/l) | Mix Time (mins) | Centrifuge Duration (min) | Post centrifuge Conc. (mg/l) |
|---|---|---|---|---|---|---|---|
| 032 | R cal pulv | 200 | 0.7 | 2.45 | 30 | 7 | 0.15 |
| 035 | R cal pulv | 200 | 0.7 | 2.45 | 30 | 7 | 0.16 |
| 033 | R cal pulv | 200 | 0.5 | 2.45 | 30 | 7 | 0.11 |
| 036 | R cal pulv | 200 | 0.5 | 2.45 | 30 | 7 | 0.14 |
| 034 | R cal pulv | 200 | 0.3 | 2.45 | 30 | 7 | 0.13 |
| 037 | R cal pulv | 200 | 0.3 | 2.45 | 30 | 7 | 0.09 |
| 038 | R cal pulv | 200 | 0.2 | 2.45 | 30 | 7 | 0.73 |
| 039 | R cal pulv | 200 | 0.1 | 2.45 | 30 | 7 | 0.4 |
| 040 | R cal pulv | 200 | 0.05 | 2.45 | 30 | 7 | 0.41 |

TABLE 6

| Test ID | Material | Vol. Sol'n (ml) | Mass Material (g) | Initial Conc. Sol'n (mg/l) | Mix Time (min) | Centrifuge Duration (min) | Post centrifuge Conc. (mg/l) |
|---|---|---|---|---|---|---|---|
| 108 | R Cal Pulv | 200 | 0.1 | 5 | 30 | 7 | 0.32 |
| 109 | R Cal Pulv | 200 | 0.2 | 5 | 30 | 7 | 0.09 |
| 110 | R Cal Pulv | 200 | 0.4 | 5 | 30 | 7 | 0.19 |
| 111 | R Cal Pulv | 200 | 0.1 | 10 | 30 | 7 | 0.5 |
| 112 | R Cal Pulv | 200 | 0.2 | 10 | 30 | 7 | 0.24 |
| 113 | R Cal Pulv | 200 | 0.4 | 10 | 30 | 7 | 0.1 |
| 114 | R Cal Pulv | 200 | 0.1 | 20 | 30 | 7 | 0.82 |
| 115 | R Cal Pulv | 200 | 0.2 | 20 | 30 | 7 | 0.54 |
|  | R Cal Pulv | 200 | 0.4 | 20 | 30 | 7 | 0.16 |

The information in Tables 5 and 6 illustrate individual trials (Test IDs) and their results, based on the use of the composite ash. The composite ash trials are specifically labeled using "R Calc Pulv" and "R cal pulv".

Example 11

This experiment was performed to evaluate the effects of the process of the present invention, as optimized and refined via the results presented in Examples 7-10, on the final [NO$_3$] after use of the composite ash/capture material on contaminated water. Some of the experimental results obtained are represented by the following information provided in Table 7.

TABLE 7

Nitrate adsorption Trials

| Test ID | Material | Vol. Soln (ml) | Mass Material (g) | Initial Conc. Sol'n (mg/l) | Mix Time (mins) | Centrifuge Duration (min) | Post Conc. centrifuge (mg/l) | notes |
|---|---|---|---|---|---|---|---|---|
| 059 | R Cal Pulv | 200 | 0.3 | 3.4 | 30 | 7 | 1.1 | no3 |
| 060 | R Cal Pulv | 200 | 0.3 | 3.4 | 30 | 7 | 1 | no3 |
| 061 | R Cal Pulv | 200 | 0.3 | 3.4 | 30 | 7 | 1.1 | no3 |
| 062 | R Cal Pulv | 100 | 0.3 | 3.4 | 30 | 7 | 0.9 | NO3 Sol'n used |
| 062 | R Cal Pulv | 100 |  | 2.43 | 30 | 7 | 0.25 | PO4 Sol'n used |
| 062 | R Cal Pulv | 100 | 0.3 | 3.5 | 30 | 7 | 1 | NO3 Sol'n used |
| 062 | R Cal Pulv | 100 |  | 2.43 | 30 | 7 | 0.12 | PO4 Sol'n used |

TABLE 7-continued

Nitrate adsorption Trials

| Test ID | Material | Vol. Sol'n (ml) | Mass Material (g) | Initial Conc. Sol'n (mg/l) | Mix Time (mins) | Centrifuge Duration (min) | Post Conc. centrifuge (mg/l) | notes |
|---|---|---|---|---|---|---|---|---|
| 064 | R Cal Pulv | 100 | 0.3 | 3.4 | 30 | 7 | 0.9 | NO3 Sol'n used |
| 064 | R Cal Pulv | 100 | | 2.43 | 30 | 7 | 0.17 | PO4 Sol'n used |

The information in Table 7 illustrates individual trials (Test IDs) and their results, based on the use of the composite ash. The composite ash trials are specifically labeled using "R Calc Pulv".

Example 12

This experiment was performed to evaluate the effects of the process of the present invention, as optimized and refined via the results presented in Examples 7-11, on the final [PO$_4$] and/or final [NO$_3$] after use of the composite ash/capture material on high initial [PO$_4$] and/or high initial [PO$_4$], indicative of industrial waste waters. Some of the experimental results obtained are represented by the following information provided in Tables 8A, 8B, 9A, and 9B.

TABLE 8A

High Concentration Trials

| Test ID | Material | Vol Sol'n (ml) | Mass Material (g) | Initial Conc. Sol'n (mg/l) | Mix Time min | Centrifuge Time (min) | Post centrifuge Conc. (mg/l) | Notes |
|---|---|---|---|---|---|---|---|---|
| 041 | R Cal Pulv | 200 | 0.3 | 2.45 | 30 | 7 | 0.07 | |
| 042 | R Cal Pulv | 200 | 0.3 | 2.45 | 30 | 7 | 0.13 | |
| 043 | R Cal Pulv | 200 | 0.3 | 2.45 | 30 | 7 | 0.08 | |
| 065 | r cal pulv | 200 | 0.3 | 17.1 | 30 | 7 | 1 | High Con. PO4-low accuracy |
| 066 | r cal pulv | 200 | 0.3 | 17.1 | 30 | 7 | 0.5 | High Con. PO4-low accuracy |
| 067 | r cal pulv | 200 | 0.3 | 17.1 | 30 | 7 | 1.2 | High Con. PO4-low accuracy |
| 068 | R Cal Pulv | 200 | 0.3 | 24.5 | 30 | 7 | 1.2 | High Con. PO4-low accuracy |
| 069 | R Cal Pulv | 200 | 0.3 | 24.5 | 30 | 7 | 0.5 | High Con. PO4-low accuracy |
| 070 | R Cal Pulv | 200 | 0.3 | 24.5 | 30 | 7 | 0.8 | High Con. PO4-low accuracy |
| 071 | R Cal Pulv | 200 | 0.3 | 11.1 | 30 | 7 | 0.2 | High Con. PO4-low accuracy |
| 072 | R Cal Pulv | 200 | 0.3 | 11.1 | 30 | 7 | 0.4 | High Con. PO4-low accuracy |

TABLE 8B

| Test ID | Material | Vol Sol'n (ml) | Mass Material (g) | Initial Conc. Sol'n (mg/l) | Mix Time min | Centrifuge Time (min) | Post centrifuge Conc. (mg/l) | Notes |
|---|---|---|---|---|---|---|---|---|
| 073 | R Cal Pulv | 200 | 0.3 | 11.1 | 30 | 7 | 0.2 | High Con. PO4-low accuracy |
| 074 | R Cal Pulv | 500 | 0.75 | 26.6 | 30 | settle | 1.8 | Settle time 40 mins |
| 075 | NaOH | 200 | ph 11.17 | 26.6 | 30 | 7 | 25.2 | ph adjust only w/NaOH |
| 076 | NaOH | 200 | ph 11.28 | 26.6 | 30 | 7 | 25 | ph adjust only w/NaOH |
| 077 | NaOH | 200 | ph 11.31 | 26.6 | 30 | 7 | 25.4 | ph adjust only w/NaOH |

TABLE 9A

| Test ID | Material | Vol. Sol'n (ml) | Mass Material (g) | Initial Conc. Sol'n (mg/l) NO3 |
|---|---|---|---|---|
| 078 | r1000 pulv | 200 | 0.3 | 17.4 |
| 079 | r1000 pulv | 200 | 0.3 | 7.7 |
| 080 | r1000 pulv | 200 | 0.3 | 3.8 |
| 081 | r1000 pulv | 200 | 0.3 | 16.5 |
| 082 | r1000 pulv | 200 | 0.3 | 16.5 |
| 083 | r cal pulv | 200 | 0.3 | 16.5 |
| 084 | r1000 pulv | 200 | 0.3 | 5.8 |
| 085 | r1000 pulv | 200 | 0.3 | 5.8 |
| 086 | r cal pulv | 200 | 0.3 | 5.8 |
| 087 | r1000 pulv | 200 | 0.3 | 21.1 |
| 088 | r1000 pulv | 200 | 0.3 | 21.1 |
| 089 | r cal pulv | 200 | 0.3 | 21.1 |
| 090 | Cao | 200 | 0.3 | 5.3 |
| 091 | Cao | 200 | 0.3 | 13.4 |
| 092 | Cao | 200 | 0.3 | 21.1 |
| 093 | Ray | 200 | 0.3 | 5.3 |
| 094 | ray | 200 | 0.3 | 13.4 |
| 095 | ray | 200 | 0.3 | 21.1 |
| 096 | Metakaolin | 200 | 0.3 | 5.3 |
| 097 | metakaolin | 200 | 0.3 | 13.4 |
| 098 | Metakaolin | 200 | 0.3 | 21.1 |

TABLE 9B

| Test ID | Mix Time (min) | Centrifuge Duration (min) | Post centrifuge Conc. (mg/l) | notes |
|---|---|---|---|---|
| 078 | 30 | 7 | 0.35 | |
| 079 | 30 | 7 | 0.2 | |
| 080 | 30 | 7 | 0.08 | |
| 081 | 30 | 7 | 0.44 | |
| 082 | 30 | 7 | 0.46 | |
| 083 | 30 | 7 | 0.59 | |
| 084 | 30 | 7 | 0.22 | |
| 085 | 30 | 7 | 0.14 | |
| 086 | 30 | 7 | 0.05 | |
| 087 | 30 | 7 | 0.36 | |
| 088 | 30 | 7 | 0.51 | |
| 089 | 30 | 7 | 0.19 | |
| 090 | 30 | 7 | 0.17 | |
| 091 | 30 | 7 | 0.23 | |
| 092 | 30 | 7 | 0.24 | |
| 093 | 30 | 7 | 0.42 | |
| 094 | 30 | 7 | 2.09 | |
| 095 | 30 | 7 | 6.9 | |
| 096 | 30 | 7 | 5 | ph adjust to 12 w/ NaOH |
| 097 | 30 | 7 | 13.2 | ph adjust to 12 w/ NaOH |
| 098 | 30 | 7 | 20.8 | ph adjust to 12 w/ NaOH |

The information in Tables 8A, 8B, 9A, and 9B illustrate individual trials (Test IDs) and their results, based on the use of the composite ash and various other prior art products. The composite ash trials are specifically labeled using "R Cal Pulv" and "r cal pulv".

Example 13

This experiment was performed to evaluate the effects of certain prior art products/substances on the final [$NO_3$] after use on contaminated water. Some of the experimental results obtained are represented by the following information provided in Table 10.

TABLE 10

Additive Trials

| Test ID | Material | Vol Sol'n (ml) | Mass Material (g) | Initial Conc. Sol'n (mg/l) $NO_3$ | Mix Time min | Centrifuge Duration (min) | Post centrifuge Conc. (mg/l) | Notes |
|---|---|---|---|---|---|---|---|---|
| 090 | Cao | 200 | 0.3 | 5.3 | 30 | 7 | 0.17 | |
| 091 | Cao | 200 | 0.3 | 13.4 | 30 | 7 | 0.23 | |
| 092 | Cao | 200 | 0.3 | 21.1 | 30 | 7 | 0.24 | |
| 096 | Metakaolin | 200 | 0.3 | 5.3 | 30 | 7 | 5 | ph adjust to 12 w/ NaOH |
| 097 | metakaolin | 200 | 0.3 | 13.4 | 30 | 7 | 13.2 | ph adjust to 12 w/ NaOH |
| 098 | Metakaolin | 200 | 0.3 | 21.1 | 30 | 7 | 20.8 | ph adjust to 12 w/ NaOH |
| 099 | MK + CaO | 200 | 0.3 | 5.3 | 30 | 7 | 0.02 | 66.6% CaO 33.3% Meetakaolin |
| 100 | MK + CaO | 200 | 0.3 | 13.4 | 30 | 7 | 0.03 | 66.6% CaO 33.3% Meetakaolin |
| 101 | MK + CaO | 200 | 0.3 | 21.1 | 30 | 7 | 0.12 | 66.6% CaO 33.3% Meetakaolin |
| 102 | MK + Cao + Zno | 200 | 0.3 | 5.3 | 30 | 7 | 0.02 | 66.25% Cao 33.25% Metakaolin 0.5% Zno |
| 103 | MK + Cao + Zno | 200 | 0.3 | 13.4 | 30 | 7 | 0.02 | 66.25% Cao 33.25% Metakaolin 0.5% Zno |
| 104 | MK + Cao + Zno | 200 | 0.3 | 21.1 | 30 | 7 | 0.02 | 66.25% Cao 33.25% Metakaolin 0.5% Zno |
| 105 | ZnO | 200 | 0.3 | 5.3 | 30 | 7 | 4.5 | |
| 106 | ZnO | 200 | 0.3 | 13.4 | 30 | 7 | 11.6 | |
| 107 | ZnO | 200 | 0.3 | 21.1 | 30 | 7 | 18.6 | |

Example 14

This experiment was performed to show the effect of calcination temperature on the composition of the composite ash/capture agent, and the reactivity of calcined product. Some of the experimental results obtained are represented by the following information provided in Tables 11 and 12.

TABLE 11

| | CaO | SiO2 | Al2O3 | TiO2 | MgO | Fe2O3 | K2O | SO3 | Cl | La2O3 | SrO |
|---|---|---|---|---|---|---|---|---|---|---|---|
| R_1000 | 65.8 | 23.00 | 4.09 | 2.23 | 1.6 | 1.57 | 0.391 | 0.323 | 0.14 | 0.0549 | 0.0548 |
| R_800 post process | 61.8 | 24.60 | 5.37 | 2.69 | 1.67 | 1.92 | 0.388 | 0.34 | 0.11 | 0.0967 | 0.0392 |

| | Sm2O5 | ZrO | CeO2 | CuO | MnO | Na2O | P2O5 | ZnO |
|---|---|---|---|---|---|---|---|---|
| R_1000 | 0.0424 | 0.037 | 0.0367 | 0.0321 | 0.0316 | 0.218 | 0.187 | 0.168 |
| R_800 post process | 0.0543 | 0.0439 | 0.0547 | 0.037 | 0.0352 | 0 | 0.27 | 0.4 |

TABLE 12

| | Reactivity (Δ ° C. in 3 min) | LOI @1000° C. | pH (reactivity t = 0) |
|---|---|---|---|
| R_800 | 3.7 | 1.78% | 13.04 |
| R_850 | 4.5 | 0.99% | 13.33 |
| R_900 | 3.2 | 2.48% | 13.54 |
| R_950 | 4.4 | 0.65% | 13.44 |
| R_1000 | 4.2 | 0.57% | 13.57 |
| R_850 Cal. | | 1.09% | |

The information in Tables 11 and 12 illustrate individual trials, wherein the "###" portion is indicative of the applied calcination temperature for production of that trial's composite ash.

Example 15

Figure 3:
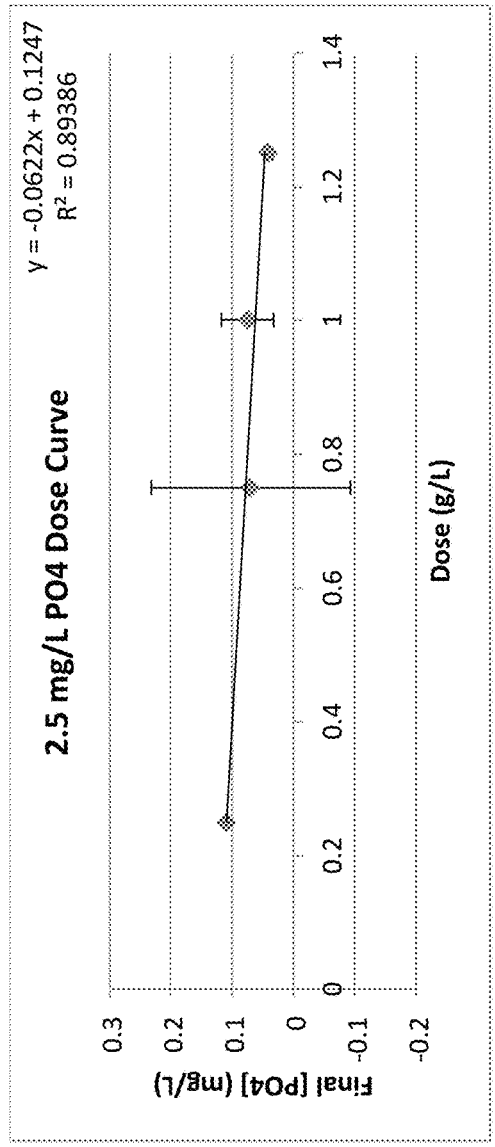
FIG. 3 illustrates the established dose curves for $[PO_4]$ at 2.5 mg/L as the experimental results for Example 15.
Figure 3:
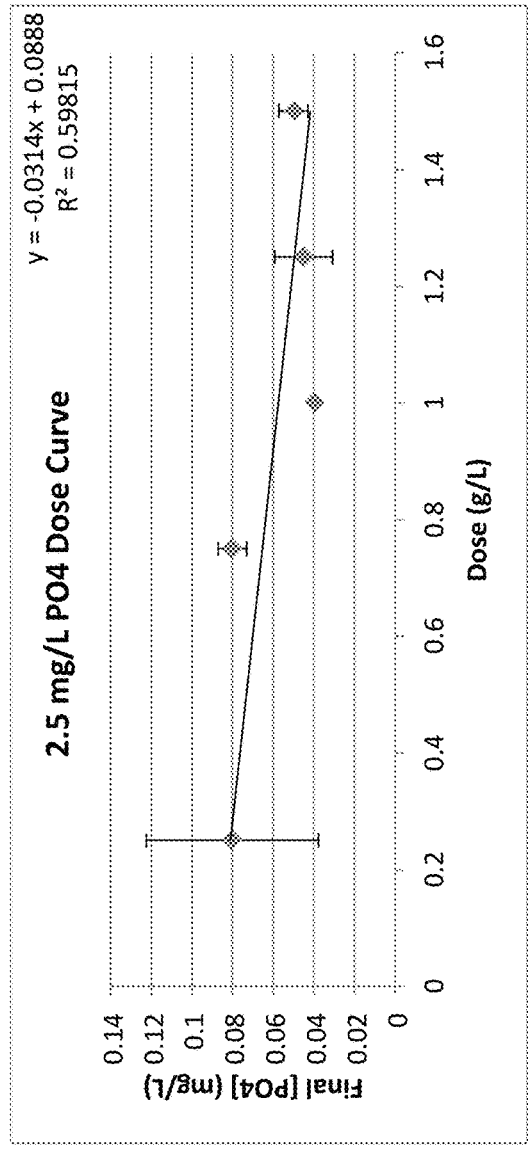
Figure 4:
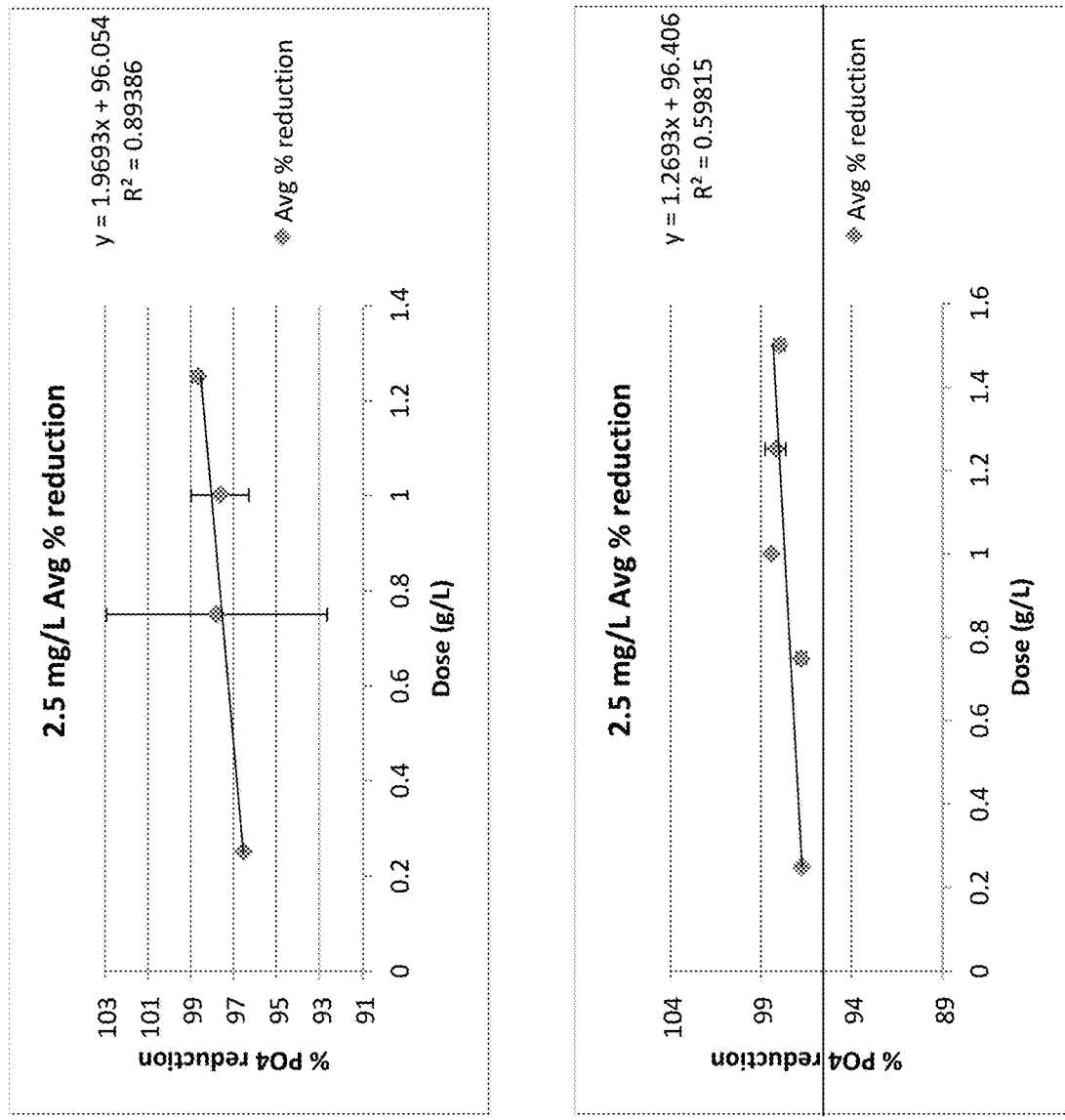
FIG. 4 illustrates the $[PO_4]$ average percent reductions relative to the dose curves of FIG. 3 for Example 15.
Figure 5:
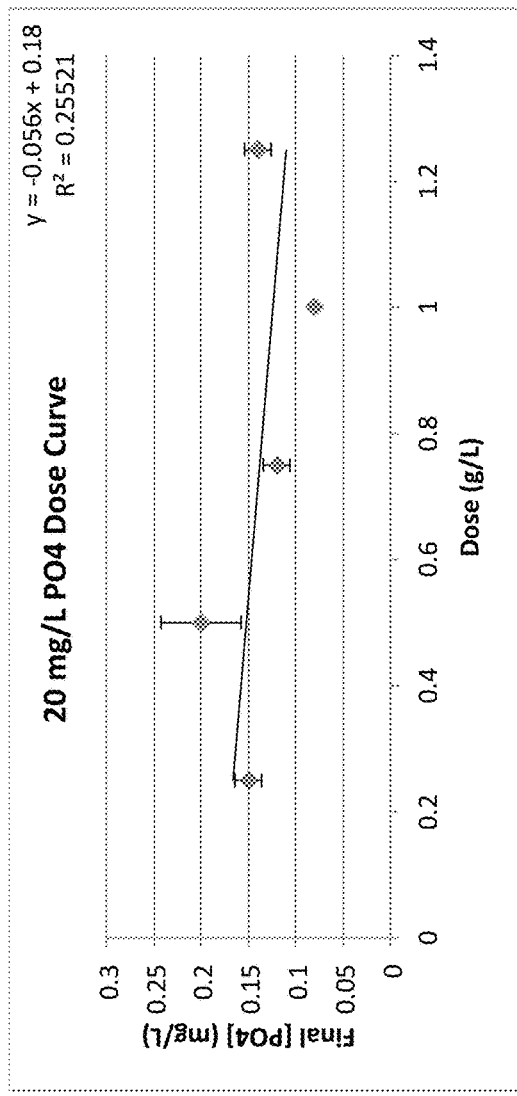
FIG. 5 illustrates the established dose curves for $[PO_4]$ at 20.0 mg/L as the experimental results for Example 15.
Figure 5:
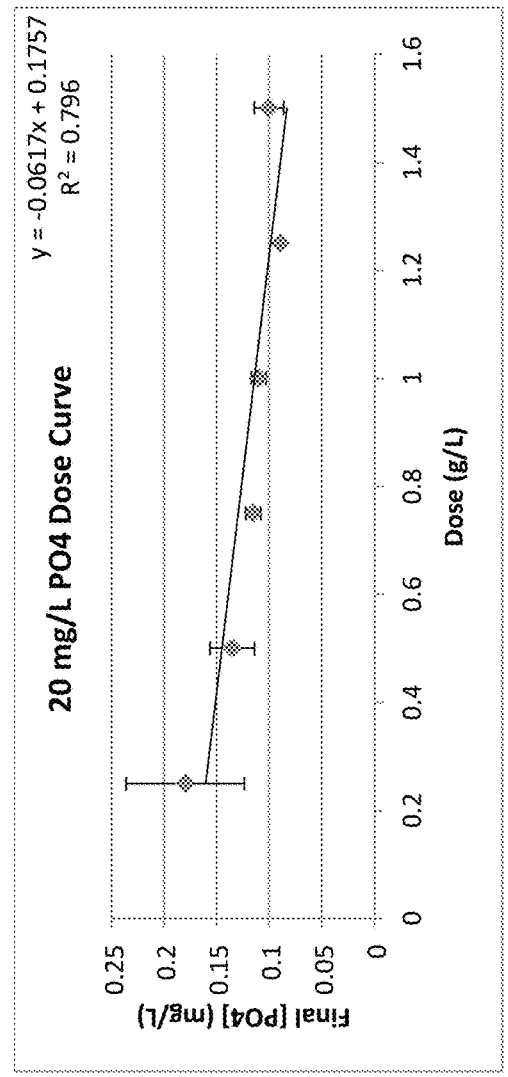
Figure 6:
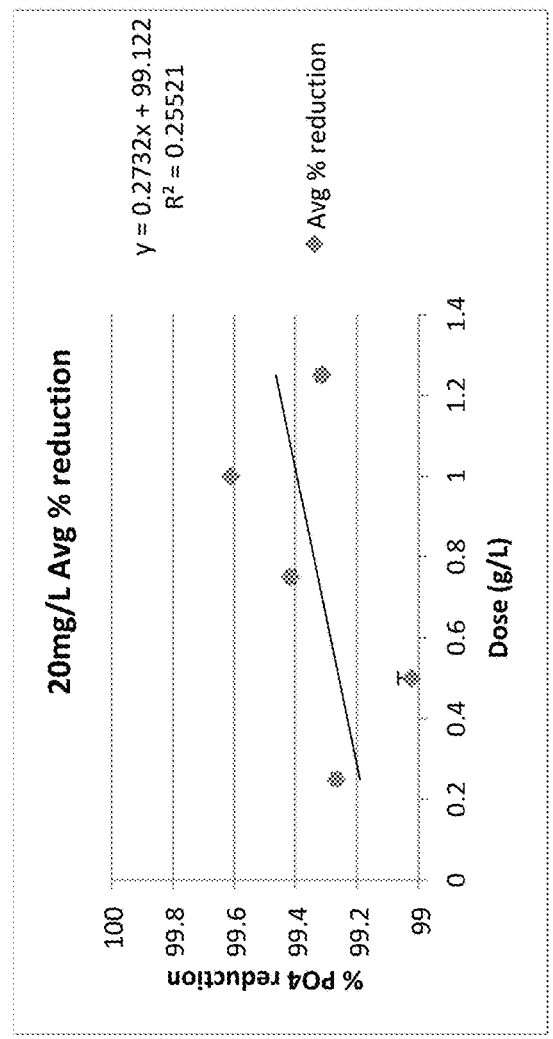
FIG. 6 illustrates the $[PO_4]$ average percent reduction relative to the dose curves of FIG. 5 for Example 15.
Figure 6:
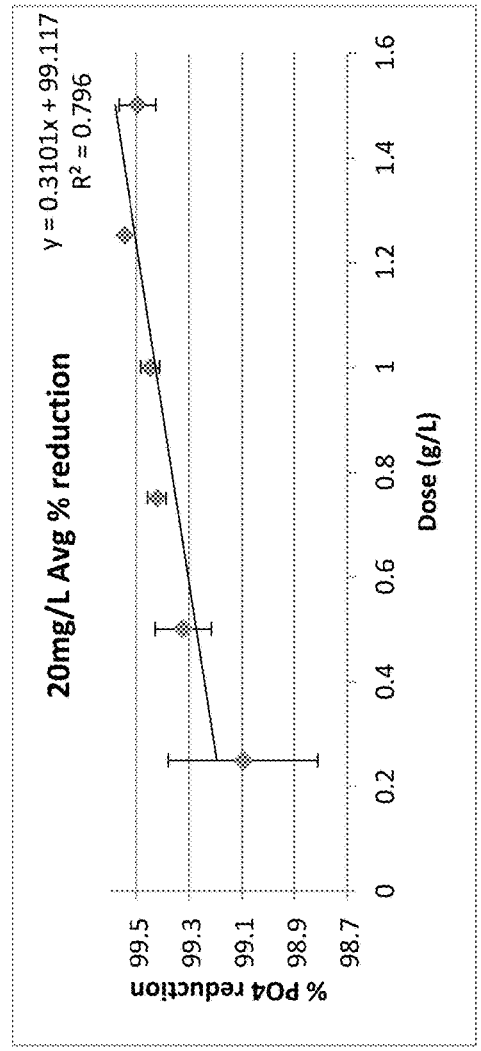

This experiment was performed to establish a dose curve for [PO$_4$]. Some of the experimental results obtained are represented by the following information provided in FIGS. 3-6. FIG. 3 illustrates the established dose curves for [PO$_4$] at 2.5 mg/L. FIG. 4 illustrates the [PO$_4$] average percent reductions relative to the dose curves of FIG. 3. FIG. 5 illustrates the established dose curves for [PO$_4$] at 20.0 mg/L. FIG. 6 illustrates the [PO$_4$] average percent reduction relative to the dose curves of FIG. 5.

Examples 16-19

The following are four (4) illustrative examples of the process of the present invention, specifically performed to determine how slurry-dosing effects compared to dry-dosing effects for waste water treatment. It was expected that the slurried form had large scale production advantages. These experiments also sought to determine the highest % solid that would give good results without having the inherent problems of mixing. Conductivity was also monitored to give some indication of the salt content remaining in the water after treatment.

Example 16

5% Slurry

Some of the experimental results obtained are represented by the following information provided in Tables 13-17.

TABLE 13

| Slurry Slaking | | |
|---|---|---|
| Time (min) | pH | Temp (° C.) |
| 0 | 11 | 27.7 |
| 5 | 11.05 | 39.2 |
| 10 | 11.08 | 49.1 |
| 15 | 11.25 | 46.8 |
| 20 | 11.66 | 53.7 |
| 25 | 11.51 | 54.4 |
| 30 | 11.42 | 51.1 |
| 35 | 11.6 | 54.52 |
| 40 | 11.17 | 56.7 |
| 42 | 11.79 | 61.3 |
| 45 | 10.94 | 55.3 |
| 47 | 10.86 | 57.1 |
| 50 | 10.85 | 53.8 |
| 60 | 10.78 | 55.7 |
| 84.5 | na8.8 | 38.9 |
| 89.8 | 10.13 | 37.6 |
| 120 | 10.08 | 26.3 |

TABLE 14

| SAMPLES - 5% slurry Low | | | | | |
|---|---|---|---|---|---|
| Cal check | Sample | [PO4] mg/L Method 8048 (<2.5 mg/L) | stdev | PO4 reduction (%) | stdev |
| 2.53 | Slurry 5L1 | 0.06 | | 97.628 | |
| 2.53 | Slurry 5L2 | 0.01 | | 99.605 | |
| 2.53 | Slurry 5L3 | 0.07 | | 97.233 | |
| | Slurry AVG | 0.047 | 0.032 | 98.155 | 1.271 |
| 2.5 | Dry 2.5 mg/L + 900 C. | 0.29 | | 88.371 | dry comparison |
| | Avg Slurry % increase over dry | | | 11.07 | |

TABLE 15

| | Conductivity mS/cm @ t (min) | | | | | | | | | |
|---|---|---|---|---|---|---|---|---|---|---|
| Sample | 0 | 5 | 10 | 15 | 20 | 25 | 30 | post centri-fuge | % Cond loss | stdev |
| 5L1 | 2.67 | 2.79 | 2.79 | 2.77 | 2.73 | 2.72 | 2.69 | 2.53 | 5.24 | |
| 5L2 | 2.81 | 2.81 | 2.79 | 2.77 | 2.74 | 2.72 | 2.69 | 2.47 | 12.10 | |
| 5L3 | 2.74 | 2.74 | 2.73 | 2.69 | 2.67 | 2.65 | 2.63 | 2.37 | 13.50 | |
| | | | | | | | | AVG | 10.28 | 4.419835 |

TABLE 16

| | SAMPLES - 5% slurry High | | | | |
|---|---|---|---|---|---|
| Cal check | Sample | [PO4] mg/L Method 8048 (<2.5 mg/L) | stdev | PO4 reduction (%) | stdev |
| 20.5 | Slurry 5H1 | 0.08 | | 99.610 | |
| 20.5 | Slurry 5H2 | 0.04 | | 99.805 | |
| 20.5 | Slurry 5H3 | 0.03 | | 99.854 | |
| | Slurry Average | 0.050 | 0.0265 | 99.756 | 0.129061 |
| 20 | 20 mg/L + 900 C. | 0.34 | 98.283 | dry comparison | |
| | Avg Slurry % increase over dry | 1.50 | | | |

TABLE 17

| | Conductivity mS/cm @ t (min) | | | | | | | | | |
|---|---|---|---|---|---|---|---|---|---|---|
| Sample | 0 | 5 | 10 | 15 | 20 | 25 | 30 | post centri-fuge | % Cond loss | |
| 5H1 | 2.78 | 2.78 | 2.77 | 2.75 | 2.73 | 2.69 | 2.69 | 2.36 | 15.11 | |
| 5H2 | 2.75 | 2.75 | 2.73 | 2.72 | 2.69 | 2.67 | 2.65 | 2.46 | 10.55 | |
| 5H3 | 2.75 | 2.75 | 2.73 | 2.71 | 2.69 | 2.67 | 2.65 | 2.43 | 11.64 | stdev |
| | | | | | | | | avg cond loss | 12.43 | 2.38 |

Example 17

10% Slurry

Some of the experimental results obtained are represented by the following information provided in Tables 18-22.

TABLE 18

| Slurry Slaking | | |
|---|---|---|
| Time (min) | pH | temp (° C.) |
| 0 | 12.16 | 25.8 |
| 5 | 11.34 | 33.7 |
| 10 | 11.33 | 36.2 |
| 15 | 11.35 | 41.2 |
| 20 | 11.28 | 42.7 |
| 25 | 11.28 | 44.4 |
| 30 | 11.3 | 45.3 |
| 35 | 11.32 | 46.6 |
| 40 | 11.33 | 47.4 |
| 45 | 11.35 | 48.7 |
| 50 | 11.41 | 49.3 |
| 55 | 11.44 | 50.6 |
| 60 | 11.49 | 49.9 |
| 65 | 11.54 | 49.2 |

TABLE 19

SAMPLES - 10% slurry Low

| Cal check | Sample | [PO4] mg/L Method 8048 (<2.5 mg/L) | stdev | PO4 reduction (%) | stdev |
|---|---|---|---|---|---|
| 2.48 | 10L1 | 0.05 | | 97.984 | |
| 2.48 | 10L2 | 0.18 | | 92.742 | |
| 2.48 | 10L3 | 0.05 | | 97.984 | |
| | Slurry Average | 0.093 | 0.075 | 96.237 | 3.026 |
| 2.5 | Dry 2.5 mg/L + 900 C. | 0.29 | | 88.371 | dry compare |
| | Avg Slurry % increase over dry | | | 8.90 | |

TABLE 20

Conductivity mS/cm @ T (min)

| Name | pre-add | 0 | 5 | 10 | 15 | 20 | 25 | 30 | post centri-fuge | % Cond loss | stdev |
|---|---|---|---|---|---|---|---|---|---|---|---|
| 10L1 | 0.029 | 2.67 | 2.69 | 2.68 | 2.67 | 2.66 | 2.64 | 2.62 | 2.47 | 7.49 | |
| 10L2 | 0.0054 | 2.65 | 2.67 | 2.66 | 2.65 | 2.63 | 2.61 | 2.58 | 2.42 | 8.6792 | |
| 10L3 | 0.0052 | 2.58 | 2.61 | 2.6 | 2.59 | 2.57 | 2.56 | 2.53 | 2.36 | 8.5271 | |
| | | | | | | | | | AVG | 8.23 | 0.646 |

TABLE 21

SAMPLES - 10% slurry High

| Cal check | Sample | [PO4] mg/L Method 8048 (<2.5 mg/L) | stdev | PO4 reduction (%) | stdev |
|---|---|---|---|---|---|
| 20.5 | 10H1 | 0.06 | | 99.707 | |
| 20.5 | 10H2 | 0.19 | | 99.073 | |
| 20.5 | 10H3 | 0.14 | | 99.317 | |
| | Slurry Average | 0.130 | 0.066 | 99.366 | 0.3199 |
| | 20 mg/L + 900 C. | 0.34 | | 98.283 | dry comparison |
| | Avg Slurry % increase over dry | | | 1.10 | |

TABLE 22

Conductivity mS/cm @

| ame | pre-add | 0 | 5 | 10 | 15 | 20 | 25 | 30 | post centri-fuge | % Cond loss | stdev |
|---|---|---|---|---|---|---|---|---|---|---|---|
| 10H1 | 0.0024 | 2.6 | 2.62 | 2.61 | 2.61 | 2.59 | 2.58 | 2.56 | 2.46 | 5.38 | |
| 10H2 | 0.0023 | 2.61 | 2.62 | 2.61 | 2.61 | 2.59 | 2.58 | 2.56 | 2.35 | 9.96 | |
| 10H3 | 0.0023 | 2.59 | 2.61 | 2.6 | 2.6 | 2.58 | 2.56 | 2.54 | 2.31 | 10.81 | |
| | | | | | | | | | AVG | 8.719 | 2.919 |

Example 18

15% Slurry

TABLE 23

Slurry Slaking

| Time (min) | pH | Temp (° C.) |
|---|---|---|
| 0 | 11.89 | 30.5 |
| 5 | 12.03 | 34 |
| 10 | 12.01 | 38 |
| 15 | 12.05 | 41.9 |
| 20 | 12.05 | 44.6 |
| 25 | 12.05 | 47.5 |
| 30 | 12.03 | 49 |
| 35 | 12.02 | 49.9 |
| 40 | 11.96 | 48 |
| 45 | 11.9 | 50 |
| 50 | 11.83 | 50.8 |
| 55 | 11.79 | 51.8 |

TABLE 23-continued

Slurry Slaking

| Time (min) | pH | Temp (° C.) |
|---|---|---|
| 60 | 11.78 | 53.4 |
| 65 | 11.81 | 54 |
| 70 | 11.83 | 53.5 |
| 75 | 11.81 | 54.4 |

Some of the experimental results obtained are represented by the following information provided in Tables 23-27.

TABLE 24

SAMPLES - 15% slurry Low

| Cal check | Sample | [PO4] mg/L Method 8048 (<2.5 mg/L) | stdev | PO4 reduction (%) | stdev |
|---|---|---|---|---|---|
| 2.47 | 15L1 | 0.02 | | 99.190 | |
| 2.47 | 15L2 | 0.09 | | 96.356 | |
| 2.47 | 15L3 | 0.06 | | 97.571 | |
| | Slurry Average | 0.057 | 0.035 | 97.706 | 1.42 |
| 2.5 | Dry 2.5 mg/L + 900 C. | 0.29 | 88.371 | dry comparison | |
| | Avg Slurry % increase over dry | 10.56 | | | |

TABLE 25

Conductivity mS/cm @ t (min)

| Name | pre-add | 0 | 5 | 10 | 15 | 20 | 25 | 30 | post centri-fuge | % Cond loss | stdev |
|---|---|---|---|---|---|---|---|---|---|---|---|
| 15L1 | 0.0148 | 2.71 | 2.74 | 2.72 | 2.71 | 2.69 | 2.67 | 2.65 | 2.41 | 11.07 | |
| 15L2 | 0.0052 | 2.67 | 2.69 | 2.67 | 2.65 | 2.64 | 2.62 | 2.59 | 2.32 | 13.11 | |
| 15L3 | 0.0057 | 2.72 | 2.73 | 2.72 | 2.7 | 2.68 | 2.66 | 2.64 | 2.38 | 12.5 | |
| | | | | | | | | | AVG | 12.23 | 1.046 |

TABLE 26

SAMPLES - 15% slurry High

| Cal check | Sample | [PO4] mg/L Method 8048 (<2.5 mg/L) | stdev | PO4 reduction (%) | stdev |
|---|---|---|---|---|---|
| 20.5 | 15H1 | 0.09 | | 99.561 | |
| 20.5 | 15H2 | 0.09 | | 99.561 | |
| 20.5 | 15H3 | 0.05 | | 99.756 | |
| | Slurry Average | 0.077 | 0.023 | 99.626 | 0.112 |
| 20 | 20 mg/L + 900 C. | 0.34 | | 98.283 | dry comparison |
| | Slurry % increase over dry | 1.37 | | | |

TABLE 27

Conductivity mS/cm @ t (min)

| Name | pre-add | 0 | 5 | 10 | 15 | 20 | 25 | 30 | post centri-fuge | % Cond loss | stdev |
|---|---|---|---|---|---|---|---|---|---|---|---|
| 15H1 | 0.0251 | 2.69 | 2.73 | 2.72 | 2.7 | 2.68 | 2.66 | 2.65 | 2.47 | 8.18 | |
| 15H2 | 0.0252 | 2.65 | 2.69 | 2.67 | 2.65 | 2.63 | 2.61 | 2.6 | 2.39 | 9.81 | |
| 15H3 | 0.0248 | 2.64 | 2.66 | 2.65 | 2.63 | 2.62 | 2.6 | 2.59 | 2.43 | 7.95 | |
| | | | | | | | | | AVG | 8.65 | 1.014 |

Example 19

20% Slurry

Some of the experimental results obtained are represented by the following information provided in Tables 28-32.

TABLE 28

20% Slurry Slaking

| Time (min) | pH | Temp (° C.) |
|---|---|---|
| 0 | 12.74 | 29.2 |
| 5 | 12.51 | 36.7 |
| 10 | 12.41 | 39.5 |
| 15 | 12.36 | 43.1 |
| 20 | 12.32 | 46 |
| 25 | 12.31 | 47.4 |
| 30 | 12.24 | 49.6 |
| 35 | 12.19 | 51.5 |
| 40 | 12.21 | 52.3 |

TABLE 28-continued

20% Slurry Slaking

| Time (min) | pH | Temp (° C.) |
|---|---|---|
| 45 | 12.19 | 52.8 |
| 50 | 12.16 | 53.3 |
| 55 | 12.12 | 54.1 |
| 60 | 12.24 | 53.3 |
| 65 | 12.18 | 52.1 |

TABLE 29

SAMPLES - 20% slurry Low

| Cal check | Sample | [PO4] mg/L Method 8048 (<2.5 mg/L) | stdev | PO4 reduction (%) | stdev |
|---|---|---|---|---|---|
| 2.43 | 20L1 | 0.08 | | 96.708 | |
| 2.43 | 20L2 | 0.01 | | 99.588 | |
| 2.43 | 20L3 | 0.04 | | 98.354 | |
| | Slurry Avg | 0.043 | 0.035 | 98.217 | 1.445 |

TABLE 29-continued

SAMPLES - 20% slurry Low

| Cal check | Sample | [PO4] mg/L Method 8048 (<2.5 mg/L) | stdev | PO4 reduction (%) | stdev |
|---|---|---|---|---|---|
| 2.5 | 2.5 mg/L + 900 C. | 0.29 | 88.371 | dry comparison | |
| | Avg Slurry % increase over dry | 11.14 | | | |

TABLE 30

Conductivity mS/cm @ t min)

| Sample | pre-add | 0 | 5 | 10 | 15 | 20 | 25 | 30 | post centri-fuge | % Cond loss | stdev |
|---|---|---|---|---|---|---|---|---|---|---|---|
| 20L1 | 0.00747 | 2.43 | 2.48 | 2.48 | 2.45 | 2.45 | 2.44 | 2.43 | 2.22 | 8.6 | |
| 20L2 | 0.00758 | 2.4 | 2.43 | 2.43 | 2.41 | 2.4 | 2.38 | 2.36 | 2.22 | 7.5 | |
| 20L3 | 0.00703 | 2.44 | 2.47 | 2.47 | 2.45 | 2.43 | 2.41 | 2.4 | 2.21 | 9.4 | |
| | | | | | | | | | AVG | 8.5 | 0.969 |

TABLE 31

SAMPLES - 20% slurry High

| Cal check | Sample | [PO4] mg/L Method 8048 (<2.5 mg/L) | stdev | PO4 reduction (%) | stdev |
|---|---|---|---|---|---|
| 20.4 | 20H1 | 0.08 | | 99.608 | |
| 20.4 | 20H2 | 0.1 | | 99.510 | |
| 20.4 | 20H3 | 0.03 | | 99.853 | |
| | Slurry Avg | 0.070 | 0.036 | 99.657 | 0.177 |
| | 20 mg/L + 900 C. | 0.34 | 98.283 | dry comparison | |
| | Avg Slurry % increase over dry | 1.40 | | | |

TABLE 32

Conductivity mS/cm @ t (min)

| Sample | pre-add | 0 | 5 | 10 | 15 | 20 | 25 | 30 | post centri-fuge | % Cond loss | stdev |
|---|---|---|---|---|---|---|---|---|---|---|---|
| 20H1 | 0.0306 | 2.44 | 2.48 | 2.47 | 2.45 | 2.43 | 2.41 | 2.4 | 2.3 | 5.74 | |
| 20H2 | 0.0263 | 2.44 | 2.48 | 2.47 | 2.45 | 2.43 | 2.41 | 2.39 | 2.25 | 7.79 | |
| 20H3 | 0.0256 | 2.38 | 2.41 | 2.4 | 2.38 | 2.36 | 2.34 | 2.33 | 2.19 | 7.98 | |
| | | | | | | | | | AVG | 7.17 | 1.24 |

Examples 20-21

The following are two illustrative examples of the process of the present invention, specifically performed for three objectives: (1) to determine which specific acid was most effective at neutralization; (2) to determine what effect combining the composite-ash/capture-material dosage, and the acid neutralization, into the same step (before centrifugation), had on final [PO$_4$]; and (3) to determine if significantly-improved reduction was seen at pH 7 than pH 8.

Example 20

2.5 mg/L Initial [PO$_4$]

Some of the experimental results obtained are represented by the following information provided in Tables 33-36.

TABLE 33

10% HNO3

| Total mL added | pH | post cent pH |
|---|---|---|
| 0 | 12.44 | |
| 0.5 | 12.41 | |
| 1.5 | 12.27 | |
| 2.5 | 12.02 | |
| 3.5 | 11.43 | |
| 4.5 | 10.72 | |

TABLE 33-continued

10% HNO3

| Total mL added | pH | post cent pH |
|---|---|---|
| 5 | 10.57 | |
| 6 | 9.33 | |
| 6.5 | 8.41 | 9.11 |
| 7 | 7.7 | |
| 7.1 | 7.87 | |
| 7.3 | 6.9 | 8.03 |

TABLE 34

10% H2SO4

| total mL added | pH | post cent pH |
|---|---|---|
| 0 | 12.47 | |
| 0.5 | 12.37 | |
| 1.5 | 11.99 | |
| 2.5 | 10.83 | |
| 3 | 10.79 | |
| 3.5 | 9.35 | |
| 4 | 8.59 | |
| 4.5 | 8.25 | |
| 4.7 | 5.59 | |
| 4.75 | 8.33 | |
| 4.8 | 7.81 | 8.4 |
| 4.9 | 6.16 | |
| 4.95 | 8.61 | |
| 5 | 7.69 | |
| 5.025 | 7.21 | 7.16 |

TABLE 35

10% H3PO4

| total mL added | pH | post cent pH |
|---|---|---|
| 0 | 12.46 | |
| 0.5 | 12.32 | |
| 1.5 | 11.64 | |
| 2.5 | 8.55 | |
| 2.6 | 8.87 | |
| 2.8 | 8.4 | |
| 2.9 | 8.34 | |
| 3.1 | 8.24 | |
| 3.3 | 7.84 | 7.63 |
| 3.4 | 7.92 | |
| 3.5 | 7.78 | |
| 3.6 | 7.64 | |
| 3.7 | 7.32 | |
| 3.75 | 7.23 | 7.29 |

TABLE 36

| [PO4] Acid Addition post centri- fuge | control | PO4 reduction (%) control | pH8 | PO4 reduction (%) pH 8 | pH7 | PO4 reduction (%) pH 7 |
|---|---|---|---|---|---|---|
| 2.47 control | 0.05 | 99.980 | | | | |
| 2.47 HNO3 | | | 0.9 | 99.636 | 0.12 | 99.951 |
| 2.47 H3PO4 | | | 30 | 0.000 | 30 | 0.000 |
| 2.47 H2SO4 | | | 0.19 | 99.923 | 0.15 | 99.939 |

Example 21

20 mg/L Initial [PO$_4$]

Some of the experimental results obtained are represented by the following information provided in Tables 37-42.

TABLE 37

10% HNO3 #1

| total mL added | pH | post cent pH |
|---|---|---|
| 0 | 12.48 | |
| 1 | 12.33 | |
| 2 | 11.82 | |
| 2.5 | 10.73 | |

TABLE 37-continued

10% HNO3 #1

| total mL added | pH | post cent pH |
|---|---|---|
| 3 | 8.72 | |
| 3.025 | 8.87 | |
| 3.05 | 8.93 | |
| 3.075 | 8.82 | |
| 3.1 | 8.73 | |
| 3.125 | 8.97 | |
| 3.15 | 8.67 | |
| 3.175 | 9.26 | |
| 3.275 | 8.83 | 8.83 |
| 3.375 | 8.73 | |
| 3.475 | 8.24 | |
| 3.575 | 8.14 | |
| 3.6 | 8.03 | |
| 3.625 | 8.81 | |
| 3.675 | 7.78 | |
| 3.7 | 7.49 | |
| 3.725 | 7.48 | |
| 3.75 | 7.44 | |
| 3.775 | 7.47 | |
| 3.8 | 7.32 | |
| 3.825 | 7.18 | 5.78 |

TABLE 38

10% HNO3 #2

| total mL added | pH | post cent pH |
|---|---|---|
| 0 | 12.53 | |
| 1 | 12.36 | |
| 2 | 11.82 | |
| 2.5 | 10.75 | |
| 3 | 8.76 | |
| 3.025 | 9.09 | |
| 3.05 | 8.91 | |
| 3.075 | 8.79 | |
| 3.1 | 8.99 | |
| 3.125 | 8.98 | |
| 3.15 | 8.97 | |
| 3.175 | 9.29 | |
| 3.275 | 8.76 | 8.82 |
| 3.275 | 8.76 | 8.82 |
| 3.375 | 8.68 | |
| 3.475 | 8.48 | |
| 3.575 | 8.15 | |
| 3.6 | 8.31 | |
| 3.625 | 8.79 | |
| 3.675 | 8.18 | |
| 3.7 | 7.48 | |
| 3.725 | 7.45 | |
| 3.75 | 7.4 | |
| 3.775 | 7.4 | |
| 3.8 | 7.24 | |
| 3.825 | 7.14 | 6.78 |

TABLE 39

10% H3PO4 #1

| total mL added | pH | post cent pH |
|---|---|---|
| 0 | 12.56 | |
| 1 | 11.57 | |
| 2 | 7.59 | 7.9 |
| 2.1 | 7.78 | |
| 2.2 | 7.5 | |
| 2.225 | 7.34 | |
| 2.25 | 7.32 | |
| 2.275 | 7.28 | |
| 2.325 | 7.08 | 7.15 |

TABLE 40

10% H3PO4 #2

| total mL added | pH | post cent pH |
|---|---|---|
| 0 | 12.56 | |
| 1 | 11.5 | |
| 2 | 7.63 | 7.88 |
| 2.1 | 7.8 | |
| 2.2 | 7.48 | |
| 2.225 | 7.33 | |
| 2.25 | 7.2 | |
| 2.275 | 7.2 | |
| 2.325 | 7 | 7.08 |

TABLE 41

H2SO4

| | total mL added | pH | post cent pH |
|---|---|---|---|
| | 0 | 12.13 | |
| | 1 | 11.32 | |
| | 2 | 7.22 | |
| NaOH | 2.025 | 8.27 | |
| | 2.125 | 7.43 | |
| NaOH | 2.15 | 9.03 | |
| | 2.175 | 8.21 | 7.79 |
| | 2.2 | 7.34 | |
| | 2.225 | 7.22 | 7.25 |

TABLE 42

| | Final [PO4] (mg/L) | | | | Final [PO4] (mg/L) pH 8 | | | PO4 reduction (%) | | |
|---|---|---|---|---|---|---|---|---|---|---|
| Sample Name | control | control stdev | control | control avg | control stdev | pH8 | Avg final [PO4] | stdev | pH 8 | pH8 Avg | stdev |
| control Avg | 0.05 0.01 | 0.028 | 99.998 100.000 | 99.999 | 0.001 | | | | | | |
| HNO3 Avg | | | | | | 1.5 1.56 | 1.530 | 0.042 | 99.926 99.924 | 99.925 | 0.002 |
| H3PO4 Avg | | | | | | 30 30 | 30.000 | 0.000 | 0.000 0.000 | 0.000 | 0 |
| H2SO4 Avg | | | | | | 1.04 0.9 | 0.970 | 0.099 | 99.949 99.956 | 99.952 | 0.0048 |

| | Final [PO4] (mg/L) pH 7 | | | PO4 reduction (%) | | |
|---|---|---|---|---|---|---|
| Sample Name | pH7 | Avg final [PO4] | stdev | pH 7 | pH 7 Avg | stdev |
| control Avg | | | | | | |
| HNO3 Avg | 0.42 0.42 | 0.420 | 0 | 99.979 99.979 | 99.979 | 0 |
| H3PO4 Avg | 30 30 | 30.000 | 0 | 0.000 0.000 | 0.000 | 0 |
| H2SO4 Avg | 0.51 0.47 | 0.490 | 0.0283 | 99.975 99.977 | 99.976 | 0.0014 |

Returning to FIG. 1, other exemplary embodiments of the method of the present invention can also include the optimizing of the production and recycling of materials from a source of a waste or by-product stream which contain recoverable minerals, fillers, or pigments, recovering those materials, and recycling them to the source or other end users including the following non-limiting steps:

a) locating and identifying sources of waste or by-product streams containing recoverable mineral, fillers, and/or pigments;

b) determining the susceptibility of said streams to treatments producing a product for sale or recycling to the source of the waste or by-product streams or to other end users;

c) gathering information and storing said information for retrieval and use from various sources and experts related to the construction and operation of an energy and minerals recovery facility on-site or adjacent to said source of said waste or by-product streams;

d) analyzing the data produced by the determination of step b) and that data produced by step c);

e) performing a cost benefit analysis of the data produced by the analysis of step d) with regard to: the ecological balance, the materials balance, the energy balance, and the financial/economic balance;

f) integrating and optimizing the analysis of step e) to synthesize, optimize and produce a proposed course of action to the mutual benefit of the owners of said source and the owners and operators of the process of the present invention including the independent operation or integration of various unit operations phases, options and processes of the various and respective plants on a regional, geographic or territorial, optimized cluster basis;

g) negotiating with said source of said waste or by-product streams regarding the construction and operation of an energy and minerals recovery facility on said source's site or adjacent thereto and with regard to the integration of various plants and operations;

h) negotiating with material suppliers to supply materials to said energy and minerals recovery facility;

i) constructing and operating the various independent or integrated operations on a regional, geographic or territorial, optimized cluster basis including plant on-site of said source or adjacent to said source or in a regional, geographic or territorial, optimized cluster location with regard to one or more sources;

j) receiving waste materials from said sources;
k) treating said waste materials from said sources in said energy and minerals recovery facility; and
l) returning a portion of said waste material to the source or sources in the form of materials including materials/minerals/fillers/pigments in forms suitable or adaptable for use in processes carried out by said sources.

As such, the system and method of method 10 is also related to administering and positioning the assets and processes associated with the waste stream processing of the EWS and the municipal wastewaters.

Turning back again to FIG. 2, an illustrative regional system may incorporate the various sub-systems and/or equipment of FIG. 2, for example, the exemplary kiln, calciner, calcined-intermediate processor, and/or final composite-ash handler, and the diagram of the illustrative regional system may illustrate exemplary sub-systems, equipment, relative positionings, and/or interconnections, not all of which are necessarily employed in each and every situation. Similarly, the illustrative integration system may incorporate the various sub-systems and/or equipment of FIG. 2, for example, the exemplary kiln, calciner, calcined-intermediate processor, and/or final composite-ash handler, and the diagram of the illustrative integration system may illustrate exemplary sub-systems, equipment, relative positionings, and/or interconnections, not all of which are necessarily employed in each and every situation.

More specifically, the exemplary embodiment of FIG. 2 is a regional system 20 comprising various sub-systems, equipment, means of communication, conduits, etc., exhibiting strategic, relative positioning, readily understood by a person of ordinary skill in the art interpreting the schematic diagram, for applying the inventive method 10, for example. The system 20 is regional in the sense that the sub-systems and equipment responsible for the production of the composite ash, may be situated in proximity (i.e., within 50 miles, for example) to high-concentration DIR processing centers, and within a similar proximity to independent, third-party, or remote, wastewater processing centers. The regional centers are greenfield, and hosted by a strategic DIR processing partner, which subsequently facilitates secondary-servicing to nearby, independent DIR processors.

More specifically, the regional system 20 and its sub-systems and equipments, etc. are spread out over a vast, operational network. The operational network may link various sub-process stations and locations that are intended to handle specific portions of method 10. For example, the FRONT END GROUPING of method 10 (receiving and preliminarily processing a paper or carpet exothermic processing waste stream 102, thermally processing a paper or carpet exothermic processing waste stream 104, producing and recovering energy from the thermal processing of the paper or carpet exothermic processing waste stream 106, and recovering minerals from the waste and producing a composite ash, as a PC or PI collecting/precipitating agent 108) may be primarily handled at the high-concentration DIR processing center, while secondary efforts may be handled at the regional centers within proximity to the high-concentration DIR processing center. A person of ordinary skill in the art understands that this allows efficiencies and efficacies to facilitate regional waste-management, without having to implement multiple redundant operations in one region or municipality. Similarly, a person of ordinary skill in the art understands that the efficiencies of the inventive concept allow for this type of regional set-up, to avoid redundancies.

As such, it is envisioned that certain sub-process stations and locations of the regional system 20 may be entirely separate, in term of locations and operations and personnel and equipment, while others may be adaptable and movable to have the same location and operations infrastructure (at least partially) as another sub-process station or location, as needed or as required. In the most general sense, the network links may interconnect, via supply chains and continuous/interdependent processes, for example, various stages of the waste stream processing.

Next, the exemplary embodiment of FIG. also may be an integration system 40 comprising various sub-systems, equipment, means of communication, conduits, etc., exhibiting strategic, relative positioning, readily understood by a person of ordinary skill in the art interpreting the schematic diagram, for applying the inventive method 10, for example. The system 40 is integrative in the sense that the sub-systems and equipment responsible for the production of the composite ash, may be fully integrated into the operations and infrastructure of a high-concentration DIR processing center (no regional and geographically-distant operations needed). The system 40 is further characterized as integrated, in the holistic regional/municipal waste stream processing sense, as the system 40, with integrated composite ash/chemical precursor operations like system 20, is also fully integrated with nearby, municipal WWTP operations, for example. As such, the system 40 inherently comprises cooperative and coordinated operations-managements and a sharing of physical space, land, equipment, technical personnel, and/or management to facilitate the efficiencies and efficacies of the present invention.

More specifically, the integration system 40 and its sub-systems and equipment, etc. are, unlike the regional system 20 of FIG. 2, not spread out over a vast, operational network. However, this does not mean that the system 40 does not comprise operational-networks that link the various sub-process stations/locations, which are intended to handle specific portions of method 10. Instead, this means that the distances between the sub-systems and equipment of integration system 40 are minimized to squeeze as much efficiency as possible, and to yield as much recycled outputs as possible in positive feedback with the system 40. For example, the FRONT END GROUPING of method 10 (receiving and preliminarily processing a paper or carpet exothermic processing waste stream 102, thermally processing a paper or carpet exothermic processing waste stream 104, producing and recovering energy from the thermal processing of the paper or carpet exothermic processing waste stream 106, and recovering minerals from the waste and producing a composite ash, as a PC or PI collecting or precipitating agent 108) may be handled at one specific location of the integrated system 40, while another nearby and functionally-linked location handles the BACK END GROUPING of method 10 (processing wastewater 110, removing phosphates and nitrates from the wastewater and pH adjusting the effluent slurry or the resulting water output 112, and precipitating, collecting, and processing a post-consumer product from the ash slurry with the wastewater 114).

A person of ordinary skill in the art understands that this may allow efficiencies and efficacies to facilitate integrative, multi-purpose, waste-management, all in one place, without having to taint or burden another location or municipality with the downsides of another integrated system 40 and/or a regional system 20. Similarly, a person of ordinary skill in the art understands that the efficiencies of the inventive concept allow for the integrated set-up, to make production of the active ingredients and geopolymer precursors for municipal wasterwater treatment, for example, "in house", "a la carte", and "to specific need and quantity" without wastes or inefficiencies. As such, it is envisioned that certain sub-process stations or locations of the integrated system 40 facilitate administering and positioning the assets and processes associated with various, distinct waste stream processing operations, all in one place. This may include: coordinating, including strategically positioning and situating, the sub-systems and equipment associated with any reduction of the output waste from the processing of paper or carpet exothermic waste stream. Further, it may include establishing and maintaining a grid for the introduction of the produced-energy (steam powered or direct thermal-reactor powered), including looping the energy back into the overall integrated system 40, for use at any of the near-by or on-site sub-systems. Further, it may include coordinating, including strategically positioning and situating, the sub-systems and equipment associated with any production of the active ingredient or composite ash for the waste stream processing. Further, it may include coordinating, including strategically positioning and situating, the sub-systems and equipment associated with any processing of the wastewater, to make use of the output clean water available to the entire integrated system 40. Further, it may include establishing and maintaining a grid for the introduction of the produced-clean water output, including looping the clean water back into the overall integrated system 40. Further, it may include coordinating, including strategically positioning and situating, the sub-systems and equipment associated with any collection of the excess composite ash or geopolymer precursor, and/or any utilization of the excess composite ash to form a final PC or PI agricultural fertilizer product, or to collect, market, or sell to independent third-party PC or PI producers the precursor. Further, it may include coordinating, including strategically positioning and situating, the sub-systems and equipment associated with any reduction, collection, and/or capturing of phosphates, nitrates, and heavy metals, and other contaminants, from the wastewater, and/or any collection and processing of any precipitated phosphate- or nitrate-rich compounds. Further, it may include scheduling operations for sub-systems of the overall integrated system 40 such that the process are performed in conjunction, and with the purpose of facilitating efficiencies, amongst the various components of the inventive concept described herein.

Turning back again to FIG. 2, FIG. 2 also may be a schematic diagram of an illustrative integrated system, practically implementing the present invention in the Dalton, Ga. municipality, and comprising a kiln layout for the integrated Dalton system and a kiln sub-system for the integrated Dalton system.

The illustrative integrated system 60 practically implements the present invention in the Dalton, Ga. municipality. The integrated system 60 represents the possible construction plans for a grassroots facility in Dalton system, on free- and available-land immediately adjacent to a pre-existing regional DIR processing plant. The DIR processing plant in the Dalton system has incoming DIR waste flows characterized as 150,000 lbs/year on PC carpet and PC carpet waste. The DIR processing plant specifically comprises whole carpet processing, PC carpet waste, fluff, and carcass processing, and evergreen type carpet processing. The integrated system 60 is expected to recover energy in estimates of 4 to 6 MWe, plus spent steam of 110,000 to 120,000 lbs/hr at 20 psig and 340° F. The integrated system 60 also is expected to recover energy in estimates of 130,000 to 150,000 lbs/hr at 100 psig and 340° F. The integrated system 60 also is expected to recover composite ash product/precursor/capture material in estimates of 55,000,000-70,000,000 lbs/year. Construction times for an integrated system 60 in the Dalton system is expected to take 15-18 months with a capital cost (+/−30% estimate error) of about $22,000,000 to $26,000,000.

Figure 7:
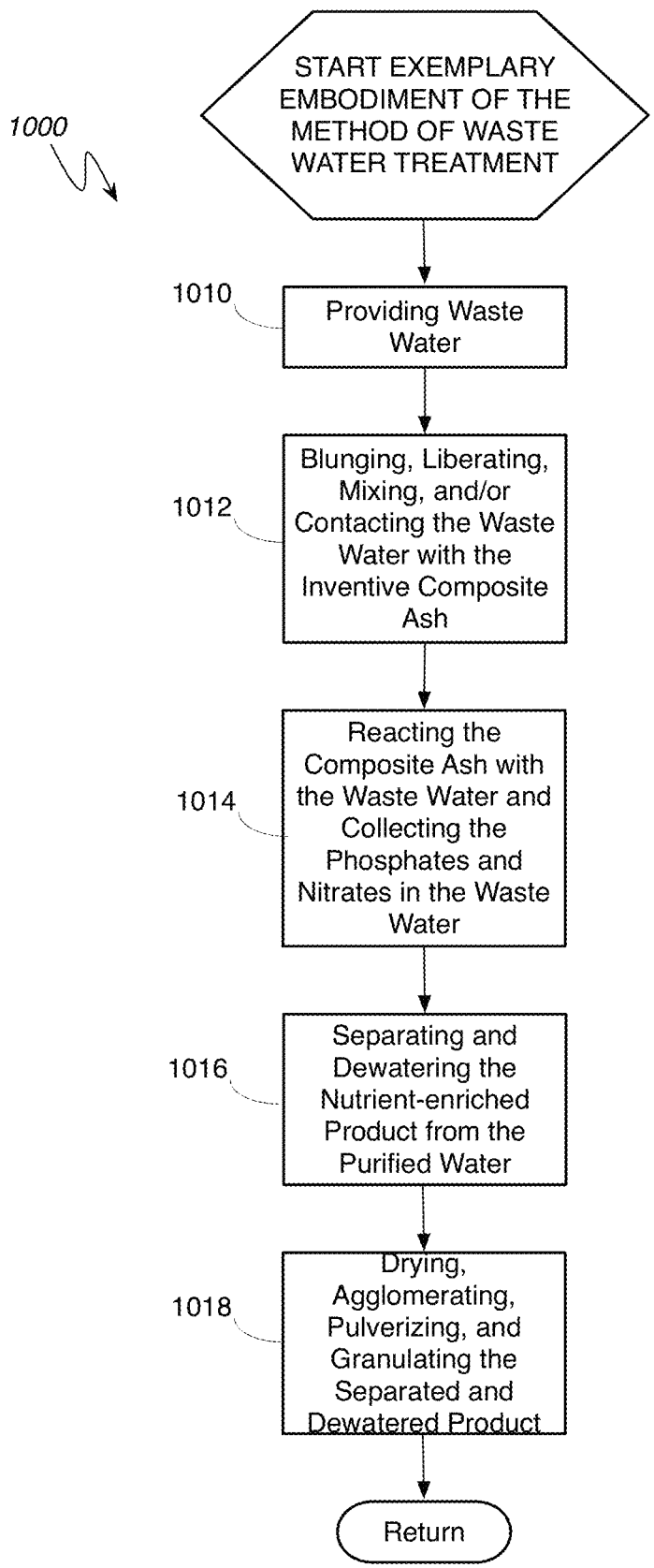
FIG. 7 is a schematic flow diagram showing the steps of an illustrative embodiment of a back-end grouping of processes, not all of which steps are necessarily employed in each and every situation.

Turning now to FIG. 7, a schematic flow diagram of an illustrative sub-process according to the present invention is shown. This flow diagram discloses steps for the a sub-process directed to waste water treatment process, not all of which are necessarily employed in each and every situation, but which may have similarities to other exemplary embodiments provided herein. The exemplary embodiment of FIG. 7 is a method 1000 comprising the steps of:

providing waste water (1010);

blunging, liberating, mixing, and/or contacting the waste water with a chemically reactive amount/concentration of the inventive composite ash as described herein (1012);

providing time and/or conditions for the composite ash to react and/or collect the phosphates and nitrates in the waste water, such that the resultant product precipitates out of solution, and provides the structure for chemisorption of the phosphates and nitrates (1014);

separating and dewatering the nutrient-enriched precipitated and resultant products from the purified water (1016); and drying, agglomerating, pulverizing, and/or granulating the separated and dewatered, nutrient-enriched precipitated and resultant product (1018).

In some exemplary embodiments, the method 1000 efficiently and effectively consumes the substantial majority of the phosphates and nitrates in the waste water, with limited emissions, bi-products, and residues that cannot be captured, filtered, or reused and/or recycled. Further, the method 1000 may be similar to the back end grouping of process of method 10 of FIG. 1, specifically:

processing wastewater (110);

removing phosphates and nitrates from the wastewater and pH adjusting the effluent slurry or the resulting water output (112); and precipitating, collecting, and processing a post-consumer product from the ash slurry with the wastewater (114).

Like method 10 of FIG. 1, the inventive composite ash embodiments described herein (produced out of the front-end steps 102-108 of FIG. 1, for example) is mixed with the waste water to form a partial lime $Ca(OH)_2$ slurry through a slaking process.

The blunging, liberating, mixing, and/or contacting the waste water with a chemically reactive amount/concentration of the inventive composite ash step (1012) usually requires that the composite ash be slaked prior to mixing with the waste water; however, dry applications are also envisioned. The composite ash may be added, dry or wet, at specific ratios, as functions of the nutrient concentration, as is shown and described herein. Mixing is completed with inline mixers, agitated tanks, etc. High to medium shear mixing may increase reactivity, surface area contact, and therefore collection performance.

Next, the reacting and/or collecting the phosphates and nitrates in the waste water, such that the resultant product precipitates out of solution, and provides the structure for chemisorption of the phosphates and nitrates, step (1014) may be similar to the removing phosphates and nitrates from the wastewater step 112, and the associated pH adjusting the effluent slurry or the resulting clean water output step, and the precipitating, collecting, and processing a post-consumer product from the ash-effluent slurry step 114, of the method 10 of FIG. 1. It however, does not have to be, and may in fact be more simplified.

In some cases, but not required, the pH may be adjusted during to the reacting and/or collecting step (1014) to create additional valuable and enriched compounds within the recovered solids i.e., pH adjustment with phosphoric, sulfuric, and/or stearic acid to add or enhance valuable components to the recovered solids. Further, an exemplary embodiment envisions the reacting and collecting step (1014) occurring in either a static or dynamic system with reaction time of about 30.0 minutes up to about 2.0 hrs.

Next in the process is the separating and dewatering the precipitated/resultant products step (1016). Once the reacting and/or collecting the phosphates and nitrates in the waste water step (1014) is complete, the resultant products are separated from the effluent slurry using a range of separation techniques including but not limited to clarifiers, centrifuges, filters, rotary vacuum filtration, belt filters, etc. Of course, it is also envisioned that, instead of strict separation techniques, other known techniques for targeting and collecting the desired product may be implemented, including but not limited to flocculation, agglomeration, etc.

Once the separating and dewatering step (1016) is complete, the material undergoes the drying, agglomerating, pulverizing, and/or granulating the separated and dewatered precipitated and resultant product step (1018). In other exemplary embodiments, the resultant nutrient-enriched product may be left in a liquid depending on the intended product application. It is appreciated that the final resultant product may be dried using conventional dryers, i.e., rotary dryers, spray dryer, cage mills, etc.

Examples 22-24

Returning to the illustrative examples, the following are three (3) illustrative examples of the process of the present invention. Example 22 specifically is performed for two objectives: (1) to determine if re-using the composite-ash/capture-material is capable of continued $PO_4$ removal; and (2) to determine if approximate max capacity can be approximated. The recycled composite-ash/capture-material was collected from dosage trials similar to those described in detail in this disclosure, post $PO_4$ collection. The recycled composite-ash/capture-material was then dried. The results shows that using recycled composite-ash/capture-material continues to remove $PO_4$. Next, cycles of re-use were studied until the resultant did not meet 1 mg/L [$PO_4$] (see Examples 23 and 24).

Example 22

2.5 mg/L Initial [$PO_4$] and 2.0 mg/L Initial [$PO_4$] at First Cycle

Figure 8:
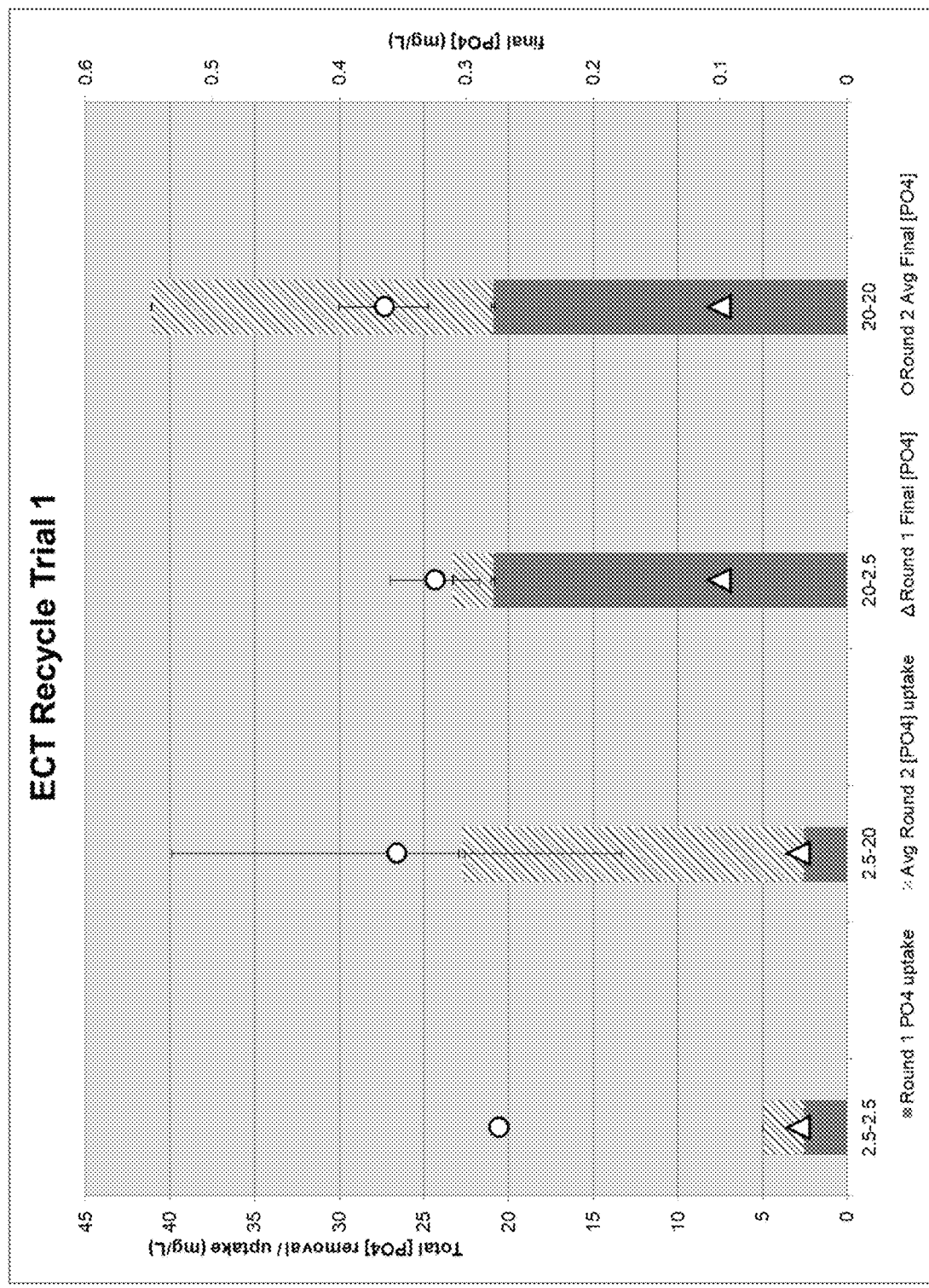
FIG. 8 illustrates the final $[PO_4]$ and the total $[PO_4]$ removed relative to the round of trial product applied up through two rounds as the experimental results for Example 22.

Some of the experimental results obtained are represented by the following information provided in Table 43 and illustrated in FIG. 8. FIG. 8 illustrates the final [$PO_4$] and the total [$PO_4$] removed relative to the round of trial product applied up through two rounds.

TABLE 43

| Orig [PO4] | Sample Name | Round 1 PO4 uptake | stdev | Round 1 Final [PO4] | Round 2 Final [PO4] | Round 2 Avg Final [PO4] | stdev | Round 2 [PO4] uptake | Avg Round 2 [PO4] uptake | stdev |
|---|---|---|---|---|---|---|---|---|---|---|
| 2.66 | 2.5-2.5-1 | 2.6025 | 0.059 | 0.039 | 0.27 | 0.275 | 0.007 | 2.39 | 2.385 | 0.007 |
| 2.66 | 2.5-2.5-2 | | | | 0.28 | | | 2.38 | | |
| 20.5 | 2.5-20-1 | 2.6025 | 0.059 | 0.039 | 0.23 | 0.355 | 0.177 | 20.27 | 20.145 | 0.177 |
| 20.5 | 2.5-20-2 | | | | 0.48 | | | 20.02 | | |
| 2.66 | 20-2.5-1 | 20.9308 | 0.105 | 0.101 | 0.3 | 0.325 | 0.035 | 2.36 | 2.335 | 0.035 |
| 2.66 | 20-2.5-2 | | | | 0.35 | | | 2.31 | | |
| 20.5 | 20-20-1 | 20.9308 | 0.105 | 0.101 | 0.34 | 0.365 | 0.035 | 20.16 | 20.135 | 0.035 |
| 20.5 | 20-20-2 | | | | 0.39 | | | 20.11 | | |

| Orig [PO4] | Sample Name | Total PO4 removal (mg/L) (Round 1 + 2) | % reduction | Average Final [PO4] | stdev | Avg % reduction | stdev |
|---|---|---|---|---|---|---|---|
| 2.66 | 2.5-2.5-1 | 4.993 | 89.85 | 0.275 | 0.007 | 89.66 | 0.265 |
| 2.66 | 2.5-2.5-2 | 2.380 | 89.47 | | | | |
| 20.5 | 2.5-20-1 | 22.873 | 98.88 | 0.355 | 0.176 | 98.27 | 0.862 |
| 20.5 | 2.5-20-2 | 20.020 | 97.66 | | | | |
| 2.66 | 20-2.5-1 | 23.291 | 88.72 | 0.325 | 0.035 | 87.78 | 1.33 |
| 2.66 | 20-2.5-2 | 2.310 | 86.84 | | | | |
| 20.5 | 20-20-1 | 41.091 | 98.34 | 0.365 | 0.035 | 98.22 | 0.172 |
| 20.5 | 20-20-2 | 20.110 | 98.10 | | | | |

Example 23

2.5 mg/L Initial [$PO_4$] and 2.0 mg/L Initial [$PO_4$] at First Cycle

Figure 9:
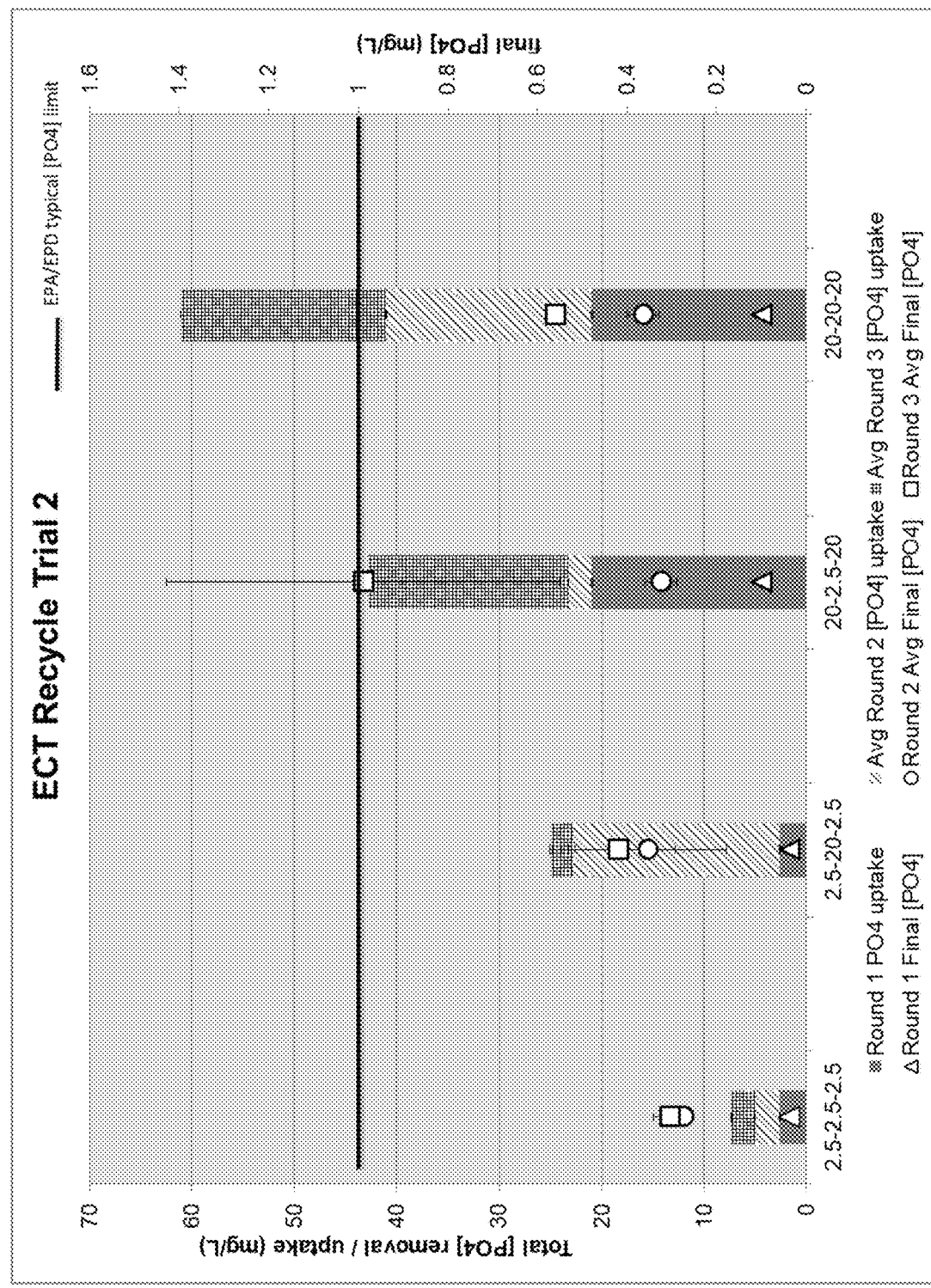
FIG. 9 illustrates the final $[PO_4]$ and the total $[PO_4]$ removed relative to the round of trial product applied up through three rounds as the experimental results for Example 23.

Example 23 specifically is performed to repeat Example 22 and to determine if approximate end-point can be approximated. The recycled composite-ash/capture-material was collected from dosage trials similar to those described in detail in this disclosure, post $PO_4$ collection. The recycled composite-ash/capture-material was then dried. The results shows that using recycled composite-ash/capture-material continues to remove $PO_4$ to below 1 mg/L [$PO_4$]. Some of the experimental results obtained are represented by the following information provided in Table 44 and illustrated in FIG. 9. FIG. 9 illustrates the final [$PO_4$] and the total [$PO_4$] removed relative to the round of trial product applied up through three rounds.

TABLE 44

| G3 orig [PO4] | Sample Name | Round 3 final [PO4} | Round 3 Avg Final [PO4] | stdev | Round 3 [PO4] uptake | Avg Round 3 [PO4] uptake | stdev | Total PO4 uptake/ removal (mg/L) (Round 1 + 2 + 3) | R2 % reduction | R3 % reduction |
|---|---|---|---|---|---|---|---|---|---|---|
| 2.62 | 5-2.5-1 | 0.28 | 0.305 | 0.035 | 2.34 | 2.315 | 0.035 | 7.3325 | 89.85 | 89.31 |
| 2.62 | 5-2.5-2 | 0.33 | | | 2.29 | | | 7.2725 | 89.47 | 87.40 |
| 2.62 | 22.5-2.5-1 | 0.51 | 0.42 | 0.127 | 2.11 | 2.2 | 0.127 | 24.9825 | 98.88 | 80.53 |
| 2.62 | 22.5-2.5-2 | 0.33 | | | 2.29 | | | 24.9125 | 97.66 | 87.40 |
| 20.5 | 22.5-20-1 | 0.68 | 0.99 | 0.438 | 19.82 | 19.51 | 0.438 | 43.1108 | 88.72 | 96.68 |
| 20.5 | 22.5-20-2 | 1.3 | | | 19.2 | | | 42.4408 | 86.84 | 93.66 |
| 20.5 | 40-20-1 | 0.56 | 0.56 | 0 | 19.94 | 19.94 | 0 | 61.0308 | 98.34 | 97.27 |
| 20.5 | 40-20-2 | 0.56 | | | 19.94 | | | 60.9808 | 98.10 | 97.27 |

Example 24

2.5 mg/L Initial [PO$_4$] and 2.0 mg/L Initial [PO$_4$] at First Cycle

Figure 10:
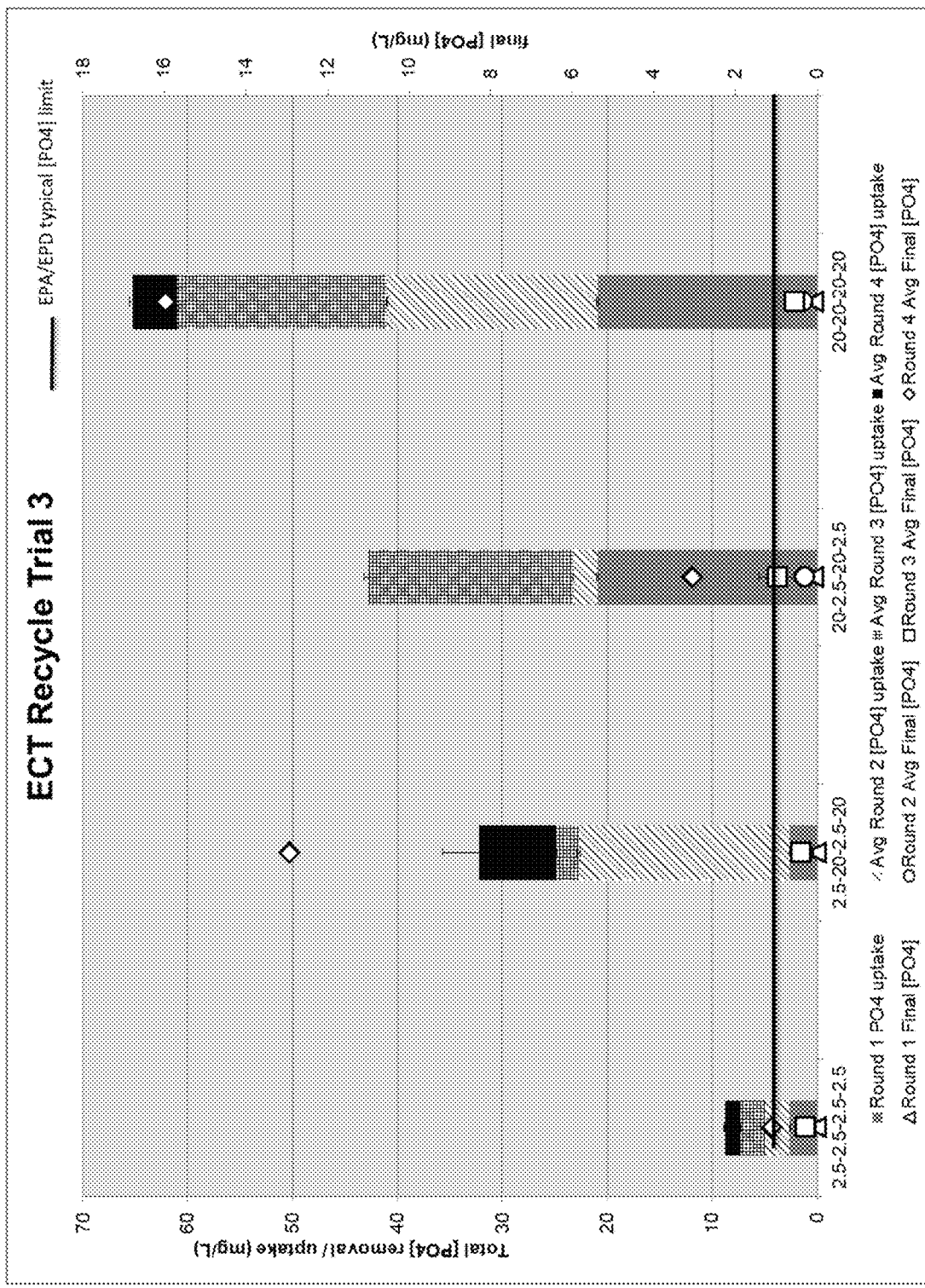
FIG. 10 illustrates the final $[PO_4]$ and the total $[PO_4]$ removed relative to the round of trial product applied up through four rounds as the experimental results for Example 24.
Figure 11:
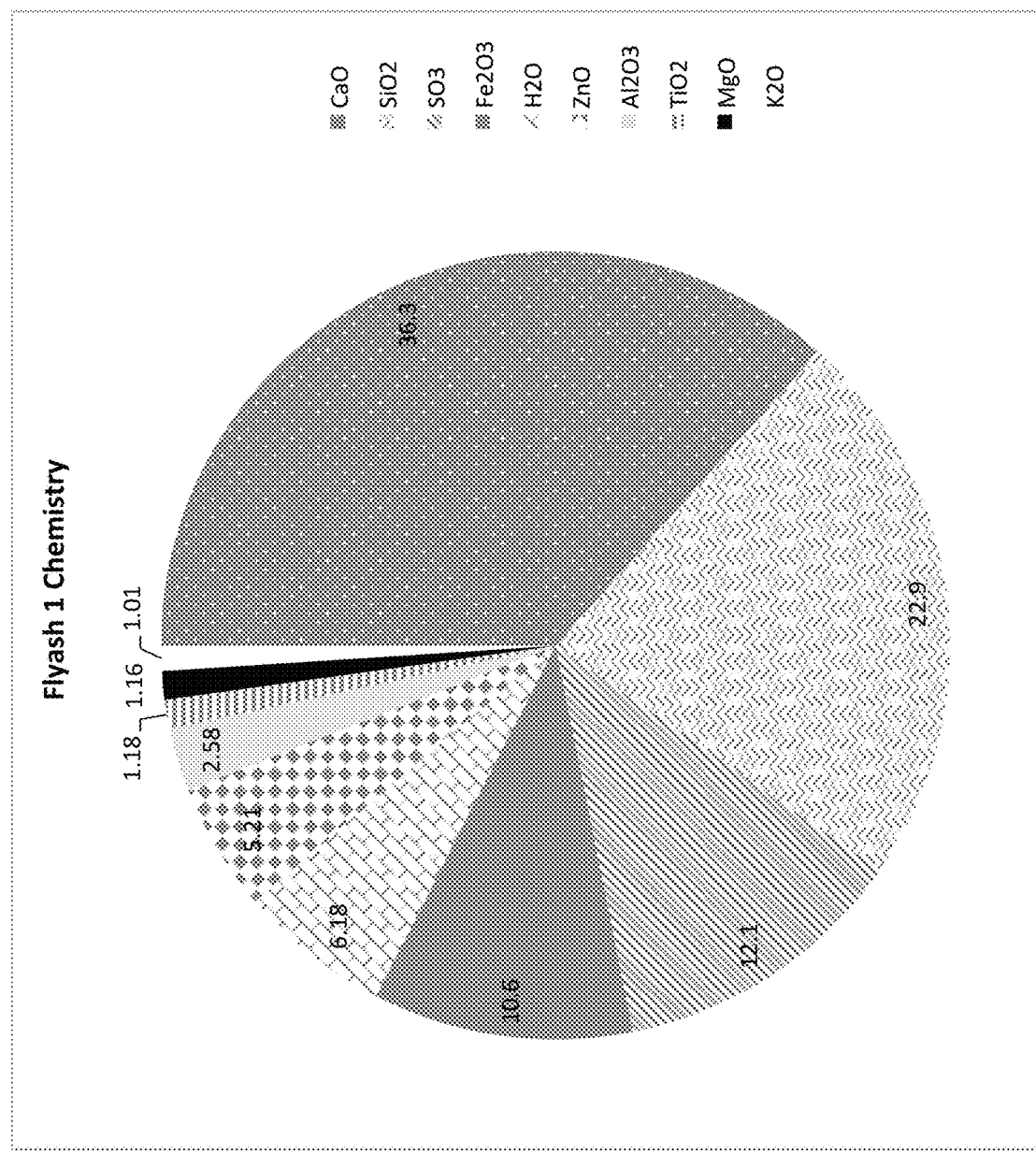
FIGS. 11-18 illustrate some of the analytical results obtained for Example 25 in Chart form.
Figure 12:
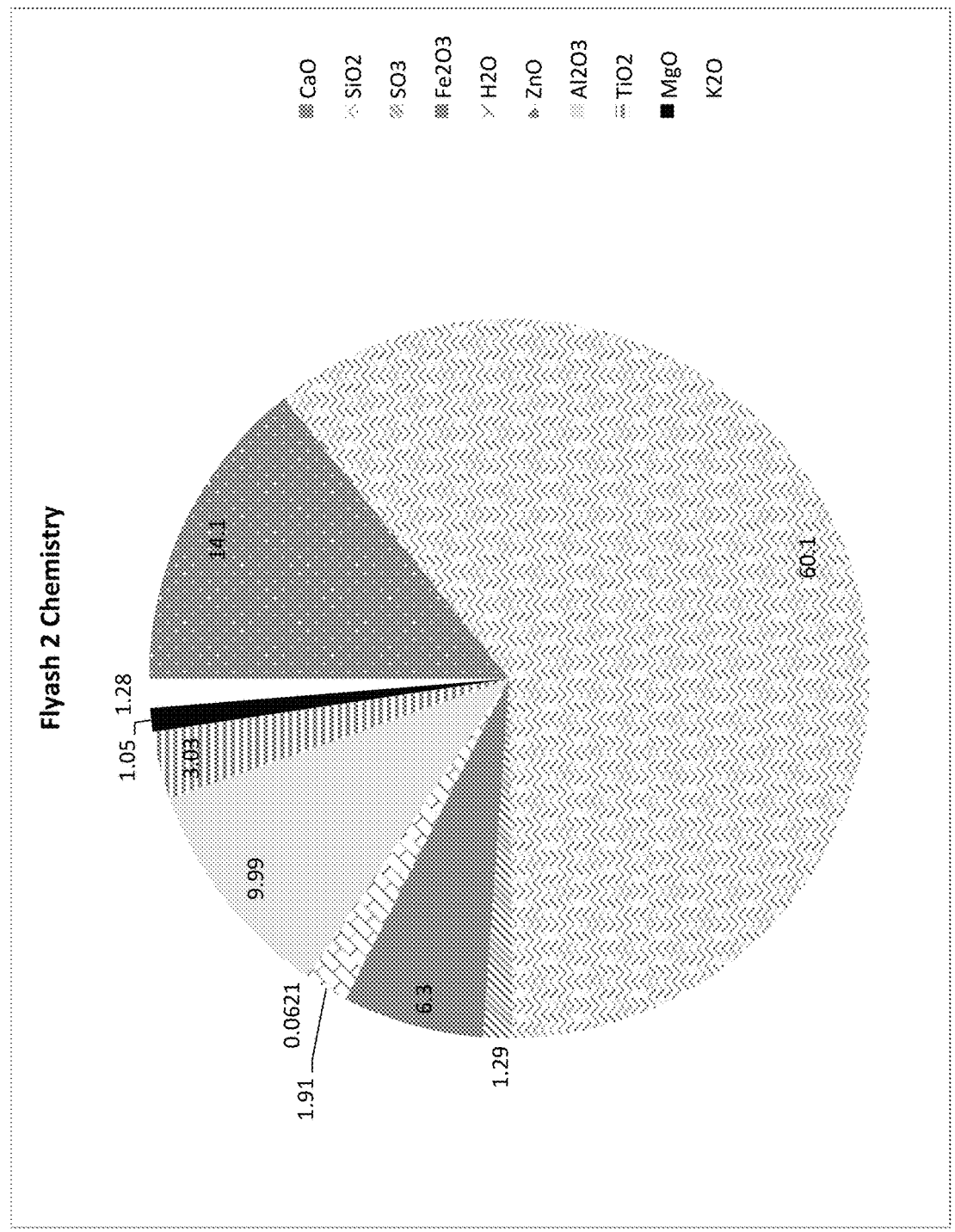
Figure 13:
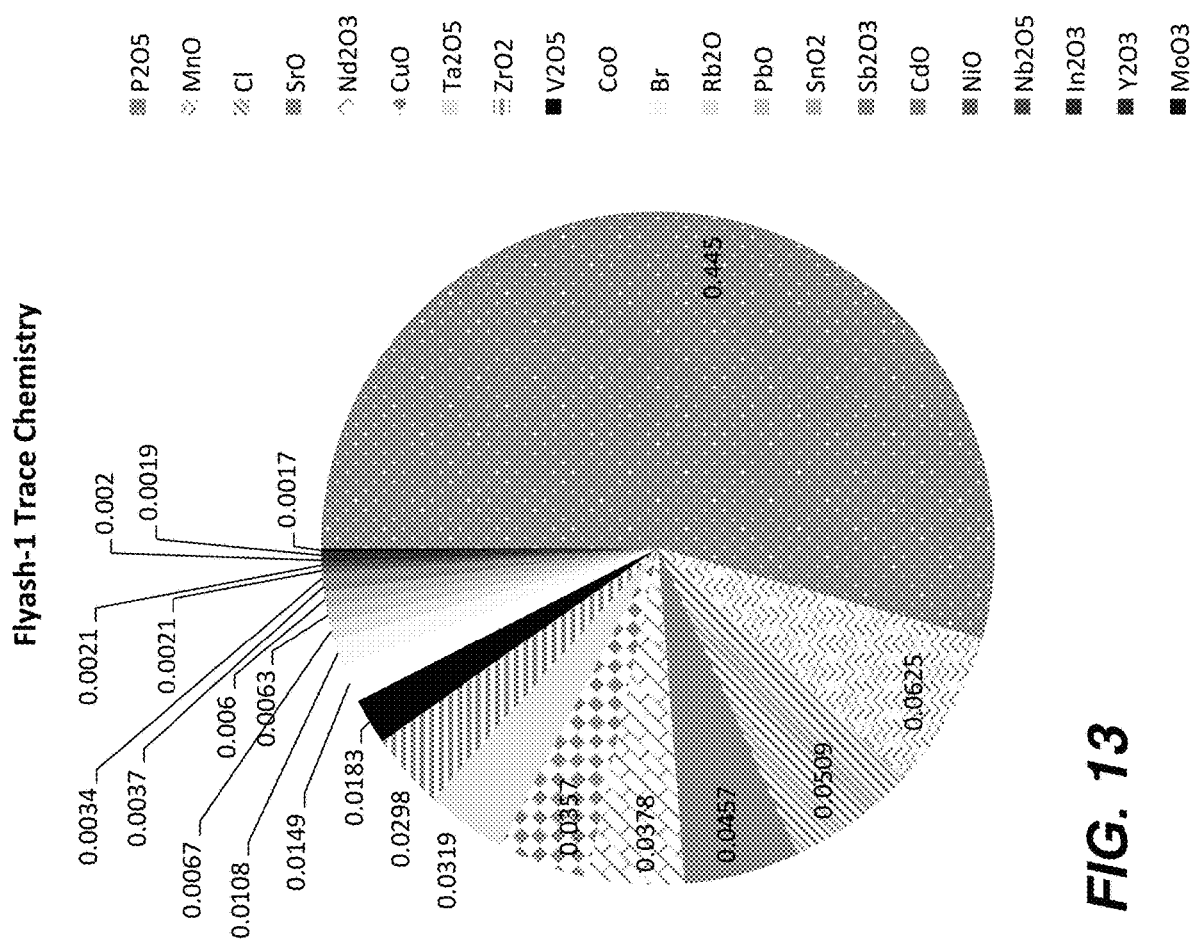
Figure 14:
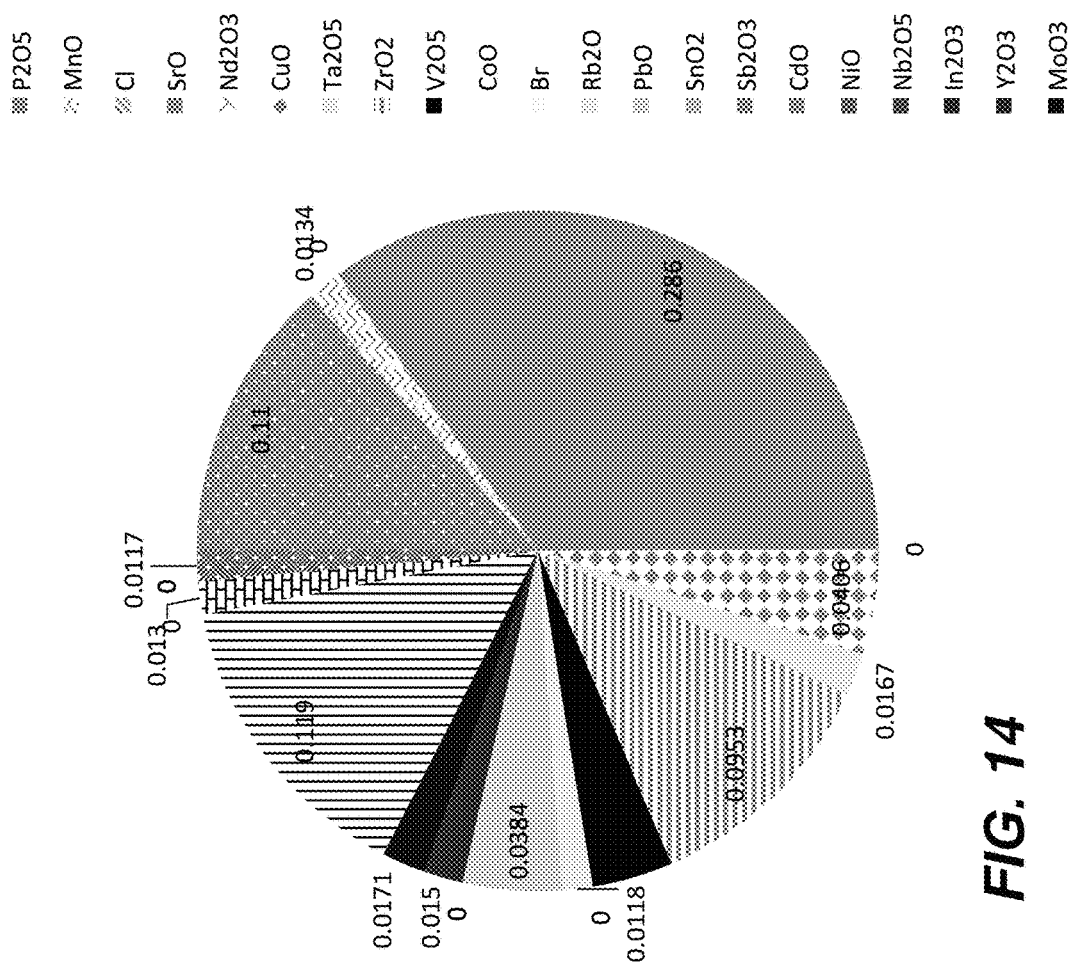
Figure 15:
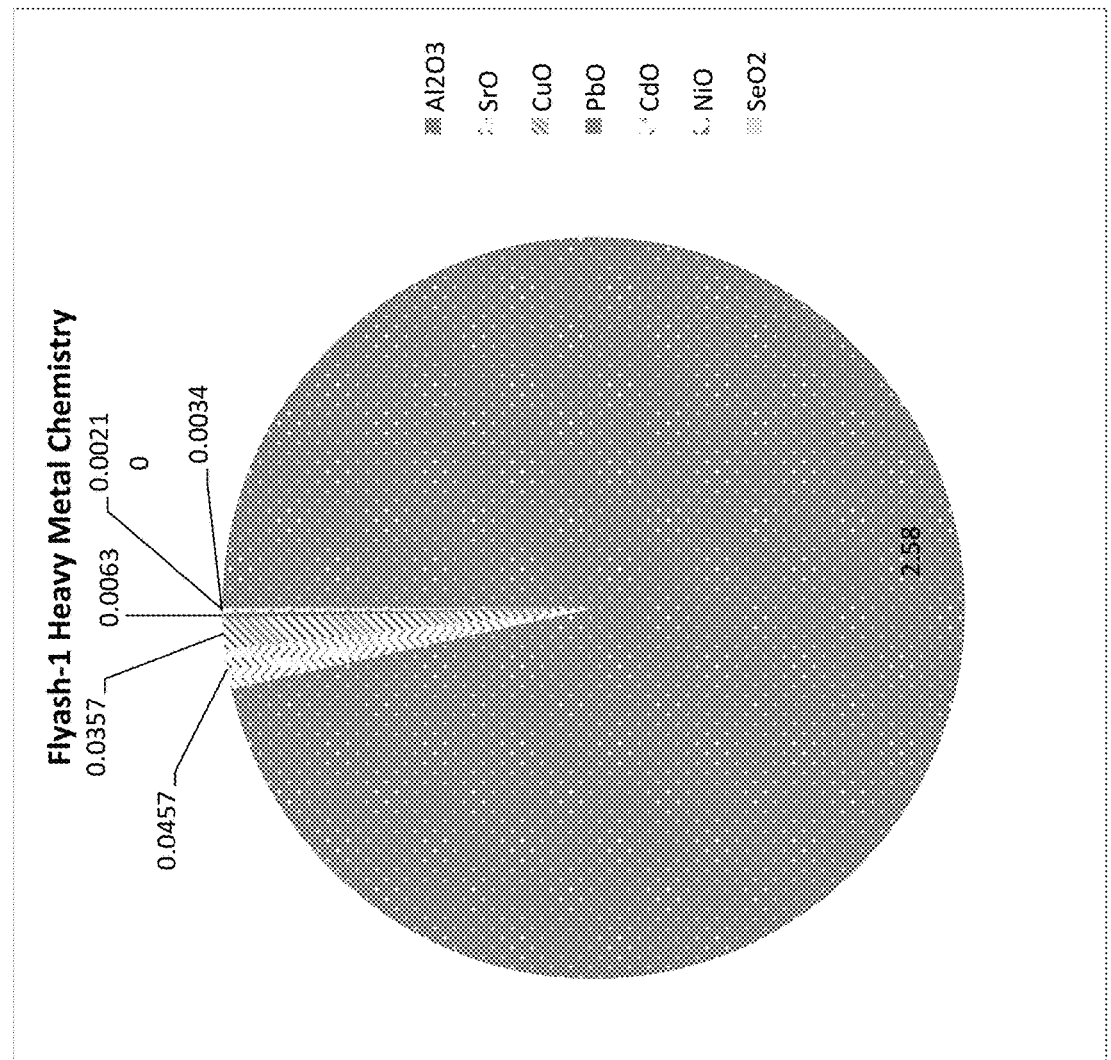
Figure 16:
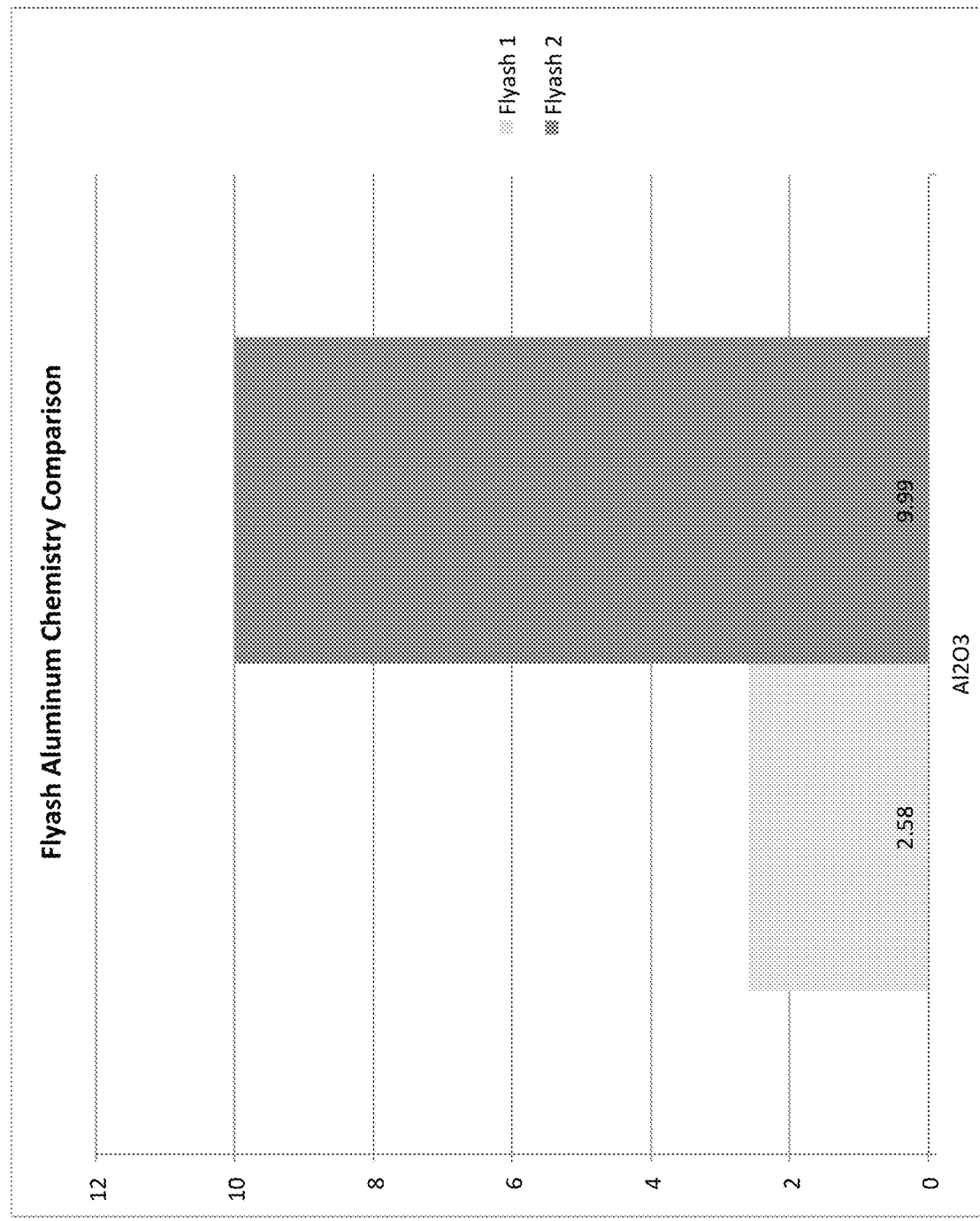
Figure 17:
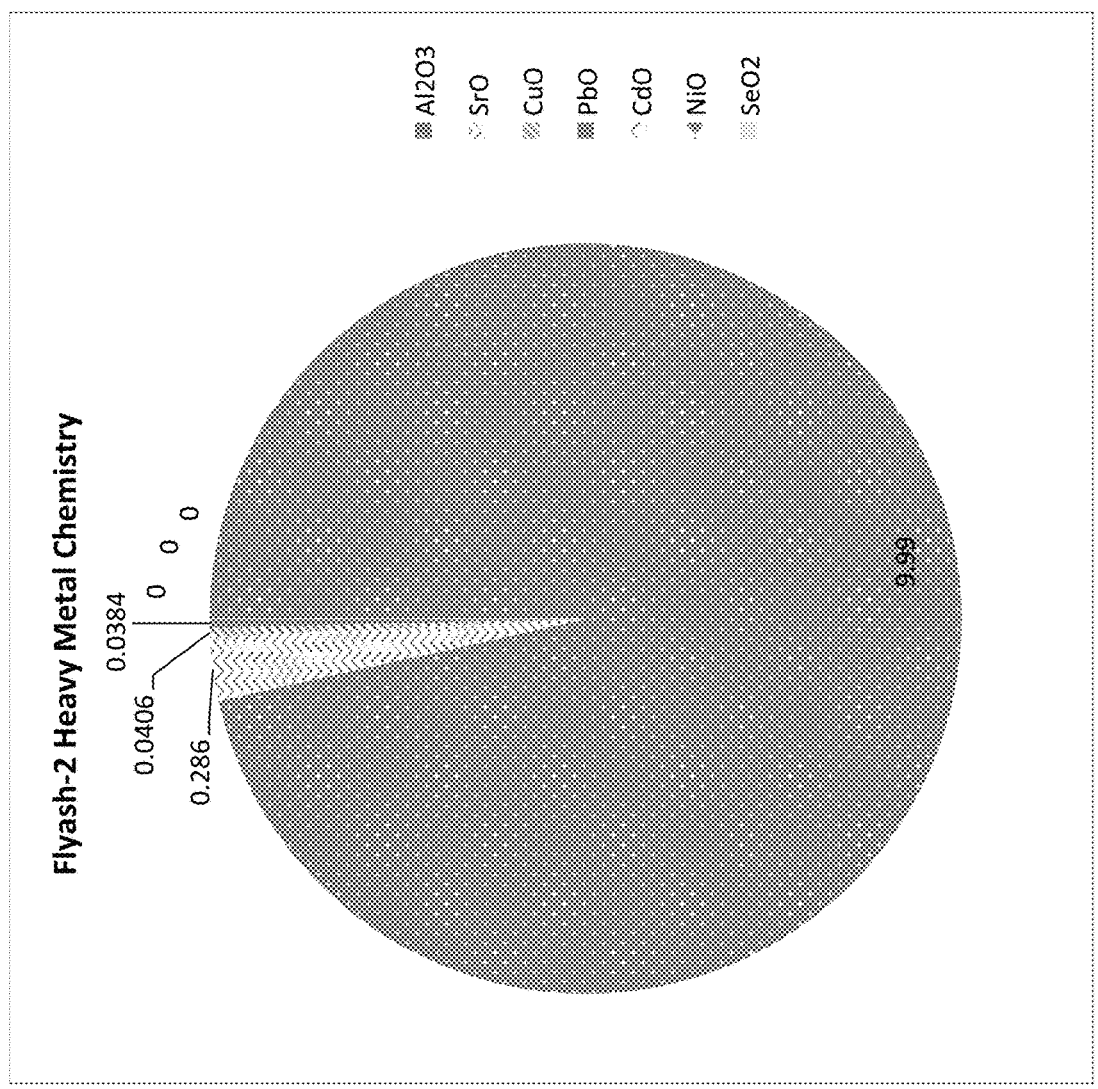
Figure 18:
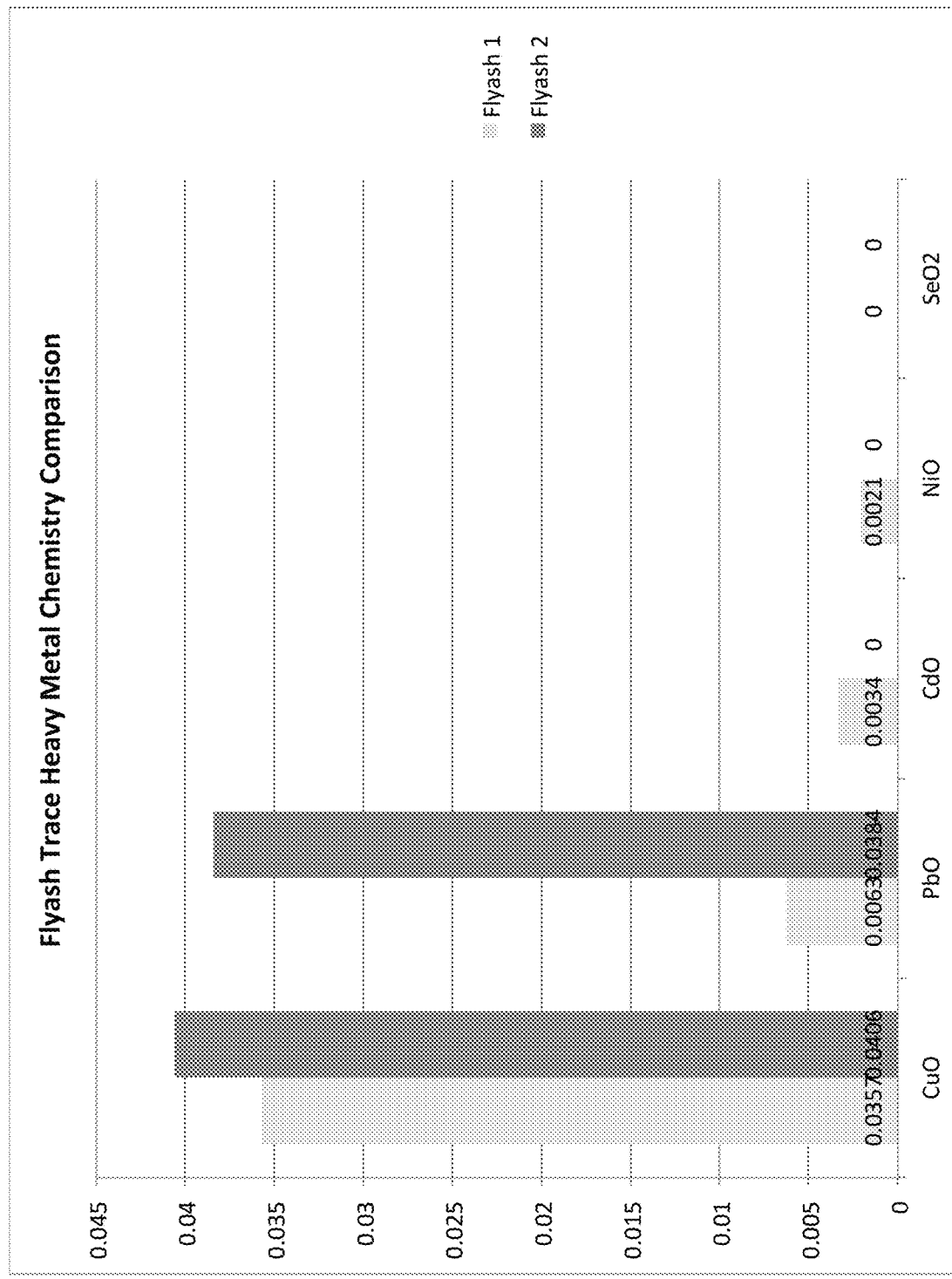
Figure 19:
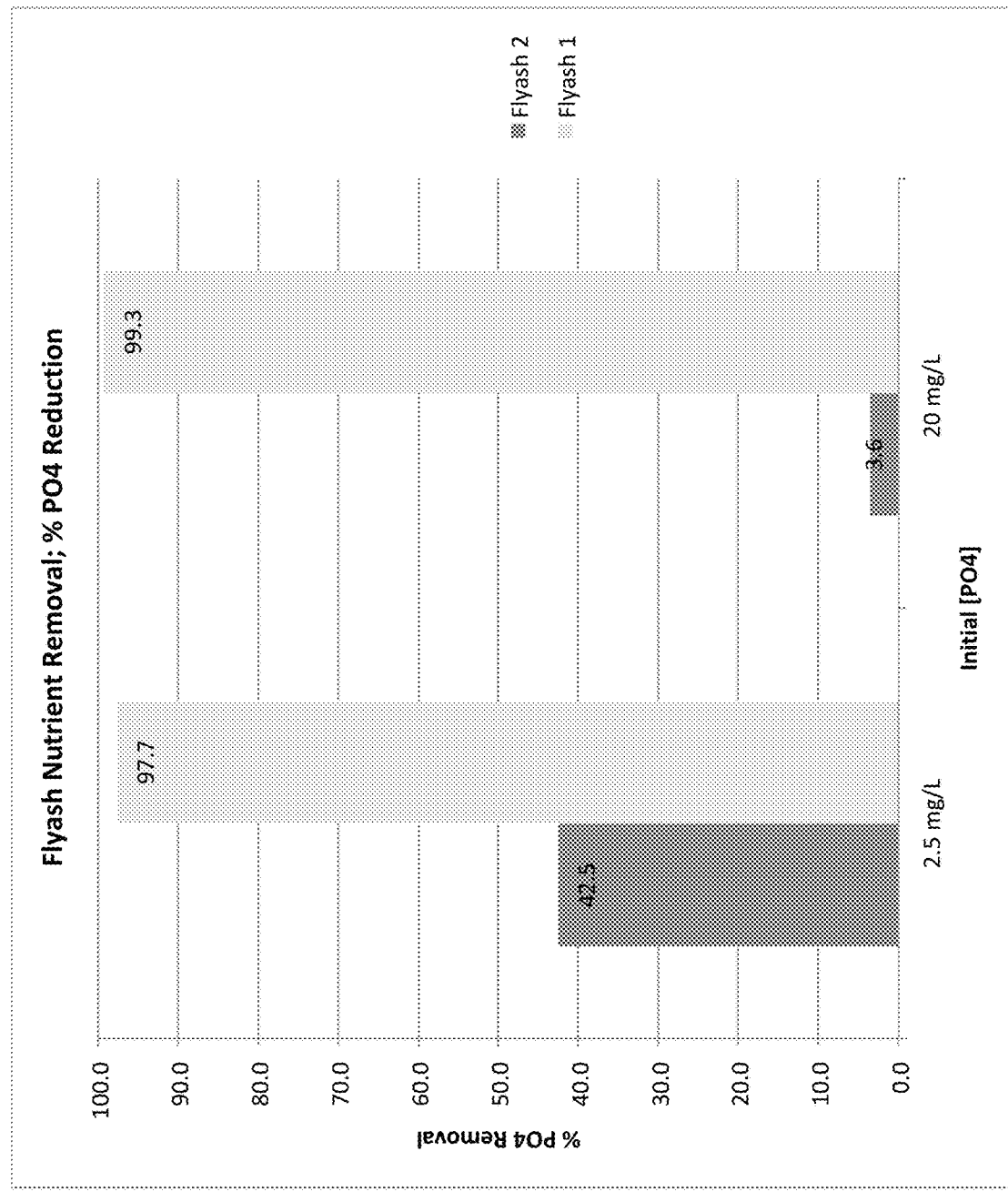
Figure 21:
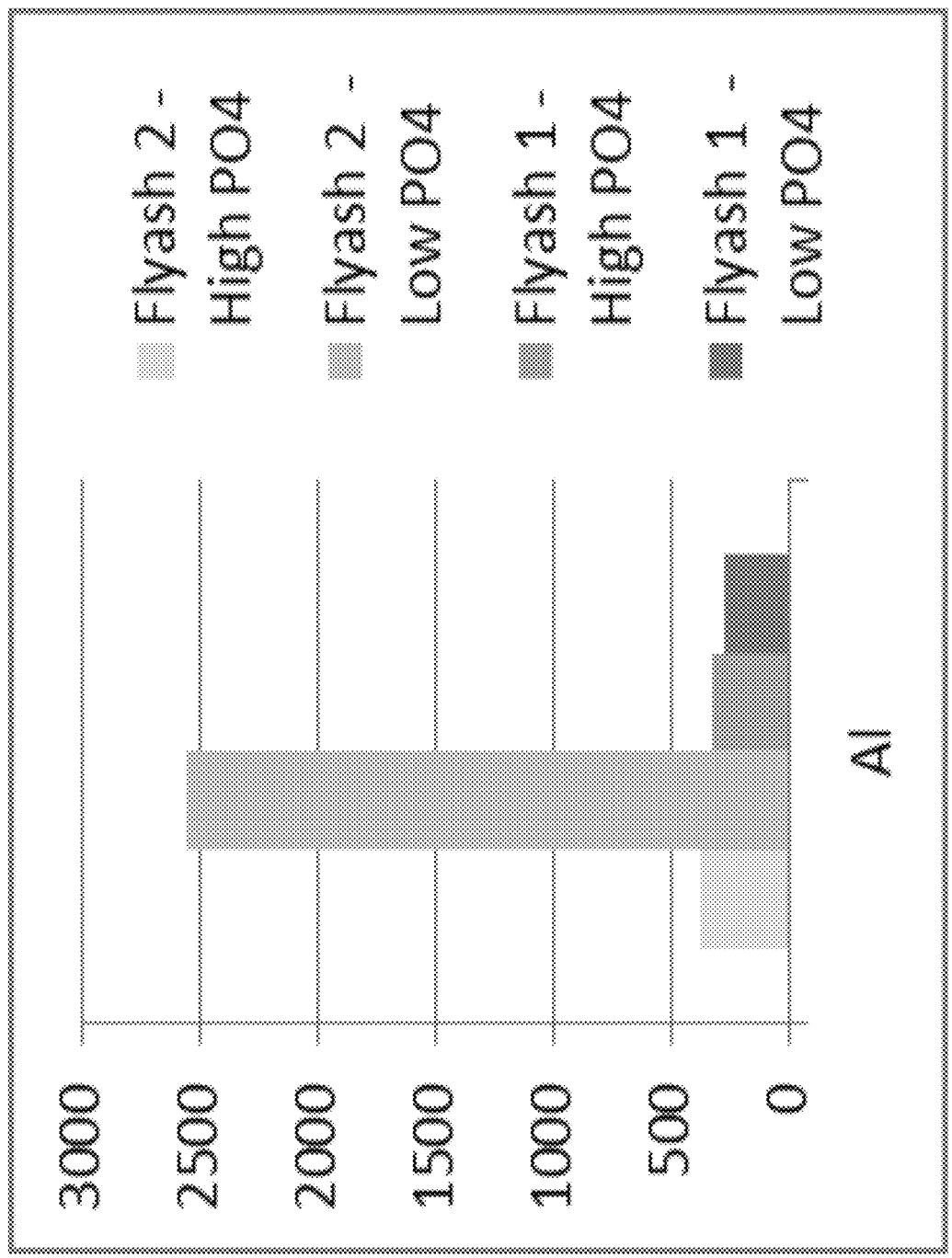
Figure 22:
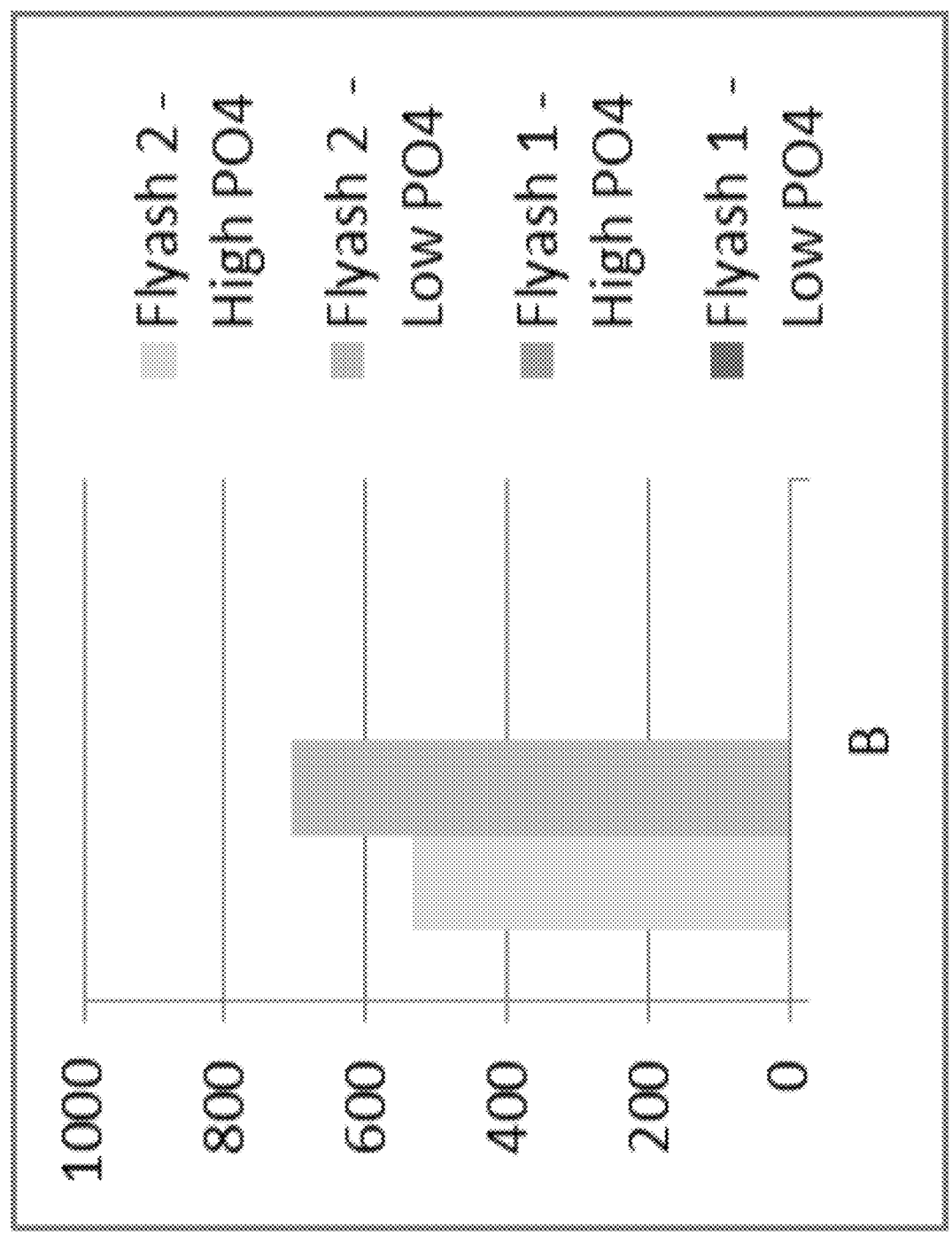
Figure 23:
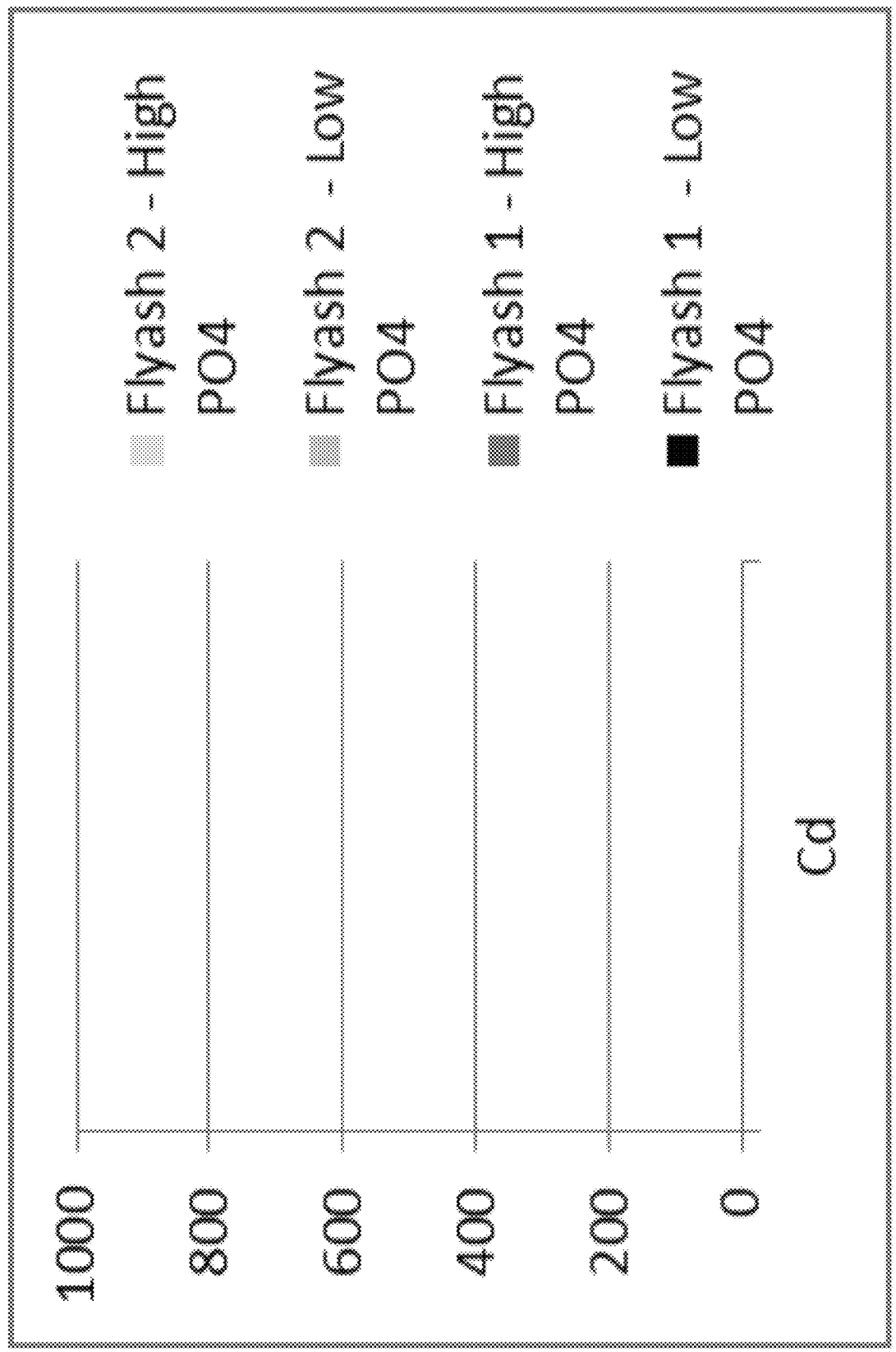
Figure 24:
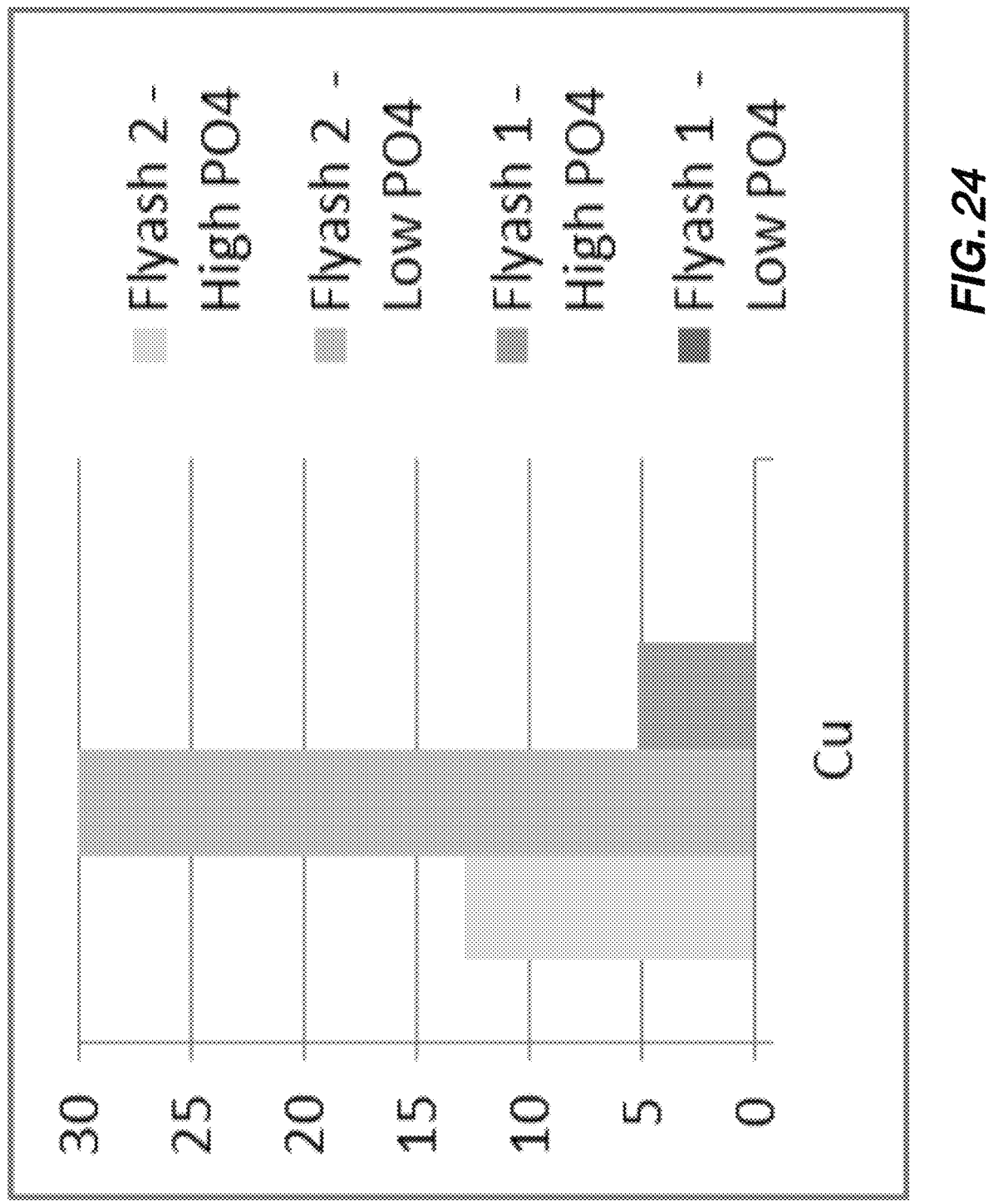
Figure 25:
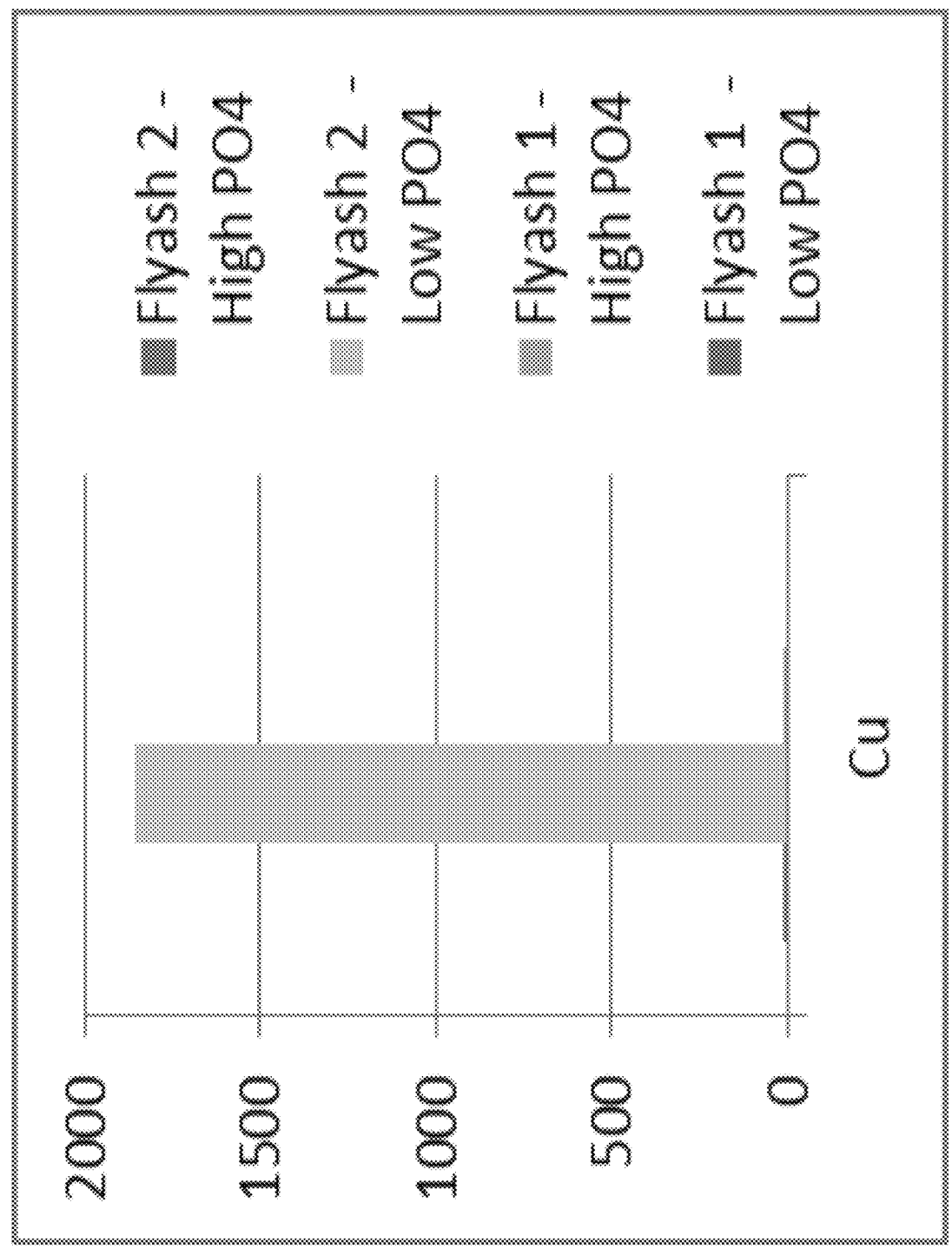
Figure 26:
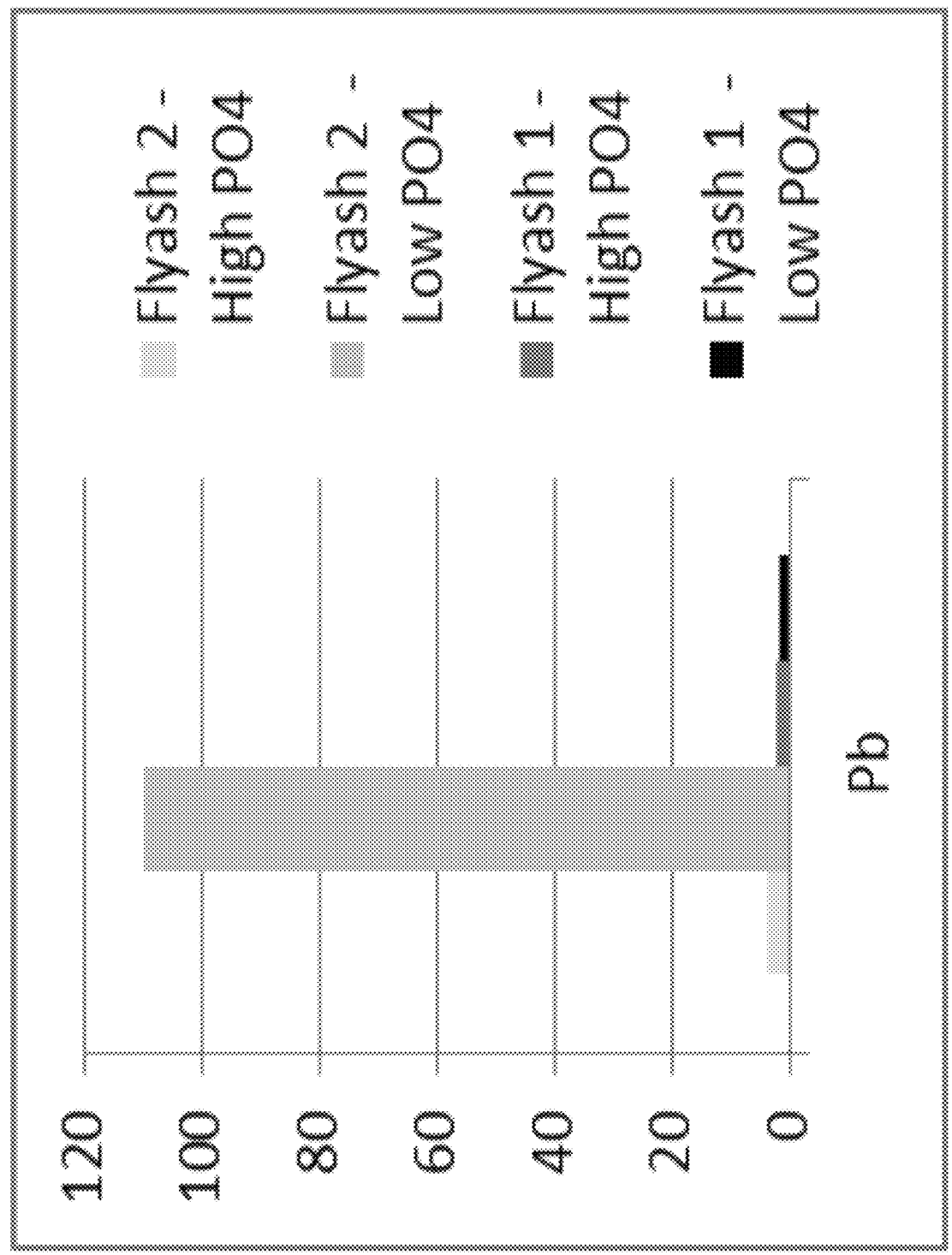
Figure 27:
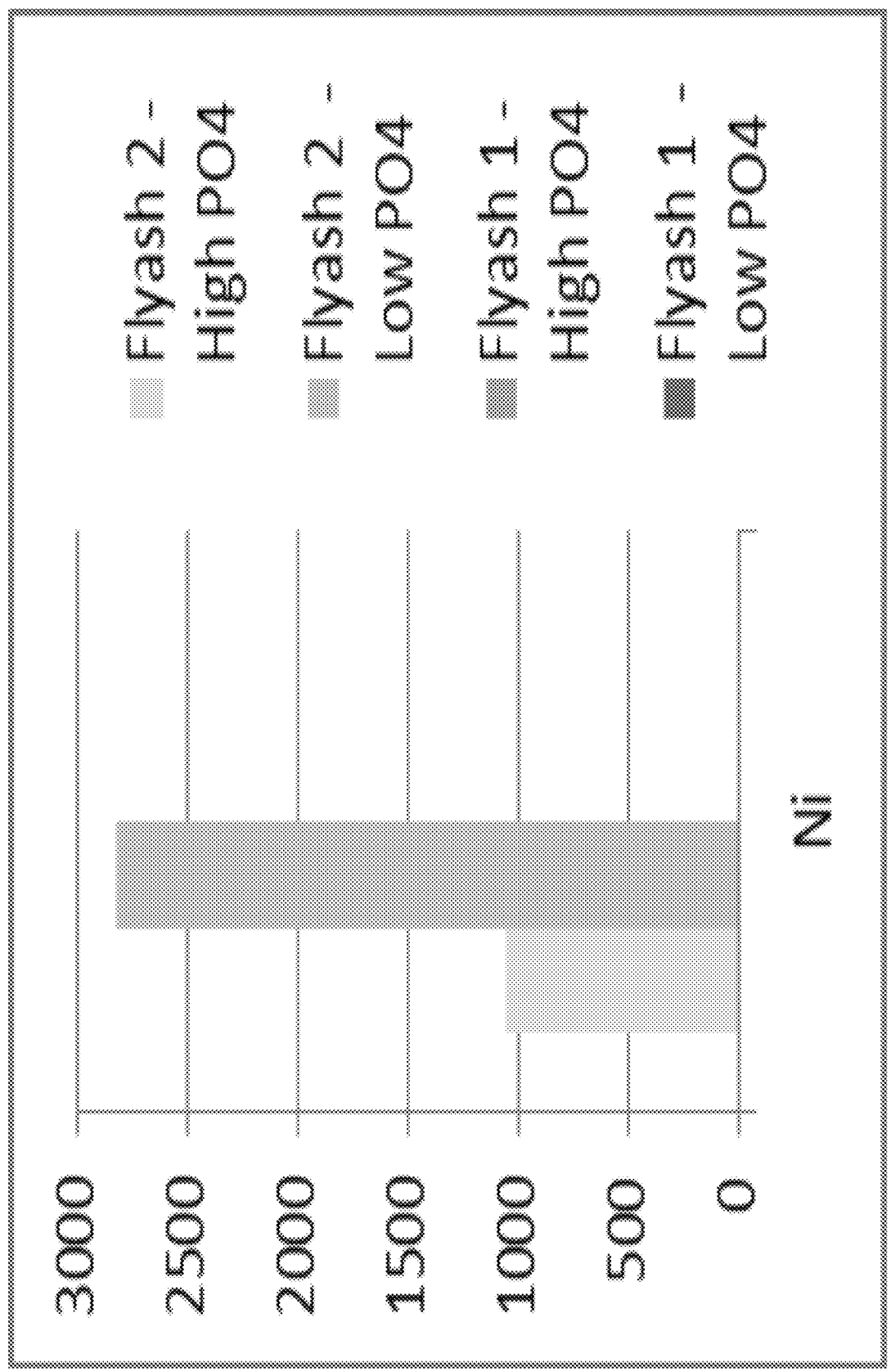
Figure 28:
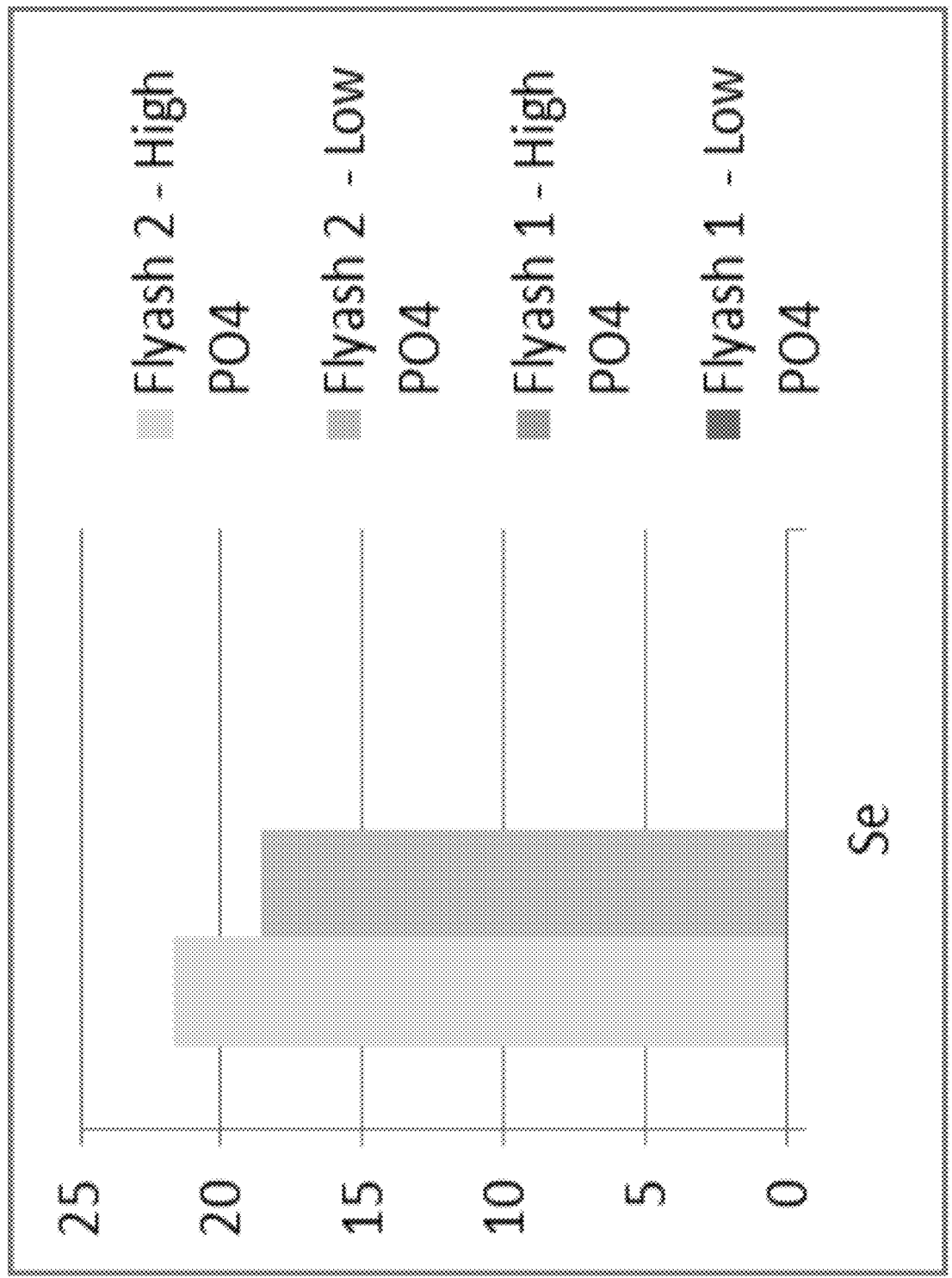
Figure 29:
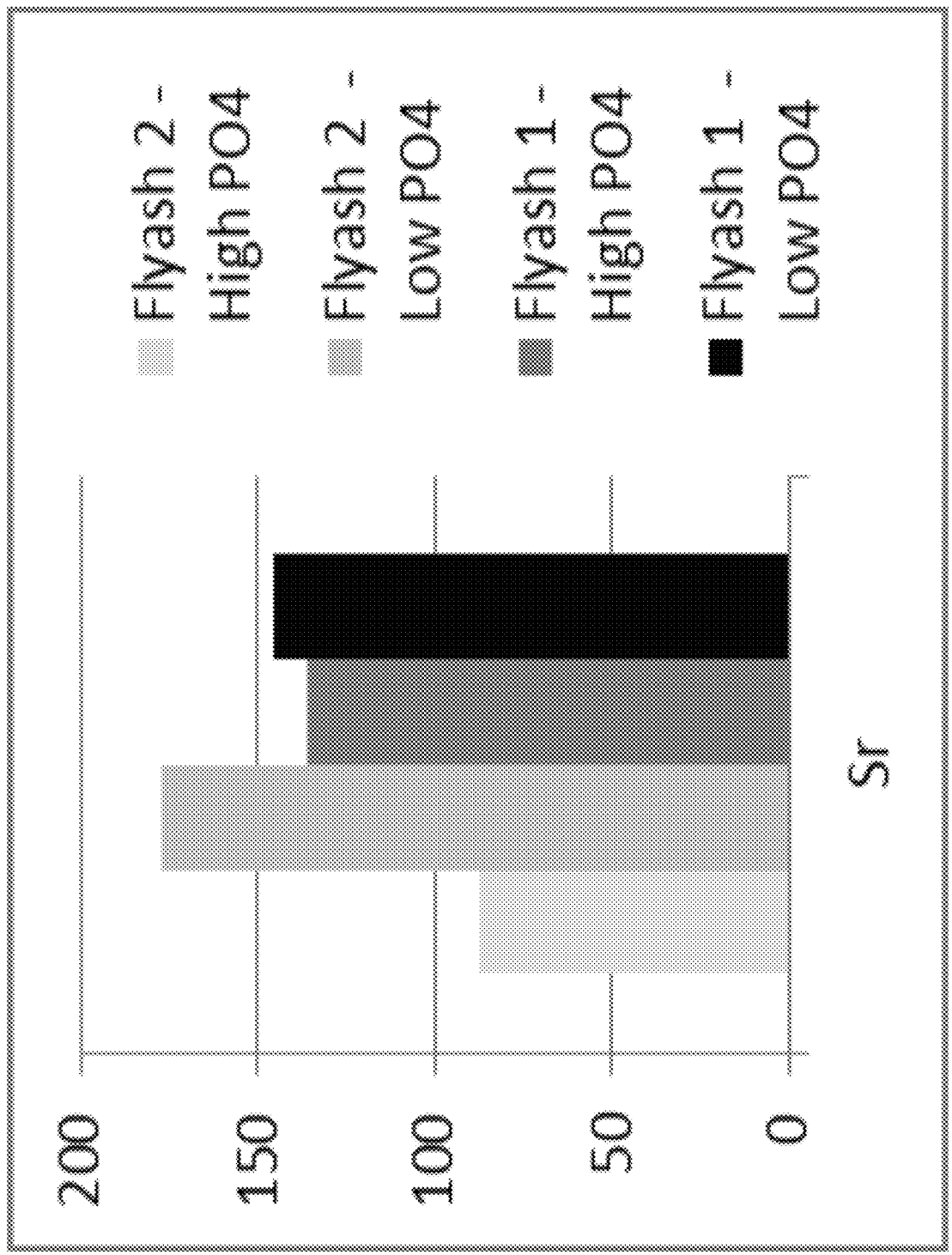
Figure 30:
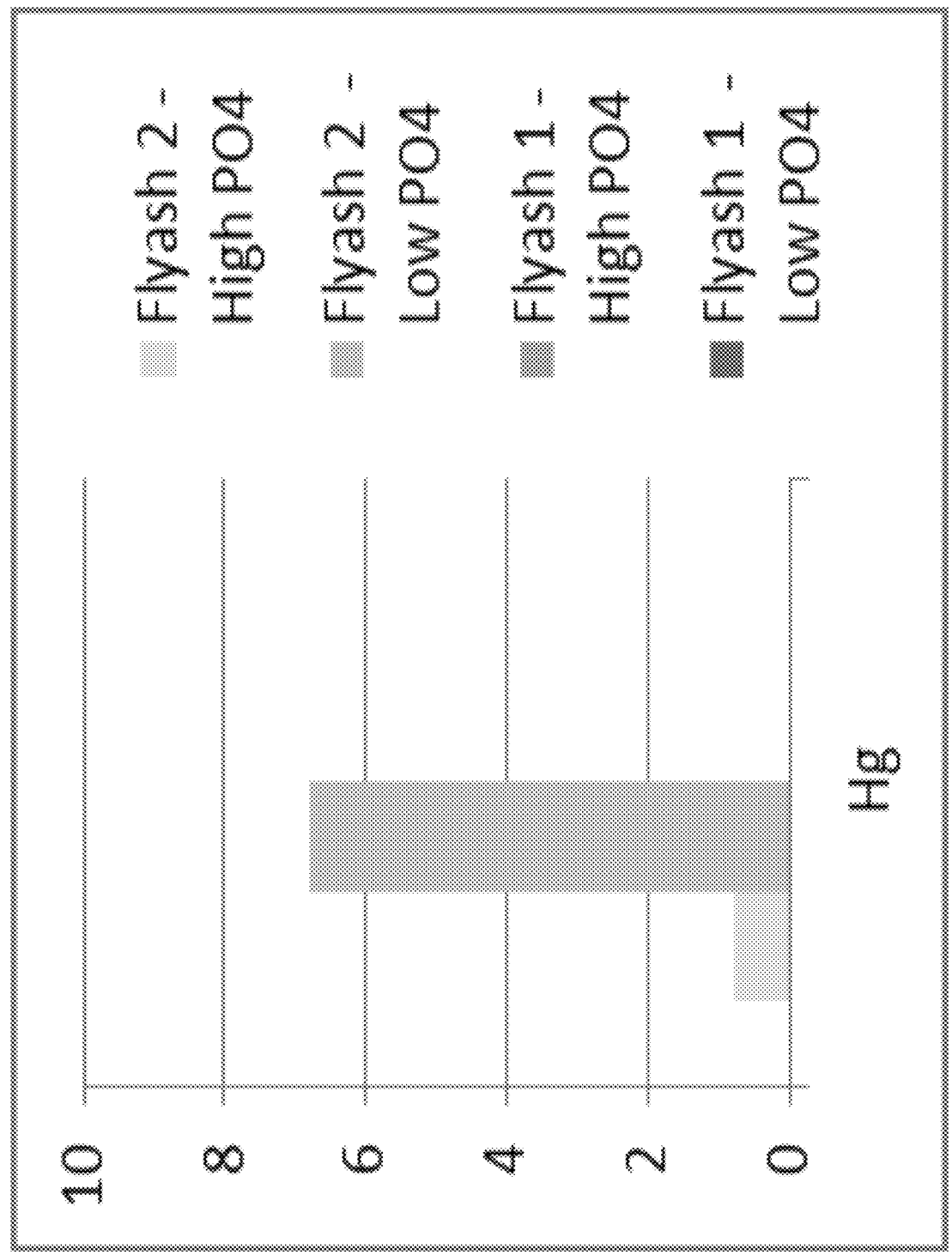

Example 24 specifically is performed to repeat Example 23 and to determine if approximate end-point can be better approximated and better methodology performed. The recycled composite-ash/capture-material was collected from dosage trials similar to those described in detail in this disclosure, post PO$_4$ collection. The recycled composite-ash/capture-material was then dried. The results shows that using recycled composite-ash/capture-material continues to remove PO$_4$ to below 1 mg/L [PO$_4$]. Some of the experimental results obtained are represented by the following information provided in Table 45 and illustrated in FIG. 10. FIG. 10 illustrates the final [PO$_4$] and the total [PO$_4$] removed relative to the round of trial product applied up through four rounds.

analytical results obtained are represented by the following information provided in FIGS. 11-18.

Example 25

2.5 mg/L Initial [PO$_4$] and 20.0 mg/L Initial [PO$_4$] at First Cycle

The results show that fly ash, of various types and sources, show good results for nutrient removal; however, heavy metal leaching is possible. The results also show that wood-fired or wood-sourced fly ash is more efficient at PO$_4$-removal, and this is perhaps due to the higher carbon content from the wood process rather than the coal burning process. The results also show that wood-fired or wood-sourced fly ash showed less leaching than the coal-fired or coal-sourced flyash. Some of the experimental results obtained are represented by the following information provided in FIGS. 19-30 wherein FIGS. 20-30 show leaching results.

TABLE 45

| G4 starting [PO4] | Sample name | Round 4 final [PO4} | Round 4 Avg Final [PO4] | stdev | Round 4 [PO4] uptake | Avg Round 4 [PO4] uptake | stdev | Total PO4 uptake/ removal (mg/L) (Round 1 + 2 + 3 + 4) | R4 % reduction |
|---|---|---|---|---|---|---|---|---|---|
| 2.62 | 2.5-2.5-2.5-2.5 | 1.15 | 1.115 | 0.0495 | 1.47 | 1.505 | 0.0495 | 8.8025 | 56.12 |
| 2.62 | | 1.08 | | | 1.54 | | | 8.8125 | 58.78 |
| 20.2 | 2.5-20-2.5-20 | 10.5 | 12.95 | 3.4648 | 9.7 | 7.25 | 3.4648 | 34.6825 | 48.02 |
| 20.2 | | 15.4 | | | 4.8 | | | 29.7125 | 23.76 |
| 2.62 | 20-2.5-20-2.5 | 1.2 | 3.05 | 2.6162 | 1.42 | −0.43 | 2.6163 | 44.5308 | 54.20 |
| 2.62 | | 4.9 | | | −2.28 | | | 40.160 | −87.02 |
| 20.2 | 20-20-20-20 | 15.7 | 15.95 | 0.3535 | 4.5 | 4.25 | 0.3536 | 65.5308 | 22.28 |
| 20.2 | | 16.2 | | | 4 | | | 64.9808 | 19.80 |

Example 25

The following is illustrative examples of the process of the present invention. Example 25 specifically is performed to determine how the use of fly-ash for PO$_4$-removal compares to the use of the composite-ash/capture-material for PO$_4$-removal. The fly ash was tested from different sources (e.g., Boral class ash—coal-fired/coal-sourced, Dublid/Butch ash—wood-fired/wood-sourced) and was used in dosage trials similar to those described in detail in this disclosure. The used solids were dried, and a portion of the samples were calcined at 1000 degrees C., and a chapelle test was performed. XRF Asis Chemistry analysis was performed on a portion of the calcined sample. Some of the The various embodiments are provided by way of example and are not intended to limit the scope of the disclosure. The described embodiments comprise different features, not all of which are required in all embodiments of the disclosure. Some embodiments of the present disclosure utilize only some of the features or possible combinations of the features. Variations of embodiments of the present disclosure that are described, and embodiments of the present disclosure comprising different combinations of features as noted in the described embodiments, will occur to persons with ordinary skill in the art. It will be appreciated by persons with ordinary skill in the art that the present disclosure is not limited by what has been particularly shown and described herein above. Rather the scope of the invention is defined by the appended claims.

What is claimed is:

1. A method of using an inorganic mineral product or oxidized material of common crystalline and amorphous non-crystalline composition, produced by thermally processing paper and/or carpet exothermic processing waste, as a post-consumer or post-industrial geopolymer precursor for manufacturing a final product, the method comprising the steps of:
   a) providing an inorganic mineral product or oxidized material of common crystalline and amorphous non-crystalline composition, produced by thermally processing paper and/or carpet exothermic processing waste;
   b) contacting the inorganic mineral product or oxidized material with a waste stream;
   c) allowing the inorganic mineral product or oxidized material to interact with the waste stream,
   whereby the inorganic mineral product or oxidized material, post interacting with the waste stream, functions as a post-consumer or post-industrial geopolymer precursor for manufacturing a final product.

2. The method of using an inorganic mineral product or oxidized material of common crystalline and amorphous non-crystalline composition as a post-consumer or post-industrial geopolymer precursor of claim 1, wherein the inorganic mineral product or oxidized material, post interacting with the waste stream, functions as at least one of a group consisting of a treatment material, a chemical reagent, a building material, and a filler.

3. The method of using an inorganic mineral product or oxidized material of common crystalline and amorphous non-crystalline composition as a post-consumer or post-industrial geopolymer precursor of claim 2, wherein the inorganic mineral product or oxidized material also functions as a collecting- or precipitating-agent and capture-platform for an aqueous waste stream, whereby the inorganic mineral product or oxidized material binds or traps phosphates and nitrates and heavy metals in the aqueous waste stream, and whereby the resulting product, post interacting with the waste stream, is useful as a post-consumer or post-industrial geopolymer precursor.

* * * * *